United States Patent
Nishizawa et al.

(10) Patent No.: US 10,162,412 B2
(45) Date of Patent: Dec. 25, 2018

(54) DISPLAY, CONTROL METHOD OF DISPLAY, AND PROGRAM

(71) Applicant: SEIKO EPSON CORPORATION, Tokyo (JP)

(72) Inventors: Kazuo Nishizawa, Matsumoto (JP); Masahide Takano, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 141 days.

(21) Appl. No.: 15/049,203

(22) Filed: Feb. 22, 2016

(65) Prior Publication Data

US 2016/0284129 A1  Sep. 29, 2016

(30) Foreign Application Priority Data

Mar. 27, 2015 (JP) ................................. 2015-066631
Sep. 3, 2015 (JP) ................................. 2015-173682

(51) Int. Cl.
*G06F 3/01* (2006.01)
*G02B 27/01* (2006.01)

(52) U.S. Cl.
CPC ...... *G06F 3/013* (2013.01); *G02B 2027/0118* (2013.01); *G02B 2027/0127* (2013.01); *G02B 2027/0129* (2013.01); *G02B 2027/0178* (2013.01)

(58) Field of Classification Search
CPC ............ G06F 3/013; G02B 2027/0118; G02B 2027/0178; G02B 2027/0127; G02B 2027/0129
USPC ............................................................ 345/8
See application file for complete search history.

(56) References Cited

U.S. PATENT DOCUMENTS

| 5,739,797 | A | * | 4/1998 | Karasawa | G02B 27/017 |
|---|---|---|---|---|---|
| | | | | | 345/8 |
| 6,064,353 | A | * | 5/2000 | Hoshi | G02B 27/017 |
| | | | | | 345/7 |
| 2008/0084472 | A1 | | 4/2008 | Trudeau et al. | |
| 2011/0075257 | A1 | * | 3/2011 | Hua | G02B 27/017 |
| | | | | | 359/464 |
| 2012/0044571 | A1 | * | 2/2012 | Mukawa | G02B 27/0103 |
| | | | | | 359/630 |
| 2012/0206816 | A1 | * | 8/2012 | Yoshida | G02B 27/0172 |
| | | | | | 359/630 |
| 2012/0212484 | A1 | * | 8/2012 | Haddick | G02B 27/0093 |
| | | | | | 345/419 |
| 2013/0021373 | A1 | * | 1/2013 | Vaught | G02B 27/017 |
| | | | | | 345/633 |

(Continued)

FOREIGN PATENT DOCUMENTS

JP  H08-47001 A  2/1996
JP  H11-202256 A  7/1999

(Continued)

*Primary Examiner* — Srilakshmi K Kumar
*Assistant Examiner* — Chineyere D Wills-Burns
(74) *Attorney, Agent, or Firm* — Oliff PLC

(57) ABSTRACT

A HMD is provided with a virtual image display including a first display and a second display that display images respectively corresponding to a right eye and a left eye of a user such that an outside scene is visible. The HMD is provided with a control device that controls a display mode of the image by the virtual image display according to a gaze distance of the user.

29 Claims, 21 Drawing Sheets

(56) References Cited

U.S. PATENT DOCUMENTS

| | | | |
|---|---|---|---|
| 2014/0285429 A1* | 9/2014 | Simmons | G02B 27/225 345/156 |
| 2014/0334010 A1 | 11/2014 | Mukawa | |
| 2015/0123997 A1* | 5/2015 | Hayasaka | G02B 27/017 345/633 |
| 2015/0130713 A1* | 5/2015 | Mikuni | G06F 3/033 345/157 |
| 2016/0103326 A1* | 4/2016 | Kimura | G02B 27/017 345/690 |
| 2016/0127650 A1* | 5/2016 | Van Den Herik | H04N 5/23293 348/333.01 |

FOREIGN PATENT DOCUMENTS

| | | |
|---|---|---|
| JP | 2012-42654 A | 3/2012 |
| JP | 2013-537784 A | 10/2013 |
| JP | 2014-131094 A | 7/2014 |
| JP | 2014-241523 A | 12/2014 |

\* cited by examiner

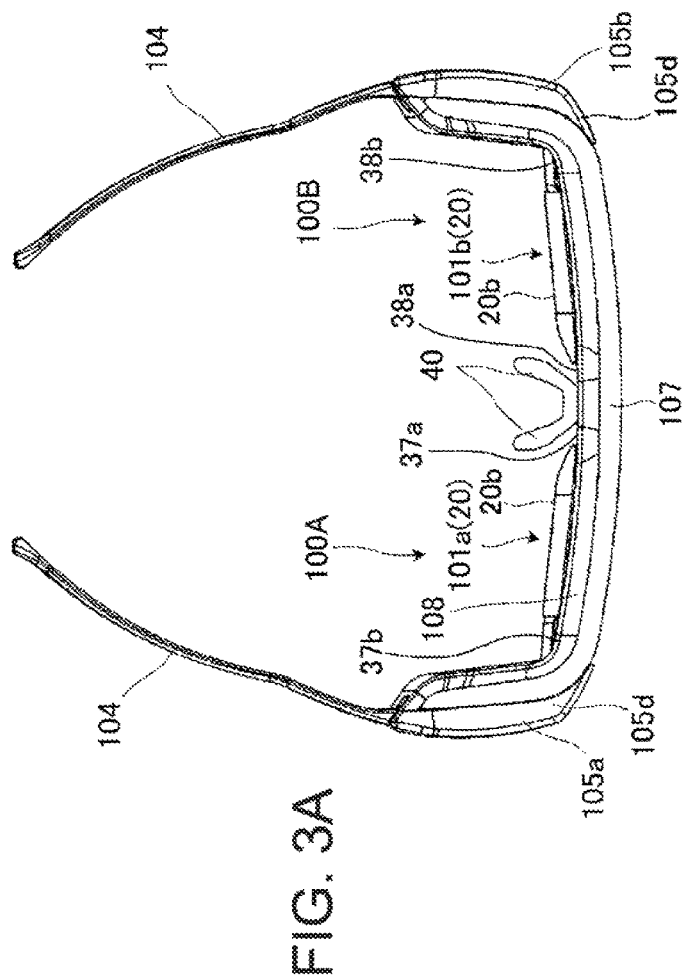
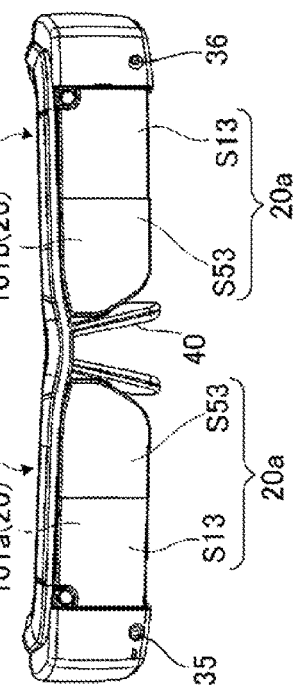# Document
FIG. 3A
FIG. 3B
FIG. 3C

DISPLAY, CONTROL METHOD OF DISPLAY, AND PROGRAM

BACKGROUND

1. Technical Field

The invention relates to a display, a control method of a display, and a program.

2. Related Art

In the related art, it has been known that a display of a head-mounted type displays an image of an object in a real space (for example, see JP-T-2013-537784). JP-T-2013-537784 discloses a configuration of adjust focus in order to match a position at which the user perceives an object by an image displayed on a display and a position at which the user sees the object in the real space.

Incidentally, when the user who uses a display views an image and an outside scene, which are displayed on a display, the appearance of the display image is changed, depending on which direction or which distance that the user gazes. However, there has not been an example of adjusting the appearance of the display image in this type of display.

SUMMARY

An advantage of some aspects of the invention is that a display image can be appropriately adjusted, when the user who uses a display can view an outside scene and a display image.

An aspect of the invention is directed to a display including display units that display images respectively corresponding to a right eye and a left eye of a user such that an outside scene is visible; and a control unit that controls a display mode of the image by each of the display units according to a gaze distance of the user.

According to this aspect of the invention, when the user views the outside scene and the image, it is possible to adapt the display mode of the image to the distance that the user gazes. Therefore, it is possible to appropriately adjust the display image, and for example, it is possible to reduce the load of the user, and enhance the visibility of the display image.

Another aspect of the invention is directed to the display described above, in which the control unit changes a display position of the image and/or a display size of the image, by the display unit, according to the gaze distance of the user.

According to this aspect of the invention, it is possible to adapt the display position and a display size of the image to the distance that the user gazes.

Another aspect of the invention is directed to the display described above, in which the control unit controls the display mode of the image by the display unit, based on a convergence angle between both eyes corresponding to the gaze distance of the user.

According to this aspect of the invention, it is possible to realize a display mode adapted for the distance that the user gazes, by controlling the display mode of the image according to the convergence angle between both eyes of the user.

Another aspect of the invention is directed to the display described above, in which the control unit obtains the convergence angle between both eyes of the user, and varies a position where the user views an image displayed on the display unit, according to the obtained convergence angle.

According to this aspect of the invention, it is possible to display an image at a position adapted for the gaze distance of the user, by the display obtaining the convergence angle between both eyes of the user, and varying a position where the user views the display image. Therefore, it is possible to enhance the visibility of the display image, and it is possible for the user to view the display image adapted for the distance that the user gazes in the outside scene.

Another aspect of the invention is directed to the display described above, in which the control unit shifts a display position where the display unit displays the image, from a standard position that is set in advance, according to the convergence angle between both eyes of the user.

According to this aspect of the invention, it is possible to display the image at the position adapted for the gaze distance of the user.

Another aspect of the invention is directed to the display described above which further includes a state detecting unit that detects state of both eyes of the user, and in which the control unit calculates the gaze distance of the user, based on a detection result of the state detecting unit, and controls a display mode of an image by the display unit according to the calculated gaze distance.

According to this aspect of the invention it is possible to appropriately adjust the display mode of the image, by the display detecting the state of both eyes of the user and calculating the gaze distance, even without the user performing a complicated operation.

Another aspect of the invention is directed to the display described above, in which the state detecting unit includes first imaging units that are respectively provided corresponding to a right eye and a left eye of the user, and the control unit calculates the gaze distance of the user, by obtaining at least one of a pupillary distance, a pupil diameter, and a gaze time in a gaze direction of each of both eyes of the user, based on a captured image of the first imaging unit.

According to this aspect of the invention, it is possible to calculate the gaze distance with high accuracy from the states of both eyes of the user.

Another aspect of the invention is directed to the display described above, in which the state detecting unit includes a second imaging unit that captures a gaze direction of the user, and the control unit calculates the gaze distance of the user, by obtaining a distance to a gaze object that the user gazes, based on the captured image of the second imaging unit.

According to this aspect of the invention, it is possible to calculate the gaze distance with higher accuracy.

Another aspect of the invention is directed to the display described above, in which the display unit includes an emitting unit that emits image light; an optical system that guides the image light which is emitted by the emitting unit, to each of the right eye and the left eye of the user; and a change unit that displaces at least a portion of members constituting the emitting unit or the optical system, and changes an angle of the image light that is incident from the optical system to the right eye and the left eye of the user, and the control unit operates the change unit according to the gaze distance of the user.

According to this aspect of the invention, it is possible to adjust the display mode of the image by displacing the members.

Another aspect of the invention is directed to the display described above, in which the control unit controls a position of an image, in a display range in which the user views an image displayed on the display unit, according to the gaze distance of the user.

According to this aspect of the invention, it is possible to appropriately adjust the display position of the image according to the gaze distance of the user.

Another aspect of the invention is directed to the display described above, which further includes an image generation unit that generates an image that the display unit displays based on image data, and in which the control unit generates an image for adjustment by cutting out a part of the image data by the image generation unit, according to the gaze distance of the user, and displays the image for adjustment on the display unit.

According to this aspect of the invention, it is possible to expand the adjustment range of the display position of the image by cutting out the image, and to eliminate the discomfort when changing the display position of the image.

Another aspect of the invention is directed to the display described above, in which the control unit causes the display unit to display an image corresponding to either the right eye or the left eye of the user, when the gaze distance of the user is closer than a reference distance that is set in advance.

According to this aspect of the invention, even when the gaze distance of the user is closer, it is possible to reduce the load on the user.

Another aspect of the invention is directed to a display which displays images respectively corresponding to a right eye and a left eye of a user such that an outside scene is visible, and the display includes a display unit including an emitting unit that emits image light; an optical system that guides the image light which is emitted by the emitting unit, to each of the right eye and the left eye of the user; and a change unit that changes an emission direction of the emitting unit or an incidence angle of the image light that is incident from the optical system to the right eye and the left eye of the user, and an image generation unit that generates an image that the display unit displays based on image data; and a control unit that performs at least one of a process of calculating the gaze distance of the user, and operating the change unit according to the calculated gaze distance, and a process of generating an image for adjustment by cutting out a part of the image data, by the image generation unit, according to the gaze distance of the user, and displaying the image for adjustment on the display unit.

According to this aspect of the invention, when the user views the outside scene and the image, it is possible to adapt the display mode of the image to the distance that the user gazes. Therefore, it is possible to appropriately adjust the display image, and for example, it is possible to reduce the load of the user, and enhance the visibility of the display image.

Another aspect of the invention is directed to the display described above, which further includes an external imaging unit, and in which the control unit is capable executing a process of displaying an image based on a captured image of the external imaging unit on the display unit.

According to this aspect of the invention, the outside scene which is the scenery of the outside of the display unit can be viewed to the user.

Another aspect of the invention is directed to the display described above, in which the display unit is configured such that the user can views an outside scene by external light passing through the display unit, and visibly displays the image based on the captured image of the external imaging unit and the outside scene at the same time.

According to this aspect of the invention, when the outside scene and the display image are visibly displayed, it is possible to appropriately adjust the display image, and for example, it is possible to reduce the load of the user, and enhance the visibility of the display image.

Another aspect of the invention is directed to the display described above, in which the control unit executes a process of improving the visibility of the image based on the captured image, as compared to external light passing through the display unit, when the image based on the captured image is displayed on the display unit.

According to this aspect of the invention, it is possible to clearly view the image displayed on the display unit, and it becomes easier to distinguish between the outside scene that is viewed by the external light and the display image.

Another aspect of the invention is directed to the display described above, in which the control unit executes a process of improving the visibility of the image based on the captured image, by varying brightness or color of the image based on the captured image, or executing an edge enhancement process on the image based on the captured image, when the image based on the captured image is displayed on the display unit.

According to this aspect of the invention, it is possible to significantly enhance the visibility of the display image of the display unit.

Another aspect of the invention is directed to the display described above, in which the control unit causes the display unit to display an image based on a captured image of the external imaging unit, corresponding to either the right eye or the left eye of the user.

According to this aspect of the invention, the image displayed on the display unit can be viewed to the user, without being affected from the gaze distance of the user.

Another aspect of the invention is directed to the display described above, in which the control unit causes the display unit to display an image based on a captured image of the external imaging unit, corresponding to each of the right eye and the left eye of the user, in a manner without left and right parallax.

According to this aspect of the invention, it is less affected by the gaze distance of the user, and the display image can be favorably viewed.

Another aspect of the invention is directed to the display described above, in which the control unit causes the display unit to display a captured image of the external imaging unit in an enlarged manner.

According to this aspect of the invention, it is possible to enlarge and display the outside scene.

Another aspect of the invention is directed to the display described above, in which the control unit causes the display unit to display the image based on the captured image of the external imaging unit, when an operation of the user is received.

According to this aspect of the invention, it is possible to display the outside scene in response to the operation of the user.

Another aspect of the invention is directed to the display described above, in which the control unit detects a gaze distance of the user, and displays the image based on the captured image of the external imaging unit, when the detected gaze distance is shorter than a distance that is set in advance.

According to this aspect of the invention, it is possible to display the outside scene corresponding to the gaze distance of the user.

Another aspect of the invention is directed to the display described above, in which the external imaging unit captures a range including a sight line direction of the user, in a mounted state of the display unit.

According to this aspect of the invention, it is possible to display the image based on the captured image of a range including the sight line direction of the user.

Another aspect of the invention is directed to a control method of a display including controlling a display mode of an image by a display unit, according to a gaze distance of a user, by a display including the display units that display images respectively corresponding to a right eye and a left eye of a user such that an outside scene is visible.

According to this aspect of the invention, when the user views the outside scene and the image, it is possible to adapt the display mode of the image to the distance that the user gazes. Therefore, it is possible to appropriately adjust the display image, and for example, it is possible to reduce the load of the user, and enhance the visibility of the display image.

Another aspect of the invention is directed to a program executable by a computer controlling a display including display units that display images respectively corresponding to a right eye and a left eye of a user such that an outside scene is visible, and the program causes the computer to function as a control unit that controls a display mode of an image by the display unit, according to a gaze distance of a user.

According to this aspect of the invention, by allowing the computer to execute the program of the aspect of the invention when the user views the outside scene and the image displayed by the display, it is possible to adapt the display mode of the image to the distance that the user gazes. Therefore, it is possible to appropriately adjust the display image, and for example, it is possible to reduce the load of the user, and enhance the visibility of the display image.

BRIEF DESCRIPTION OF THE DRAWINGS

The invention will be described with reference to the accompanying drawings, wherein like numbers reference like elements.

FIG. 3A is a plan view illustrating an appearance of the virtual image display, FIG. 3B is a front view, and FIG. 3C is a side view.

FIG. 10A is a schematic diagram illustrating the gaze distance and the convergence angle of a user, and FIG. 10B is a schematic diagram illustrating fields of view of both eyes of the user.

FIG. 11A illustrates an operation of adjusting a display position by a mechanical operation, and FIGS. 11B and 11C illustrate an operation of adjusting a display position by an image process.

DESCRIPTION OF EXEMPLARY EMBODIMENTS

First Embodiment

Hereinafter, an embodiment of a virtual image display according to the invention will be described in detail with reference to FIG. 1 and the like.

Figure 1:
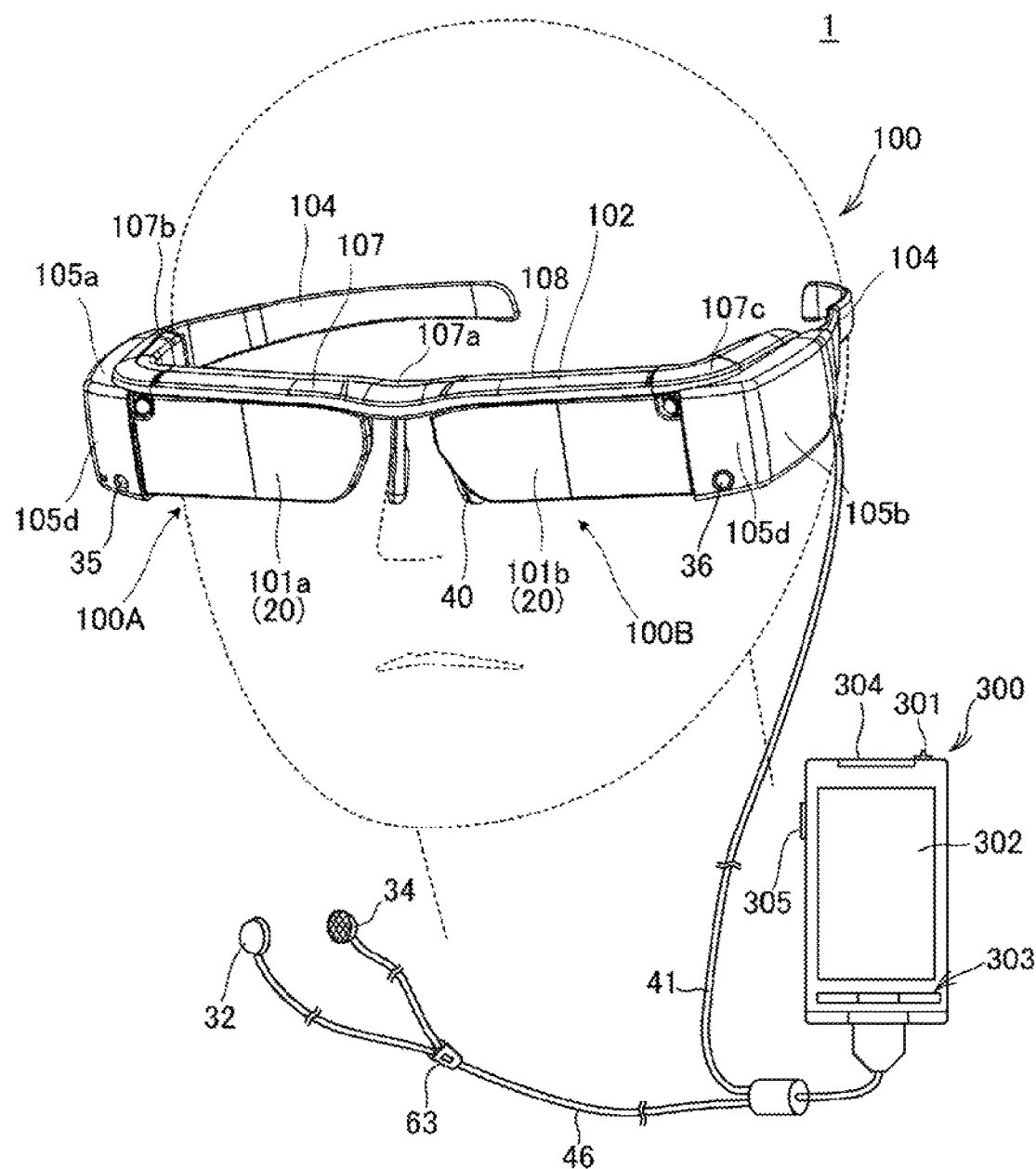
FIG. 1 is a perspective view illustrating an appearance of a HMD of a first embodiment of the invention.

FIG. 1 is an explanatory diagram illustrating an external configuration of a head mounted display (HMD) 1 which is a display according to a first embodiment applied with the invention. The HMD 1 includes a virtual image display 100 (display unit) that causes the user to view a virtual image in a state of being mounted on the head of the user, and a control device 300 that controls the virtual image display 100. The control device 300 also functions as a controller by which the user operates the HMD 1.

The HMD 1 of the present embodiment is an optical transmission-type display by which the user is capable of viewing a virtual image by the virtual image display 100, as well as viewing an outside scene transmitted through the virtual image display 100. In this specification, the virtual image that the user views by using HMD 1 is referred to as "a display image" for convenience. The emission of image light generated based on the image data by the virtual image display 100 is referred to as "displaying an image".

The virtual image display 100 is connected to the control device 300 through a connection cable 41. A power cable (not illustrated) through which power is supplied from the control device 300 to the virtual image display 100, and a communication cable (not illustrated) through which the virtual image display 100 and the control device 300 transmit and receive various types of data with each other are built into the connection cable 41.

Further, the control device 300 is connected to an audio cable 46 that branches with the connection cable 41. The audio cable 46 is connected to a right earphone 32, a left earphone 34, and a microphone 63. The right earphone 32 and the left earphone 34 output sound based on a sound signal that a sound processing unit 190 (FIG. 9) outputs.

The microphone 63 collects sound and outputs a sound signal to the sound processing unit 190 (FIG. 9) which will be described later. The microphone 63 may be, for example, a mono microphone or a stereo microphone, or a microphone with directivity or an omni-directional microphone.

Here, when the virtual image display 100 has a power source such as a battery, the virtual image display 100 and the control device 300 can be connected by wireless communication.

First, the configuration of the virtual image display 100 will be described.

As illustrated in FIG. 1, the virtual image display 100 constitutes a head-mounted display having an appearance such as glasses. The virtual image display 100 can cause the observer or the user wearing the virtual image display 100 to view image light of a virtual image (video light) as well as cause the observer to view or observe an external image (an outside scene) in a see-through manner. The virtual image display 100 includes first and second optical members 101a and 101b that cover the front of the eyes of the observer (user) in a see-through-capable manner, a frame portion 102 that supports both optical members 101a and 101b, and first and second image forming main units 105a and 105b that are attached to portions from both left and right ends of the frame portion 102 to string portions (temples) 104 on the rear side. Here, a first display 100A that is a combination of the first optical member 101a and the first image forming main unit 105a on the left side of FIG. 1 is a unit that forms a virtual image for the right eye, and functions alone as a virtual image display. Further, a second display 100B that is a combination of the second optical member 101b and the second image forming main unit 105b on the right side of FIG. 1 is a unit that forms a virtual image for the left eye, and functions alone as a virtual image display.

Figure 2:
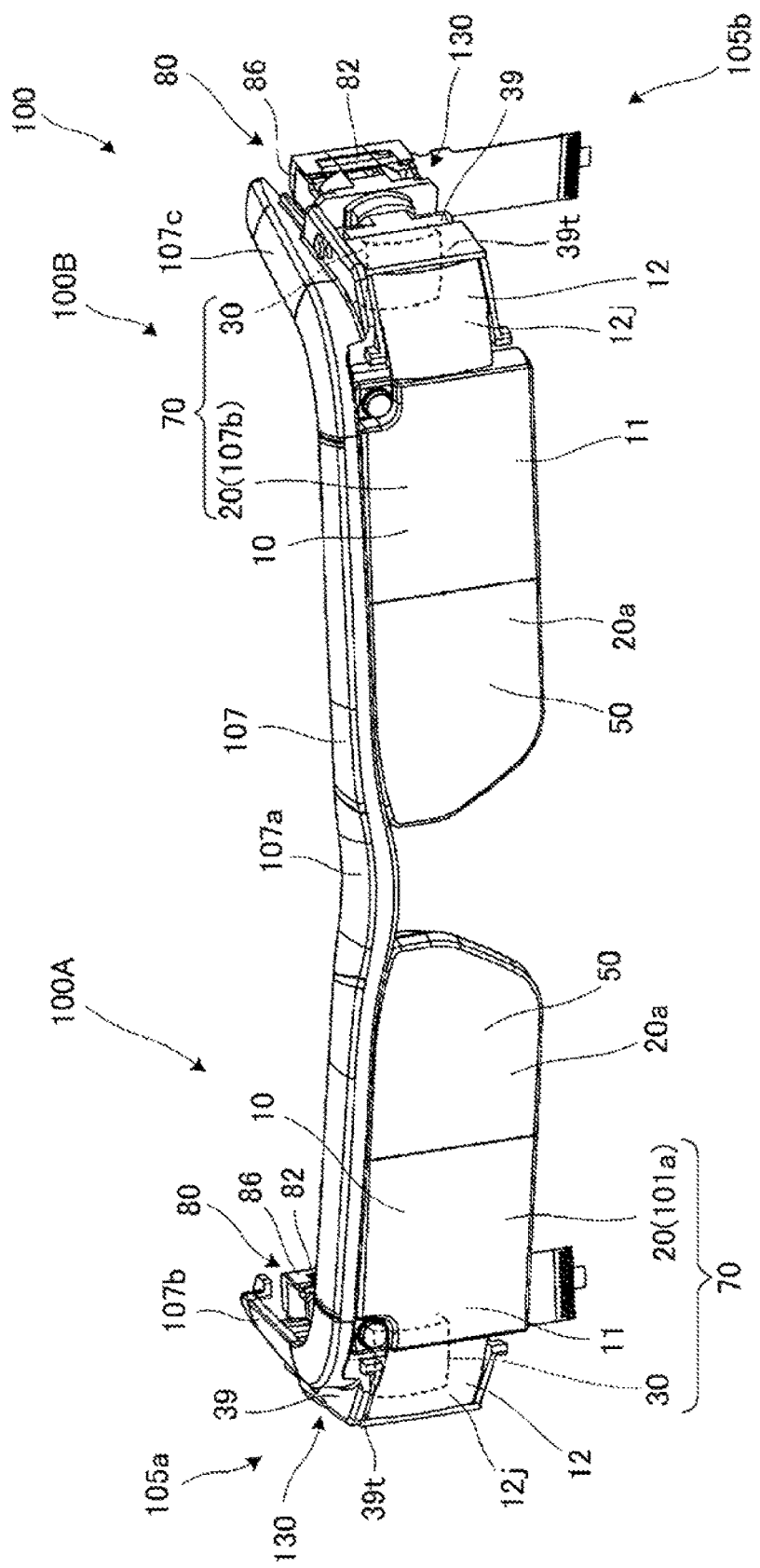
FIG. 2 is a perspective view illustrating an internal structure in which an exterior member is removed from a virtual image display.

FIG. 2 illustrates the internal structure of the virtual image display 100, and the appearance and the interior of the virtual image display 100 are contrasted by comparing FIG. 2 with FIG. 1. For example, the first and second image forming main units 105a and 105b are respectively configured with a projection lens 30 that is accommodated in the barrel portion 39 and an image display 80 including an video display element 82.

As illustrating the appearance and the interior in the respective drawings of FIGS. 1 to 4, the frame portion 102 provided in the virtual image display 100 includes a frame 107 disposed on the upper end side and a resin portion 108 disposed on the rear side along the frame 107. In addition, the virtual image display 100 has a configuration without a part of a frame on the lower side. The frame 107 constituting the frame portion 102 is an elongated plate-like member bent into a U-shape, and includes a front portion 107a that extends in a lateral direction of the left and the right which is a direction corresponding to the arrangement of the eyes for the observer, and a pair of side portions 107b and 107c that extend in a depth direction which is a direction corresponding to the front and rear for the observer. Both side portions 107b and 107c are not exactly parallel, and form a small angle so as to spread slightly towards the front end. The frame 107, in other words, the front portion 107a and the side portion 107b and 107c are an integrated metal part that is made of an aluminum die-casting and other various metal materials. The resin portion 108 is disposed along the frame 107, and fits with the frame 107 to be capable of accommodating various cables used in image formation, for example, in cooperation with the frame 107. In the frame 107, the widths of the front portion 107a and the resin portion 108 in the depth direction are comparable to the thicknesses or the widths of the light guide devices 20 corresponding to the first and second optical members 101a and 101b. The first optical member 101a and the first image forming main unit 105a are aligned, and supported by being directly fixed by, for example, a screw, on the left side of the frame 107, specifically, in a portion from the left end of the front portion 107a to the side portion 107b. The second optical member 101b and the second image forming main unit 105b are aligned, and supported by being directly fixed by, for example, a screw, on the right side of the frame 107, specifically, in a portion from the right end of the front portion 107a to the side portion 107c. Further, the first optical member 101a and the first image forming main unit 105a are aligned with each other by fitting or the like, and the second optical member 101b and the second image forming main unit 105b are aligned with each other by fitting or the like.

The frame 107 and the resin portion 108 constituting the frame portion 102 has a role of protecting the interiors of the first and second image forming main units 105a and 105b in cooperation with a cover-like exterior member 105d covering them, as well as supporting the first and second image forming main units 105a and 105b. Further, the frame 107 is spaced apart from or in contact with loosely the upper portion excluding the base side of the first and second optical members 101a and 101b or the light guide devices 20 that are connected to the first and second image forming main units 105a and 105b. For this reason, even when there is a difference between the thermal expansion coefficients of the light guide device 20 in the center and the frame portion 102 including the frame 107, the expansion of the light guide device 20 is acceptable in the frame portion 102, and thus it is possible to prevent distortion, deformation, and damage from occurring in the light guide device 20.

A nose receiving portion 40 is provided in association with the frame portion 102. The nose receiving portion 40 has a role of supporting the frame portion 102 by abutting the nose of the observer. In other words, the frame portion 102 is placed before the face of the observer by the nose receiving portion 40 supported by the nose and a pair of temple portions 104 supported by the ears. The nose receiving portion 40 is fixed by screws to the front portion 107a of the frame 107 on one side constituting the frame portion 102. In addition, the appearance illustrated with reference to FIG. 1 as described above is an example. For example, the configuration of a portion which is not directly involved as an optical mechanism such as a mechanism which is fixed by screws can be appropriately changed.

As illustrated in FIG. 2 or the like, it can be seen that the first display 100A includes a projection fluoroscope 70 (optical system) which is a projection optical system, and an image display 80 (emitting unit) that forms video light. The image display 80 corresponds to a projection unit that projects the video light to the projection fluoroscope 70. Further, the second display 100B is configured symmetrically with the first display 100A. The members included in the second display 100B and the arrangements of the members in the second display 100B are the same as in the first display 100A. Therefore, a description will be made regarding the first display 100A hereinafter, and the description replaces the description of the second display 100B.

The projection fluoroscope 70 has a role of projecting an image formed by the image display 80 to the eye of the observer as a virtual image. The projection fluoroscope 70 includes the first optical member 101a or the light guide device 20, and a projection lens 30 for image formation. The first optical member 101a or the light guide device 20 is configured with a light guide member 10 for light guide and see-through, and a light transmitting member 50 for see-through. In addition, the first image forming main unit 105a is configured with the image display 80 and the projection lens 30. Although a detailed description will be made later, the projection lens 30 constituted with a plurality of lenses is accommodated in the barrel portion 39, and the projection lens 30 together with the barrel portion 39 constitute an optical device unit 130. The optical device unit 130, in other words, the projection lens 30 is fixed to the end portion 39t of the barrel portion 39, in a state of being accurately positioned relative to the light guide device 20 by fitting.

The image display 80 includes backlights (a right backlight 221 and a left backlight 222 in FIG. 9) that are illuminating device 81 emitting illumination light to the video display element 82, in addition to the video display element (video element) 82 that is a transmission-type spatial light modulation device. Further, the image display 80 includes drive control units (a right drive control unit 211, and a left drive control unit 212 in FIG. 9) that control the operation of the video display element 82 or the like. The video display element 82 is accommodated in the video element case 86, and is assembled to the barrel portion 39 that accommodates the projection lens 30 for image formation through the video element case 86. In other words, the barrel portion 39 is a connection member that connects the video display element 82, the projection lens 30, the light guide device 20, and the like.

As described above, the light guide device 20 is a block-like member configured with the light guide member 10 for light guide and see-through, and the light transmitting member 50 for see-through. The light guide member 10 is a part of the prism-type light guide device 20, and an integrated member, but the light guide member 10 can be regarded as being divided into a first light guiding portion 11 on the light emitting side and a second light guiding portion 12 on the light incident side. The light transmitting member 50 is a member (auxiliary optical block) that assists the see-through functions of the light guide member 10, and is integrally fixed with the light guide member 10 to form one light guide device 20. The light guide device 20 with such a configuration is accurately positioned relative to and fixed to the projection lens 30 by the front end 12j positioned on the light source or the light incident side (base side) fitting the end portion 39t of the barrel portion 39.

Here, for example, as illustrated in FIGS. 3A to 3C, FIG. 4, or the like, a first exposed surface 20a which is an exposed surface on the front side (outer side) and a second exposed surface 20b which is an exposed surface on the back side (inner side) are portions that are exposed to the outside and affects the function of see-through, among optical surfaces constituting the light guide device 20. In addition, as illustrated, the first exposed surface 20a is configured with a third surface S13 out of the optical surfaces of the light guide member 10 and a third transmission surface S53 which is an optical surface of the light transmitting member 50, and the second exposed surface 20b is configured with a third surface S11 and a fourth surface S14 out of the optical surfaces of the light guide member 10 and a first transmission surface S51 out of the optical surfaces of the light transmitting member 50.

Figure 5:
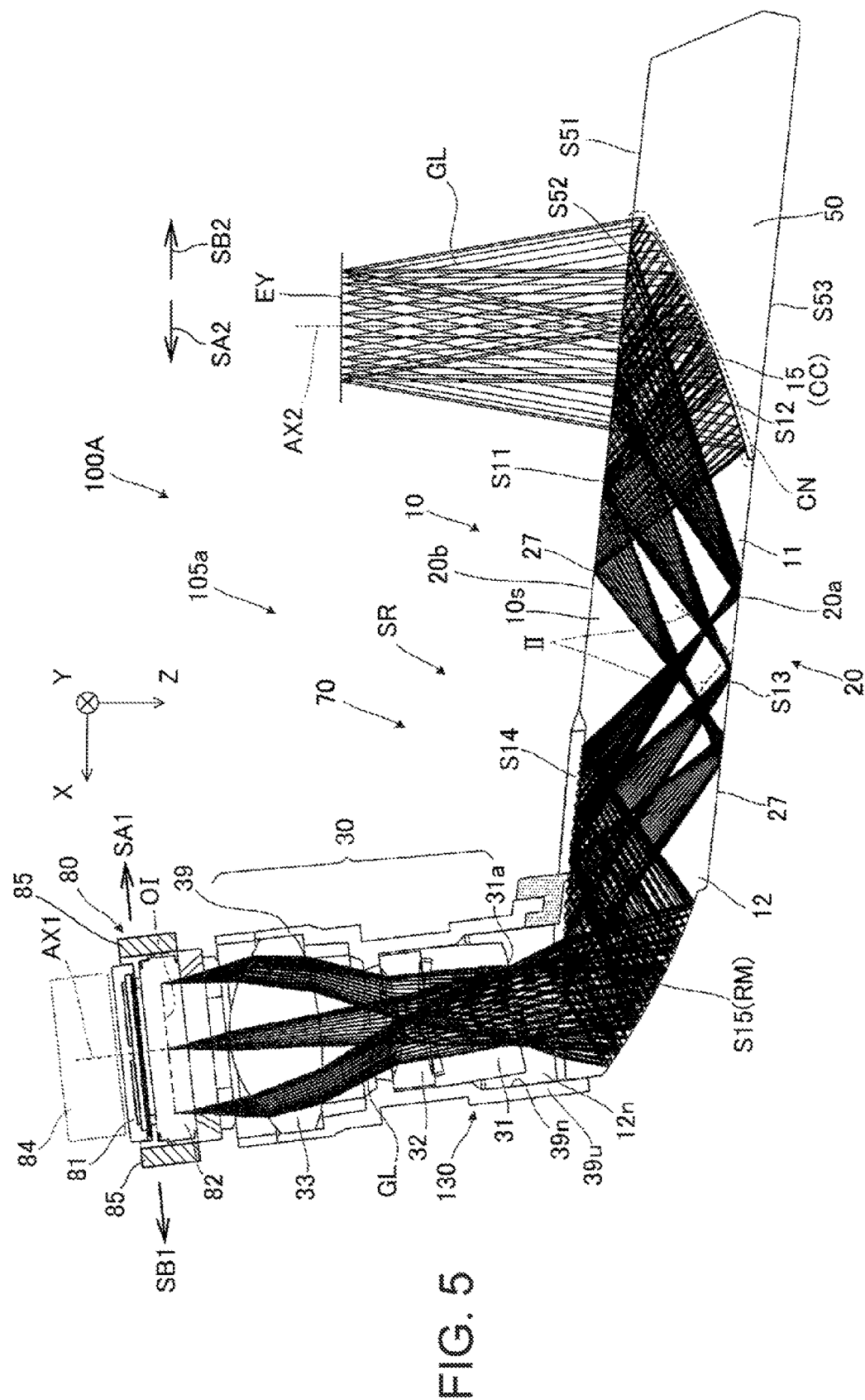
FIG. 5 is a sectional view of a plan view of a body portion constituting a virtual image display.

Hereinafter, the image display 80 and the projection lens 30 constituting the first image forming main unit 105a (see FIG. 1) will be described in detail with reference to FIG. 5.

The image display 80 includes an illuminating device 81 that emits illumination light to the video display element 82, and a drive control unit 84 that controls the operations of the illuminating device 81 and the video display element 82, in addition to the video display element 82 described above.

The illuminating device 81 of the image display 80 includes a light source that generates light of three colors including red, green, and blue, and a backlight light guide unit that diffuse the light from the light source to form a light beam of a rectangular cross-section. The video display element (video element) 82 is formed of, for example, a liquid crystal display, and is configured with a plurality of pixels so as to form image light to be a display object such as a moving image by spatially modulating the illumination light from the illuminating device 81. In addition, without being illustrated, the drive control unit 84 includes a light source drive circuit that supplies electric power to the illuminating device 81 to emit illumination light of a stable luminance, and a liquid crystal drive circuit that forms color image light or video light that is a source of a video or a still image as a transmittance pattern, by outputting an image signal or a drive signal to an video display element (video element) 82. In addition, it is possible to provide an image processing function in the liquid crystal driving circuit, or provide an image processing function in an external control circuit.

The projection lens 30 is a projection optical system provided with three lenses 31 to 33 which are optical elements along the incident side optical axis as components, and is supported by the barrel portion 39 accommodating these lenses (optical elements) 31 to 33. The lenses 31 to 33 are asperic lenses including both a non-axially symmetric aspheric surface (non-axisymmetric aspheric surface) and an axially symmetric aspheric surface (axisymmetric aspheric surface), and forms an intermediate image corresponding to the display image of the video display element 82 in the inside of the light guide member 10 in cooperation with a part of the light guide member 10 which is a relay optical system. In addition, a lens surface 31a that is a light emitting surface of a first lens 31 among the respective lenses (optical elements) 31 to 33 is a non-axisymmetric aspheric surface, and the lens surfaces other than the lens surface 31a are axisymmetric aspheric surfaces.

Hereinafter, the light guide device 20 and the like will be described in detail. As described above, the light guide device 20 is configured with the light guide member 10 and the light transmitting member 50. Among these, in the light guide member 10, a portion of a center side near the nose (the front side of the eye) extends in a straight line in a plan view. In the light guide member 10, a first light guiding portion 11 disposed on the center side near the nose, that is, the light emitting side includes a first surface S11, a second surface S12, and a third surface S13, as surfaces having an optical function, and a second light guiding portion 12 disposed on the peripheral side spaced apart from the nose, that is, the light incident side includes a fourth surface S14 and a fifth surface S15, as surfaces having an optical function. Among these, the first surface S11 and the fourth surface S14 are continuously adjacent, and the third surface S13 and the fifth surface S15 are continuously adjacent. Further, the second surface S12 is disposed between the first surface S11 and the third surface S13, and the fourth surface S14 and the fifth surface S15 are adjacent to form a large angle. Further, here, the first surface S11 and the third surface S13 that are arranged opposed are surfaces that are substantially parallel to each other. Meanwhile, the other surface having the optical function, in other words, the second surface S12, the fourth surface S14, and the fifth surface S15 are non-axially symmetric curved surface (free-form surface).

Here, with respect to the surfaces S14 and S15 other than the first surface S11 to the third surface S13, among a plurality of surfaces constituting the light guide member 10, at least one free-form surface has at least one point of which the sign of the curvature varies depending on the direction. This enables miniaturization of the light guide member 10 while precisely controlling the guide of the video light.

In addition, in the light guide device 20, the light guide member 10 is bonded to the light transmitting member 50 through an adhesive layer CC, and a portion formed of the bonded surfaces between the light guide member 10 and the light transmitting member 50 and the adhesive layer CC is assumed as a bonding portion CN. In addition, the light guide device 20 is formed by bonding a base which is the light guide member 10 and the light transmitting member 50 to the bonding portion CN and thereafter coating the bonded base through a dipping process. In other words, the hard coat layer 27 of the light guide member 10 is provided in the light transmitting member 50 and the entire light guide device 20.

The body 10s of the light guide member 10 is formed of a resin material having a high optical transparency in a visible region, and is formed, for example, by injecting and solidifying the thermoplastic resin into a mold. In addition, it is possible to use for example, cycloolefin polymer or the like as the material of the body 10s. Although the body 10s is integrally formed, the light guide member 10 can be considered by behind functionally divided into the first light guiding portion 11 and the second light guiding portion 12 as previously described. The first light guiding portion 11 allows the wave guidance and the injection of the video light GL, and allows see-through of external light HL. The second light guiding portion 12 allows the incidence and the wave guidance of the video light GL.

In the first light guiding portion 11, the first surface S11 is an optical surface functioning as a refractive surface that emits the video light GL to the outside of the first light guiding portion 11, and functioning as a total reflective surface that totally reflects the video light GL at the inner side. The first surface S11 is intended to be placed in front of the eye EY, and forms a planar shape as already mentioned. In addition, the first surface S11 is a surface formed by the hard coat layer 27 which is applied to the surface of the body 10s.

The second surface S12 is a surface of the body 10s, an optical surface in which a half mirror layer 15 is attached to the surface, and a non-axisymmetric aspheric surface. This half mirror layer 15 is a reflective film having a light transmitting property (in other words, a semi-transmissive reflective film). The half mirror layer (semi-transmissive reflective film) 15 is formed mainly on a partial area (not illustrated) narrowed relative to the vertical direction along the Y axis, not on the entire second surface S12, but mainly on the entire second surface S12. The half mirror layer 15 is formed by forming a metal reflective film or a dielectric multilayer film on the partial area PA of the underlying surface of the body 10s. The reflectivity for the video light GL of the half mirror layer 15 is set to 10% or more to 50% or less in the assumed incident angle range of the video light GL, in terms of facilitating the observation of the external light HL by the see-through. The reflectivity for the video light GL of the half mirror layer 15 of the specific embodiment is set to for example, 20%, and the transmittance for the video light GL is set to for example, 80%.

The third surface S13 is an optical surface functioning as a total reflective surface that totally reflects the video light GL at the inner side. The third surface S13 is placed in substantially front of the eye EY, and forms a planar shape, similar to the first surface S11. Since the first surface S11 and the third surface S13 are parallel to each other, when the user sees external light HL passed through the first surface S11 and the third surface S13, the diopter has become zero, and in particular, it has been assumed that the magnification does not even occur. In addition, the third surface S13 is a surface formed by the hard coat layer 27 which is applied to the surface of the body 10s.

In the second light guiding portion 12, the fourth surface S14 is an optical surface functioning as a total reflective surface that totally reflects the video light GL at the inner side, and a non-axisymmetric aspheric surface. The fourth surface S14 also functions as a refractive surface that inputs the video light GL to the inside of the second light guiding portion 12. In other words, the fourth surface S14 has a function as a light incident surface that inputs the video light GL from the outside to the light guide member 10, and a reflective surface that propagates the video light GL in the interior of the light guide member 10. In addition, the fourth surface (light incident surface) S14 is a surface formed by the hard coat layer 27 which is applied to the surface of the body 10s.

In the second light guiding portion 12, the fifth surface S15 is an optical surface formed by forming a light reflective film RM made of an inorganic material on the surface of the body 10s. The fifth surface S15 is a non-axisymmetric aspheric surface functioning as a reflective surface.

The light transmitting member 50 is integrally fixed with the light guide member 10 to form one light guide device 20 as already described, and is a member (auxiliary optical block) that assists the see-through function of the light guide member 10. The light transmitting member 50 includes a first transmission surface S51, a second transmission surface S52, and a third transmission surface S53, as the side surfaces having an optical function. Here, the second transmission surface S52 is disposed between the first transmission surface S51 and the third transmission surface S53. The first transmission surface S51 is located on a surface which is extended from the first surface S11 of the light guide member 10, the second transmission surface S52 is a curved surface that is bonded and integrated to the second surface S12 through the adhesive layer CC, and the third transmission surface S53 is located on a surface which is extended from the third surface S13 of the light guide member 10. Since the second transmission surface S52 and the second surface S12 of the light guide member 10 among these surfaces are integrated by bonding through a thin adhesive layer CC, they have shapes of substantially the same curvature.

The light transmitting member (auxiliary optical block) 50 represents a high light transmitting property in the visible range, and the body portion of the light transmitting member 50 is formed of a thermoplastic resin material having substantially the same refractive index as the body 10s of the light guide member 10. In addition, the hard coat layer 27 is applied to the surface of the body portion of the light transmitting member 50, similar to the light guide member 10. In other words, the first transmission surface S51 and the third transmission surface S53 are surfaces formed by the hard coat layer 27 which is applied to the surface of the body portion.

In the present embodiment, in the inside of the light guide member 10, video light emitted from the video display element 82 is guided by being reflected five times on the first surface S11 to the fifth surface S15, including the second surface S12 which is the non-axisymmetric aspheric surface, and the like. The light guide device 20 that covers the front of the eye as a whole includes the third surface S13 or the third transmission surface S53 as the first exposed surface 20a, includes the first surface S11 or the first transmission surface S51 which is parallel to the third surface S13 or the third transmission surface S53, as the second exposed surface 20b, and incorporates the half mirror layer 15 along the second surface S12. As a result, both the display of the video light GL and the see-through for enabling the viewing of the external light HL are possible, and it is possible to correct the aberration of the video light GL in the light guide member 10.

Hereinafter, the light paths of the video light GL and the like in the virtual image display 100 will be described in detail with reference to FIG. 5. The video light GL emitted from the video display element (video element) 82 is given a desired astigmatism while being converged by passing through the respective lenses 31 to 33 constituting the projection lens 30, and enters the fourth surface S14 having a positive refractive power, which is disposed in the light guide member 10. In addition, this astigmatism is canceled while the video light passes through the respective surfaces of the light guide member 10, and the video light is finally emitted toward the eye of the observer in a state corresponding to the initial display.

Figure 6:
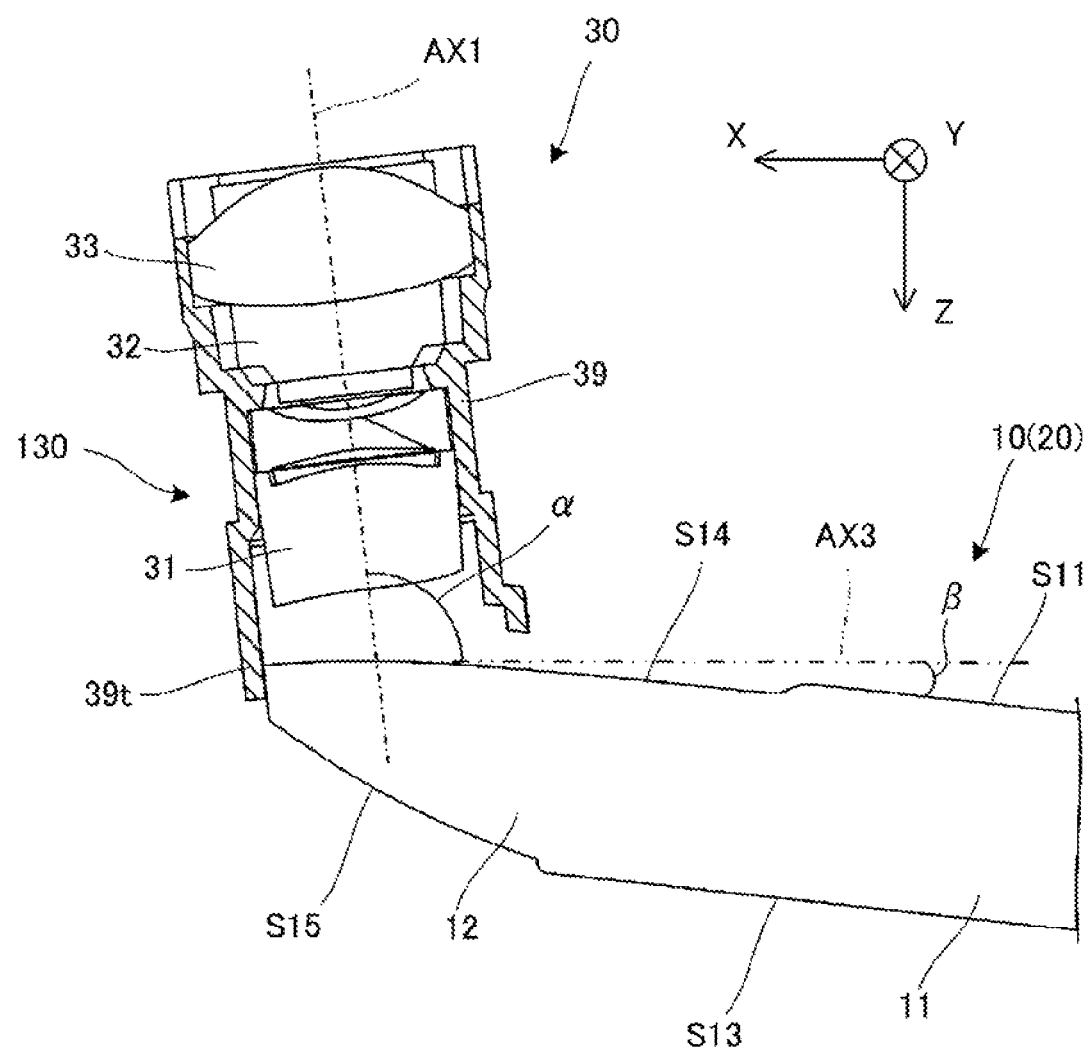
FIG. 6 is a sectional view illustrating a positional relationship between an optical device unit and a light guide member.

Here, the arrangement of the optical device unit 130 including the projection lens 30 relative to the light guide member 10 will be described. The first reference optical axis AX1 on the optical device unit 130 or the projection lens 30 is inclined by 5° to 45° relative to the second reference optical axis AX2 on the light emitting side of the light guide member 10. Here, the second reference optical axis AX2 corresponds to the sight line reference axis extending in the Z direction corresponding to the front direction of the face of the observer. If the appearance is changed, as illustrated in FIG. 6, the first reference optical axis AX1 on the projection lens 30 side forms an obtuse angle α relative to the horizontal reference axis AX3 parallel to the X direction corresponding to the arrangement direction of the eye EY. In this case, it is assumed that the horizontal reference axis AX3 is perpendicular to the second reference optical axis (sight line reference axis) AX2, and passes through the intersection point between the first reference optical axis AX1 and the fourth surface S14. Under such assumption, the obtuse angle α formed by the first reference optical axis AX1 and the horizontal reference axis AX3 is 95° to 135°. Thus, it is possible to enhance the fitting property when the first image forming main unit 105a including the projection lens 30 and the light guide device 20 including the light guide member 10 are placed from the face along the side of the head, and result in facilitating of thinning and weight reduction of the device. In addition, since the obtuse angle α formed by the first reference optical axis AX1 and the horizontal reference axis AX3 is 95° or more, it is possible to prevent the connection portion of the projection lens 30 and the light guide member 10 from being formed into an angular shape and projecting from the face. Meanwhile, since the obtuse angle α formed by both axes AX1 and AX3 is 135° or less, it is possible to suppress the front end of the projection lens 30 and the portion corresponding to the video display element 82 from protruding from the side of the face or in the lateral direction. In addition, the obtuse angle α formed by both axes AX1 and AX3 is set to 105° or less in order to further reliably prevent the portion corresponding to the video display element 82 from projecting from the face. In other words, it is more preferable that the obtuse angle α formed by the first reference optical axis AX1 and the horizontal reference axis AX3 is 95° to 105°.

In addition, the first reference optical axis AX1 and the horizontal reference axis AX3 are placed on a reference plane HM extending along the XZ plane corresponding to the sheet surface of FIG. 6. The reference plane HM is a reference surface on optical design, but has become slightly downward toward the front, as illustrated in FIG. 3C. This is resulted from considering that it is natural to the observer that the eye EY is slightly downward, and the sight line towards the downward is less burdensome on the eye EY.

The light guide member 10 is inclined slightly outward with respect to the rotation angle around the Y axis perpendicular to the reference plane HM, relative to the horizontal reference axis AX3. Specifically, the first surface S11 or the third surface S13 of the light guide member 10 forms an inclination angle β relative to the horizontal reference axis AX3. As a result, as illustrated in FIG. 3A or the like, the first and second optical members 101a and 101b are placed so as to slightly project outward on the front end side or the center side sandwiched therebetween. Thus, it is possible to enhance the fitting property when the first and second optical members 101a and 101b are placed along the face.

Returning to FIG. 5, if a description will be made regarding the optical path of the video light GL, the video light GL which is incident on the fourth surface S14 of the light guide member 10 and passes through the fourth surface S14 proceeds while converging, is reflected from the fifth surface S15 having a relatively weak positive refractive power, when passing through the second light guiding portion 12, and is incident again and reflected from the inside of the fourth surface S14.

The video light GL reflected from the fourth surface S14 of the second light guiding portion 12 is incident on and is totally reflected from the third surface S13 having substantially no refractive power, and is incident on and is totally reflected from the first surface S11 having substantially no refractive power, in the first light guiding portion 11. The video light GL forms an intermediate image in the light guide member 10 that is a relay optical system before and after passing through the third surface S13. The image plane II of this intermediate image corresponds to the image plane OI of the video display element 82.

Although the video light GL that is totally reflected from the first surface S11 is incident on the second surface S12, in particular, the video light GL that has been incident on the half mirror layer 15 is partially transmitted through the half mirror layer 15 and partially reflected by the half mirror layer 15, and is incident again on and passed through the first surface S11. In addition, the half mirror layer 15 acts as having a relatively strong positive refractive power for the video light GL reflected therefrom. Further, the first surface S11 acts as not having a refractive power for the video light GL passing therethrough.

The video light GL that has passed through the first surface S11 is incident as substantially parallel light beam to the pupil of the eye EY of the observer or the equivalent position thereof. In other words, the observer observes image that is formed on the video display element (video element) 82, by the video light GL as a virtual image.

Although the light that is incident on the +X side rather than the second surface S12 of the light guide member 10, among the external light HL passes through the third surface S13 and the first surface S11 of the first light guiding portion 11, in this case, the third surface S13 and the first surface S11 are substantially parallel to each other (in other words, plane-shaped optical surfaces which are substantially parallel to each other), such that an aberration or the like hardly occurs. In other words, the observer observes the outside image with no distortion over the light guide member 10. Similarly, when the light that is incident on the −X side rather than the second surface S12 of the light guide member 10, among the external light HL, in other words, the light incident on the light transmitting member 50 passes through the third transmission surface S53 and the first transmission surface S51 provided therein, the third transmission surface S53 and the first transmission surface S51 are substantially parallel to each other, such that an aberration or the like does not occur. In other words, the observer observes the outside image with no distortion over the light transmitting member 50. Further, when the light that is incident on the light transmitting member 50 corresponding to the second surface S12 of the light guide member 10, among the external light HL passes through the third transmission surface S53 and the first surface S11, the third transmission surface S53 and the first surface S11 are substantially parallel to each other, such that an aberration or the like hardly occurs. In other words, the observer observes the outside image with less distortion over the light transmitting member 50. In addition, the second surface S12 of the light guide member 10 and the second transmission surface S52 of the light transmitting member 50 have substantially the same curved shape, substantially the same refractive index, and the gap therebetween is filled with an adhesive layer CC having substantially the same refractive index. In other words, the second surface S12 of the light guide member 10 and the second transmission surface S52 of the light transmitting member 50 do not act as a refractive surface for the external light HL.

However, since the external light HL that has been incident on the half mirror layer 15 is partially transmitted through the half mirror layer 15 and is partially reflected from the half mirror layer 15, the external light HL from the direction corresponding to the half mirror layer 15 is weakened to the transmittance of the half mirror layer 15. On the other hand, since the video light GL is incident from the direction corresponding to the half mirror layer 15, the observer observes an image formed on the video display element (video element) 82 in the direction of half mirror layer 15, and the outside image.

The light that has not been reflected from the half mirror layer 15, out of the video light GL that is propagated inside the light guide member 10 and incident on the second surface S12, enters the light transmitting member 50, but is prevented from being returning to the light guide member 10 by a reflection prevention unit, not illustrated, provided in the light transmitting member 50. In other words, the video light GL which has passed through the second surface S12 can be prevented from returning back on the optical path and becoming stray light. Further, the external light HL that has been incident from the light transmitting member 50 side and reflected from the half mirror layer 15 returns to the light transmitting member 50, but can be prevented from being emitted to the light guide member 10 by providing a reflection prevention unit in the light transmitting member 50. In other words, the external light HL which has been reflected from the half mirror layer 15 can be prevented from returning back on the optical path and becoming stray light.

Further, the right optical system drive unit 85 (change unit) is disposed in the periphery of the video display element 82. The right optical system drive unit 85 includes, for example, an actuator (not illustrated), and swings the optical device unit 130 including the video display element 82 and the projection lens 30. Thus, the angle of the optical device unit 130 relative to the light guide member 10 changes in the directions of arrows SA1 and SA2 in FIG. 5. If the optical device unit 130 is inclined in the SA1 direction, the angle of the video light GL incident on the light guide member 10 from the projection lens 30 changes. In other words, since the reflection angle of the video light GL inside the light guide member 10 is changed by the first reference optical axis AX1 being inclined to the SA1 side, the video light GL incident on the eye EY moves in the direction of the arrow SA2 in FIG. 5. The first display 100A in FIG. 5 corresponds to the right eye of the user, the video light GL moves towards the SA2 direction, and thus the video light GL appears by being moved to the right side in the user.

In contrast, when the right optical system drive unit 85 swings the optical device unit 130 in the SB1 direction, the angle of the video light GL relative to the light guide member 10 of the first reference optical axis AX1 changes to the SB1 side. Thus, the reflection angle of the video light GL of the light guide member 10 changes, the optical axis (second reference optical axis AX2) of the video light GL incident on the eye EY changes to the arrow SB2 side. For this reason, the video light GL appears by being moved to the left side in the right eye of the user.

In this manner, in the first display 100A, it is possible to move the video light GL incident on the eye EY on the right side of the user towards the left and right direction, by the right optical system drive unit 85 moving the optical device unit 130.

Further, a left optical system drive unit 87 (FIG. 9) that moves the optical device unit 130 is provided in the second display 100B. The left optical system drive unit 87 (change unit) includes an actuator (not illustrated) and the like as a power source, similar to the afore-mentioned right optical system drive unit 85, and changes the inclination of the video light GL relative to the light guide member 10, by swinging the optical device unit 130. It is possible to change the inclination of the video light GL incident on the left eye of the user and moves the video light GL towards the left and right direction by the operation of the left optical system drive unit 87.

Figure 7C:
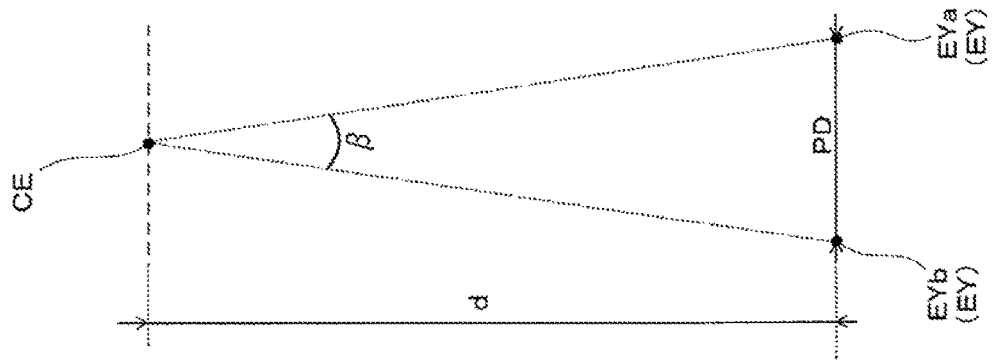
FIGS. 7A to 7C are explanatory diagrams illustrating a viewing distance and a convergence angle of an observer.
Figure 7B:
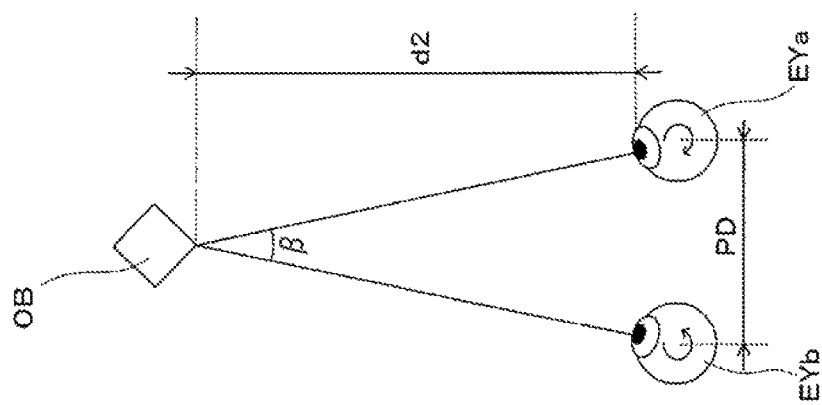
Figure 7A:
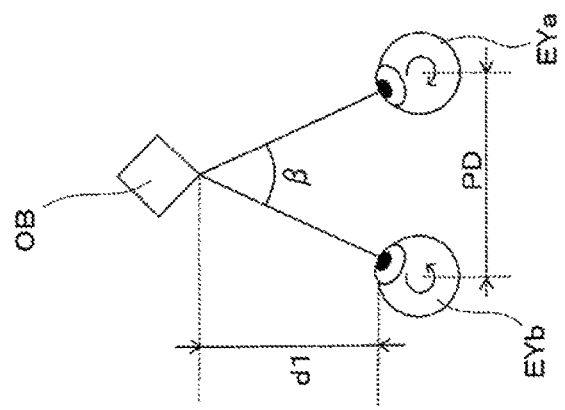
Figure 8:
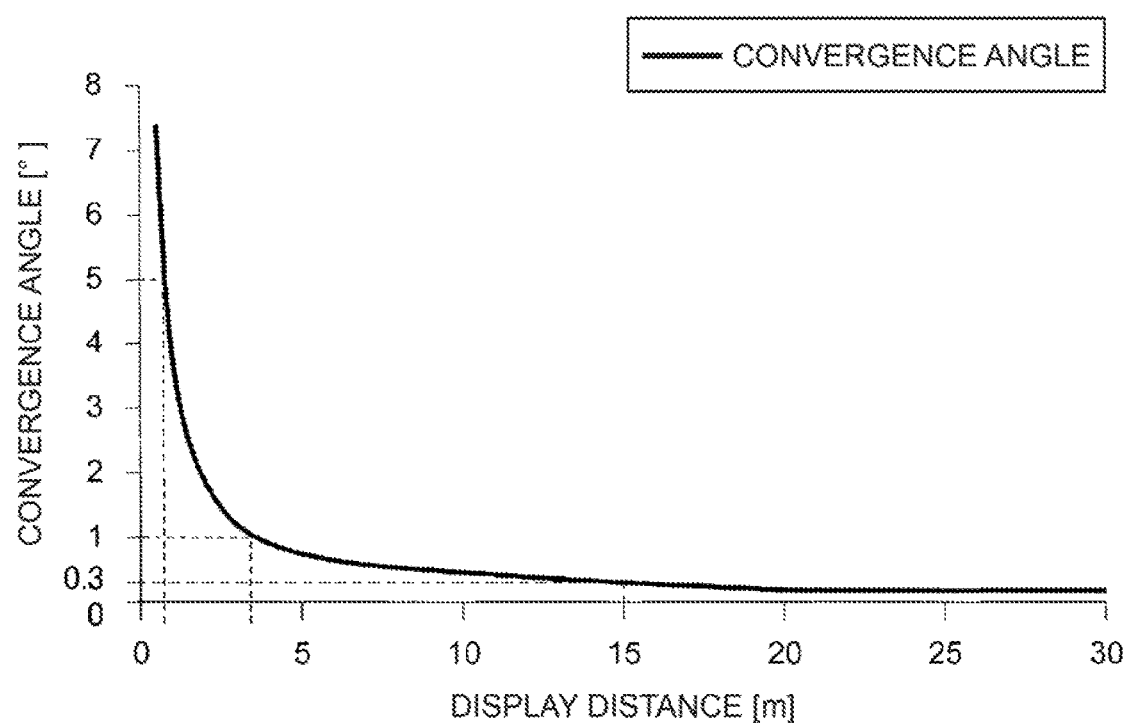
FIG. 8 is chart illustrating a relationship between a convergence angle and a display distance.

FIGS. 7A to 7C are explanatory diagrams illustrating the viewing distance of the observer and the convergence angle, and FIGS. 7A and 7B compare different viewing distances. Further, FIG. 7C is a diagram illustrating a relationship between a convergence angle $\beta$, a pupillary distance PD, and a viewing distance d. FIG. 8 is a chart illustrating a relationship between the convergence angle $\beta$ and a display distance.

If comparing FIG. 7A with FIG. 7B, an example of FIG. 7A illustrates a state where the observer views an object OB by placing the object OB relatively close to (distance d1) both eyes EYa and EYb, and FIG. 7B illustrates a state where the observer views the object OB by placing the object OB relatively remote from (distance d2; d2>d1) both eyes EYa and EYb. When viewing the object OB in the close position as illustrated in FIG. 7A, since both eyes EYa and EYb are close to the inside, the value of convergence angle $\beta$ that is the angle formed by the sight lines of the right and left eyes EYa and EYb increases. In contrast, as illustrated in FIG. 7B, if the observer views the object OB by placing the object OB relatively remote from both eyes EYa and EYb, the value of the convergence angle $\beta$ is reduced.

When the observer views an image with both eyes as the virtual image display 100 of the present embodiment, the convergence angle which is an angle between the display object and the right and left eyes has an important role with respect to understanding of the sense of distance of the video light. The convergence angle $\beta$ is determined by the effect due to the parallax between the left and right eyes for the image displayed. The larger the convergence angle $\beta$ is, the nearer the observer feels the position of the image, and the smaller the convergence angle $\beta$ is, the farther the observer feels the position of the image. For example, as illustrated in FIG. 7C, if the pupillary distance PD (a distance between the right eye and the left eye) of the observer is assumed to be 65 mm, the relationship between the convergence angle $\beta$ about the center point CE of the virtual image that is viewed as one point in the center of the image, in other words, one point that is at the front in the direction of main light beam, and the display distance d that is a distance from the assumed position of the virtual image by the video light to the positions of the eyes EYa and EYb (assumed eye position EY) is represented by the graph illustrated in FIG. 8. In other words, in FIG. 8, the horizontal axis represents the display distance d(m), and the vertical axis represents the convergence angle $\beta(°)$. In this case, for example, if the value of the convergence angle $\beta$ is 1.0°, the display distance d is approximately 4 m (or about 4 m); and if the value of the convergence angle $\beta$ is 5.0°, the display distance d is several tens of cm.

As mentioned above, the convergence angle $\beta$ for determining the sense of distance of the observer is determined by the parallax (convergence angle $\beta$) which is set in the transmission-type display 100. The angle of the main light beam in the case where a virtual image display 100 displays an image corresponds to the convergence angle between the eyes of the observer who views the image. In other words, adjusting the display position of the image can affect the convergence angle when the observer views the image. Therefore, it is possible to cause the user to feel the same viewing distance as the real object, by adjusting the display position and the like of the image in accordance with the convergence angle when the observer sees a real object.

For example, if performing displaying suitably for the state where the convergence angle $\beta$ is any value in the range of 1.0° to 5.0°, it is preferable for case where the observer PE views a real object (object) OB in the nearby. In this example, in the state where the observer PE has the object OB in his hand, the observer performs an operation on the virtual image IM that is an image viewed as being located in an assumed display position by the video light from the transmission-type display 100, while viewing occasionally the virtual image IM at substantially the same position as the object OB. In other words, it is possible to display an image that is seen similar to the object OB that is located nearby. Further, when the observer views an image while viewing the object OB located in a position far away from the observer PE, various types of displays are possible in such a manner that the value of the convergence angle $\beta$ is adjusted to be greater than 5.0°. In other words, since parallax in any of the ranges, in other words, the value of the convergence angle $\beta$ is appropriately set according to the usage type, in many cases among usage types in a wide variety of work places, it is possible for the observer to experience the world of augmented reality (AR) of an appropriate sense of distance.

Further, for example, when it is assumed that an observer is allowed to view the video light in the state of watching the image that is relatively far, such as watching movies, it is possible to display the usage type in which the display distance is far (for example, d=about 25 m). In this case, the value of the convergence angle $\beta$ is considered to be, for example, about 0.15°. The case of this type is considered to be suitable for the usage such as watching a video in a relaxed state.

In the present embodiment, since an optical structure is used in which a pair of left and right displays 100A and 100B are inclined and disposed, parallax is given to the left and right images by inclining the main light beam relative to the left and right video light. Thus, it is possible to make the virtual image IM be at substantially the same position as the image of the real object MA present at the hand of the observer, depending on the setting angle of the parallax, for example, as illustrated in FIG. 5A and the like. Further, the virtual image IM and the object image can be viewed by being overlapped at the same position, and association with the augmented reality (AR) is possible. Further, in this case, the state of the convergence angle between the eyes of the observer naturally fits the target display position without difficulty, by inclining the main light beams PRa and PRb in accordance with the parallax. Further, since the image display position of the viewed virtual image IM fits the display distanced corresponding to the value of an angle $\theta$ indicating the parallax, by adjusting the focal length, in a pair of the left and right displays 100A and 100B, a so-called inconsistency problem of the convergence angle and regulation is also avoided or suppressed in which the convergence angle and the regulation do not match.

Further, as illustrated in FIG. 8, as the viewing distance of the observer becomes longer, the convergence angle $\beta$ is close to 0; for example, and when the viewing distance is 15 m, the convergence angle is 0.3°. In other words, when the convergence angle $\beta$ is 0.3° or less, the viewing distance is felt 15 m or more. In this case, since the observer is less likely to feel a change in the viewing distance by the angle or more, when the convergence angle $\beta$ is 0.3° or less, the convergence angle may be regarded as almost zero. In the present embodiment, the control unit 140 can display the image respectively corresponding to the right eye and the left eye of the observer by the virtual image display 100, in the state without the left and right parallaxes, but the convergence angle in this case is almost zero. Specifically, it can be said that the convergence angle is 0.3° or less, or 0.3° or less and 0.0° or more.

As illustrated in FIG. 1 and FIG. 3B, the virtual image display 100 includes outer cameras 35 and 36 (a second imaging unit and an external imaging unit) that capture the sight line direction. The outer camera 35 is embedded and provided in the first image forming main unit 105a located in the end portion on the right side of the virtual image display 100, in other words, the first display 100A side, and exposed at the exterior member 105d. Further, the outer camera 36 is embedded and provided in the second image forming main unit 105b located in the end portion on the left side of the virtual image display 100, in other words, the second display 100B side, and exposed at the exterior member 105d.

The outer cameras 35 and 36 are disposed in the exposed surface of the front side (outer side) of the virtual image display 100, face substantially the front surface direction of the face of the user, and capture an outside scene transmitted through the light guide member 10 that the user views. The imaging range of the outer cameras 35 and 36, in other words, the angle of view may be set such that at least a portion of the outside scene in the viewing direction of the user is captured in the state where the virtual image display 100 is mounted. Further, it is more preferable that the angles of view of the outer cameras 35 and 36 are set so as to be capable of capturing the entire field of view visible to the user through the light guide member 10. In other words, it is preferable that the imaging ranges of the outer cameras 35 and 36, in other words, the angle of view is the direction including the sight line direction of the user.

The outer cameras 35 and 36 are connected to the control unit 140 (FIG. 9) which the control device 300 is built into, performs imaging in response to the control of the control unit 140, and output captured image data. Since the outer camera 35 and the outer camera 36 are located away in the left and the right in the frame portion 102, parallax occurs between the captured image of the outer camera 35 and the captured image of the outer camera 36. Therefore, it is possible to obtain information in the depth direction, based on the captured image of the outer camera 35 and the captured image of the outer camera 36, using the outer cameras 35 and 36 as a stereo camera.

Figure 4:
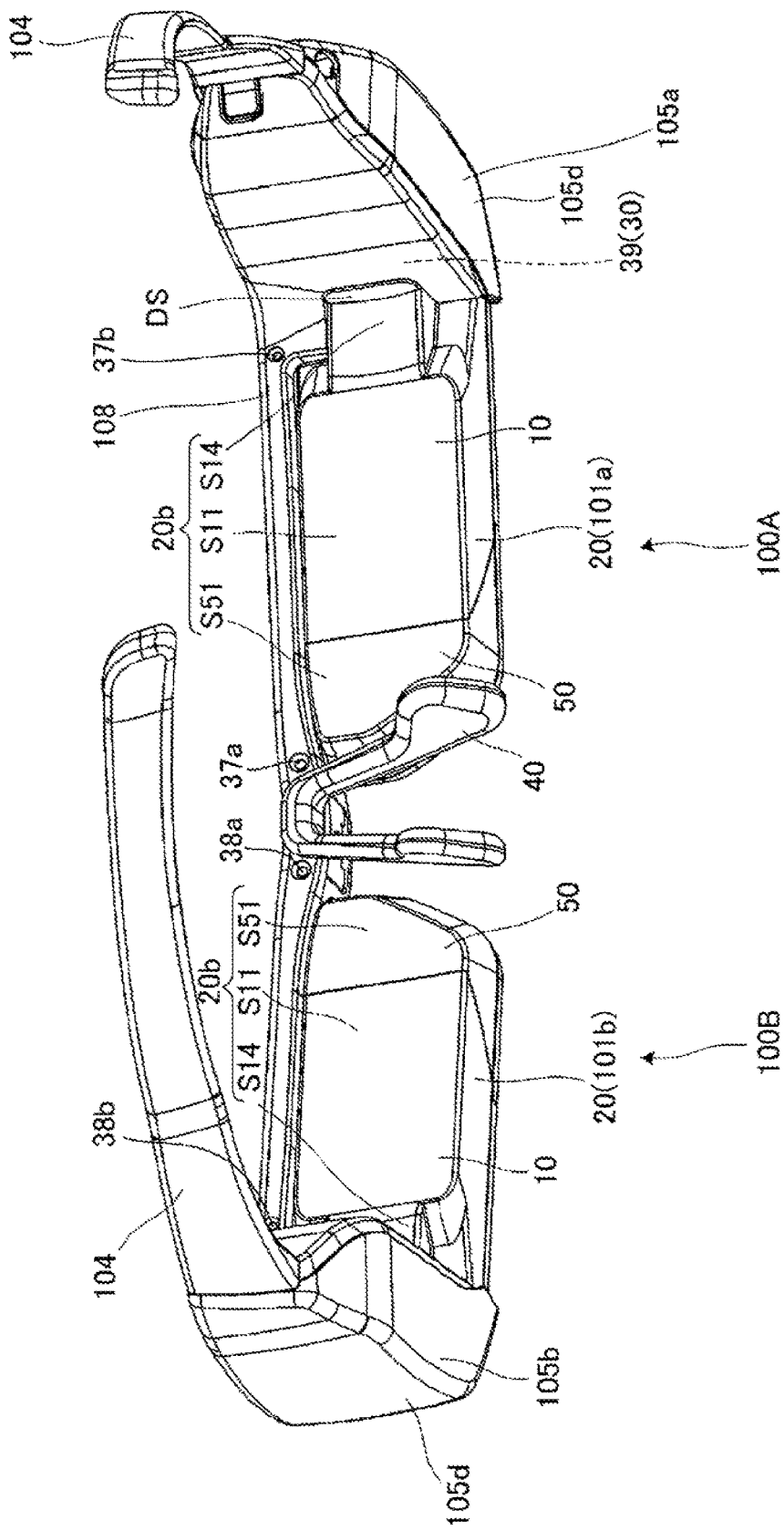
FIG. 4 is a perspective view illustrating an appearance of the virtual image display from a different angle.

The virtual image display 100 includes four inner cameras 37a, 37b, 38a, and 38b (a first imaging unit) in the exposed surface, on the side facing the eye of the user, in other words, the back side (inner side), as illustrated in FIG. 4. The inner cameras 37a and 37b correspond to the right eye of the user, and are provided in the first display 100A; and the inner cameras 38a and 38b correspond to the left eye of the user, and are provided in the second display 100B. The inner cameras 37a and 38a are disposed in the vicinity of the nose receiving portion 40, and the inner cameras 37b and 38b are disposed at the end portion of the frame portion 102.

The inner camera 37a captures the right eye of the user from the upper left side, and the inner camera 37b captures the right eye of the user from the upper right side. Further, the inner camera 38a captures the left eye of the user from the upper right side, and the inner camera 38b captures the left eye of the user from the upper left side.

The inner cameras 37a, 37b, 38a, and 38b are respectively connected to the control unit 140 (FIG. 9) of the control device 300 to be described later, and performs imaging in response to the control of the control unit 140, and output captured image data. Since the inner cameras 37a, 37b, 38a, and 38b capture the eye ball of the user, it is possible to perform detection and measurement of the eye ball movement, and obtain the sight line direction of the user and the convergence angle, by using the captured image.

As a technique of detecting the eye ball movement, and measuring the sight line direction by capturing the eye ball, there is, for example, a method of detecting a reflected image that reflects to the eye ball, from the captured image, and measuring the sight line direction. Further, for example, there is a method of detecting the pupil center of the eye ball from the captured image and determining the gaze direction. Further, there is a method of providing a light emitting element (not illustrated) that emits infrared light to the eye ball, in the exposed surface on the back side of the virtual image display 100, detecting the light reflected on the eye ball surface by using the inner cameras 37a, 37b, 38a, and 38b, and obtaining the gaze direction.

As an example in the present embodiment, the control unit 140 performs the following (1) to (3) processes, on the right eye and the left eye of the user from the captured image of the inner cameras 37a, 37b, 38a, and 38b.

(1) A process of obtaining the pupillary distance by detecting the pupil center.

(2) A process of obtaining the pupil diameter by detecting a pattern of the iris appearing on the pupil.

(3) A process of obtaining the gaze direction by detecting the pupil center.

Subsequently, the configuration of the control device 300 will be described.

The control device 300 is a device for controlling the HMD 1. As illustrated in FIG. 1, the control device 300 includes a power switch 301 for turning on/off the power of the HMD 1, and a track pad 302 and a key switch unit 303 that the user operates, in a substantially box-like case. Further, the control device 300 includes a light emitting diode (LED) indicator 304 indicating the operating status of the HMD 1, and a up and down key 305 for performing adjustment and the like of the sound volume output from the right earphone 32 and the left earphone 34.

The power switch 301 is a slide-type switch, and not only the power of the control device 300 but also the power of the virtual image display 100 are turned on/off by the operation of the power switch 301.

The track pad 302 detects the contact operation of user on the operation surface of the track pad 302, and outputs the operation data indicating the detected operation position. As the track pad 302, various track pads such as an electrostatic type, a pressure detection type, an optical type can be employed. Further, a multi-touch type capable of simultaneously detecting the touch operation in a plurality of points may be employed.

Figure 9:
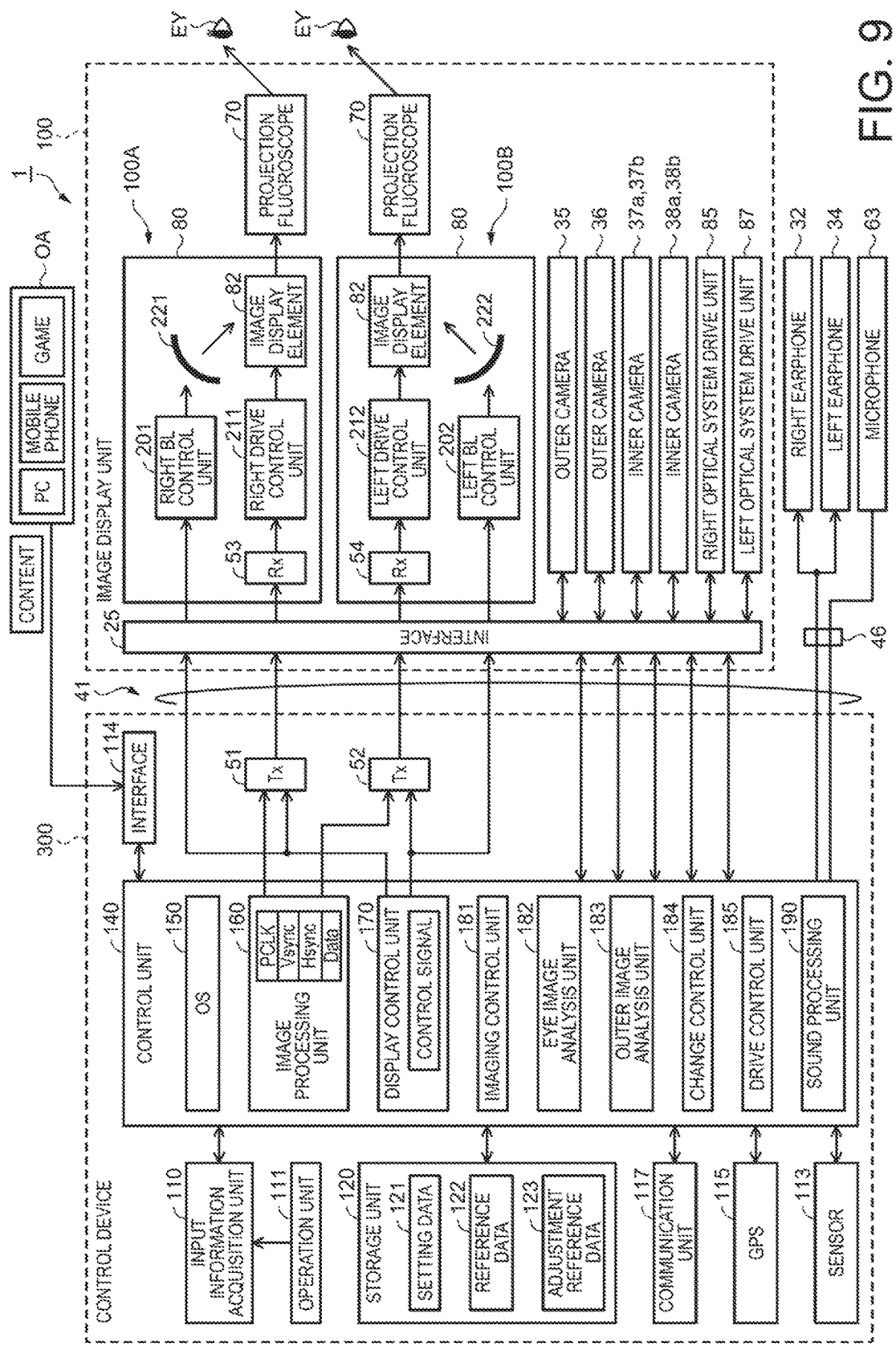
FIG. 9 is a functional block diagram of respective parts of the HMD.

FIG. 9 is a function block diagram of respective units constituting the HMD 1.

As illustrated in FIG. 9, the HMD 1 is connected to an external device OA through an interface 114. Through the interface 114, various external devices OA which are supply sources of the content are connected to the control device 300. As the interface 114, for example, it is possible to use an interface corresponding to wired connection such as a USB interface, a microphone USB interface, and an interface for the memory card.

The external devices OA is used as an image supply apparatus for supplying images to the HMD 1, for example, a personal computer (PC), a mobile phone terminal, a game terminal or the like is used.

The control device 300 includes a control unit 140, an operation unit 135, an input information acquisition unit 110, a storage unit 120, and a transmission unit (Tx) 51, and a transmission unit (Tx) 52.

The operation unit 135 detects an operation by the user. The operation unit 135 includes the power switch 301, the track pad 302, the key switch unit 303, and the up and down key 305, which are illustrated in FIG. 1. The input information acquisition unit 110 acquires an operation signal or operation data that are output from the operation unit 135, in response to the operation input by the user.

The storage unit 120 is a non-volatile storage device, and stores various computer programs. Further, the image data displayed in the virtual image display 100 of the HMD 1 may be stored in the storage unit 120. Further, the control unit 140 may generate the display data that is displayed in the virtual image display 100, by executing the program stored in the storage unit 120.

A three-axis sensor 113, a GPS 115, and a communication unit 117 are connected to the control unit 140. The three-axis sensor 113 is an acceleration sensor of three axes, and the control unit 140 can acquire the detected value of the three-axis sensor 113. The GPS 115 includes an antenna (not illustrated), and receives a global positioning system (GPS) signal so as to obtain the current position of the control device 300. The GPS 115 outputs the current position and the current time that are obtained based on the GPS signal to the control unit 140. The GPS 115 may have a function of acquiring the current time on the basis of the information contained in the GPS signal, and correcting the time that the control unit 140 of the control device 300 measures.

The communication unit 117 performs wireless data communication conforming to a wireless communication standard such as a wireless LAN (WiFi (registered trademark)), and Miracast (registered trademark). Further, the communication unit 117 can perform wireless data communication conforming to a near filed wireless communication standard such as Bluetooth (registered trademark), Bluetooth Low Energy, RFID, and Felica (registered trademark).

If the external device OA is wirelessly connected to the communication unit 117, the control unit 140 acquires content data from the communication unit 117, performs control for displaying an image on the virtual image display 100. Meanwhile, when the external device OA is connected to the interface 114 in a wired manner, the control unit 140 acquires the content data from the interface 114, and performs control for displaying an image on the virtual image display 100. Thus, the communication unit 117 and the interface 114 are collectively referred to as a data acquisition unit DA, hereinafter.

The data acquisition unit DA acquires the content data from the external device OA. The data acquisition unit DA acquires image data displayed on the HMD 1 from the external device OA.

The control unit 140 includes a CPU, a ROM, a RAM (all are not illustrated) and the like. The control unit 140 controls each unit of the HMD 1 by reading and executing the program stored in the storage unit 120 or the ROM. In addition, the control unit 140 executes the programs, and functions as an operating system (OS) 150, an image processing unit 160, a display control unit 170, an imaging control unit 181, an eye image analysis unit 182, an outer image analysis unit 183, a change control unit 184, a drive control unit 185, and a sound processing unit 190.

The image processing unit 160 acquires the image signal that is included in the content. The image processing unit 160 transmits a synchronization signal for displaying the image included in the content, such as a vertical synchronization signal VSync and a horizontal synchronization signal HSync, a clock signal PCLK, and digital image data (Data in FIG. 9) by the transmission unit 51. In addition, the image processing unit 160 may execute image processes such as a resolution conversion process, various color correction processes such as brightness and chroma adjustment, a keystone correction process on the image data, as necessary. The transmission units 51 and 52 function as a transceiver for serial transmission between the control device 300 and the virtual image display 100.

The display control unit 170 transmits a control signal to the image display 80 provided in the virtual image display 100. The display control unit 170 transmits a control signal to the right backlight control unit 201 and the left backlight control unit 202, which control the lighting of the right backlight 221 and the left backlight 222 provided in the image display 80. In addition, the display control unit 170 transmits a control signal to the right drive control unit 211 and the left drive control unit 212, which drive the video display element 82.

The right backlight control unit 201 and the left backlight control unit 202 performs the control of the lighting and the extinction and the control of the light emitting brightness for each of the right backlight 221 and the left backlight 222, in response to the control signal received from the display control unit 170. The right backlight 221 and the left backlight 222 is, for example, a light emitting material such as an LED or an electroluminescence (EL), and may be made by using a laser light source or a lamp.

Further, the right drive control unit 211 and the left drive control unit 212 switch the drive on/off of the video display element 82, in response to the control signal received from the display control unit 170. Therefore, the lighting and extinction of the backlights in the first display 100A and the second display 100B and the display of an image by the video display element 82 are controlled by the control of the display control unit 170.

The sound processing unit 190 acquires an audio signal included in the content, amplifies and outputs the acquired audio signal, to the right earphone 32 and the left earphone 34 through the audio cable 46.

In addition, the sound processing unit 190 converts the audio collected by the microphone 63 into digital data. The sound processing unit 190 performs for example, a speaker recognition process or an audio recognition process, by extracting and modeling features from the digital audio data. In the speaker recognition process, human voice is detected from the audio collected by the microphone 63, the detected voice of human is identified for each person, and a speaking person is specified for each voice. Furthermore, in the audio recognition process, for example, the audio collected by the microphone 63 into a text is performed.

The virtual image display 100, as described above, includes a projection fluoroscope 70, and an image display 80, for each of the first display 100A and the second display 100B, and the image display 80 is connected to the control unit 140 through the interface 25.

In addition, the outer cameras 35 and 36, the inner cameras 37a, 37b, 38a, and 38b, the right optical system drive unit 85, and the left optical system drive unit 87, which are included in the virtual image display 100, are connected to the control unit 140 through the interface 25.

The interface 25 includes connection cables 41, a connector for connecting the connection cables 41, and the like, and may include a wireless communication line, instead of the connection cable 41. The interface 25 outputs a clock signal PCLK that is transmitted by the transmission unit 51, the vertical synchronization signal VSync, the horizontal synchronization signal HSync, and the image data Data, to the corresponding reception unit (Rx) 53 or 54. In addition, the interface 25 outputs the control signal that is transmitted by the display control unit 170, to the reception units 53 and 54, and the image display 80.

Further, the interface 25 transmits and receives the control signal by which the control unit 140 controls the outer cameras 35 and 36, and the inner cameras 37a, 37b, 38a, and 38b, and the captured image data of these cameras.

In addition, without being illustrated, the virtual image display 100 may be provided with a vibration sensor and a motion sensor. The vibration sensor (not illustrated) is configured by using, for example, an acceleration sensor. When the user performs an operation of tapping the frame portion 102 (a knocking operation), the vibration sensor detects the vibration caused by this operation. It is possible to use an acceleration sensor, an angular velocity sensor, a geomagnetic sensor, or the like as the motion sensor. For example, a nine-axes sensor functioning an acceleration sensor (three-axes), an angular velocity sensor (three-axes), and a geomagnetic sensor (three-axes), or the like may be implemented. In this case, the movement of the virtual image display 100, in other words, the control unit 140 can control the movement and the direction of the head of the user wearing the virtual image display 100. The vibration sensor and the motion sensor are connected to the control device 300 through the interface 25.

The reception units 53 and 54 function as a receiver for the serial transmission between the control device 300 and the virtual image display 100.

The HMD 1 is provided with a function of adjusting the display mode of the image displayed on the virtual image display 100, corresponding to the sight line direction (gaze direction) of the user wearing the virtual image display 100.

FIGS. 10A and 10B and FIGS. 11A to 11C are explanatory diagrams illustrating a method of adjusting the display mode of an image. The adjustment of the display mode of the image will be described with reference to FIGS. 10A and 10B and FIGS. 11A to 11C.

Figure 10A:
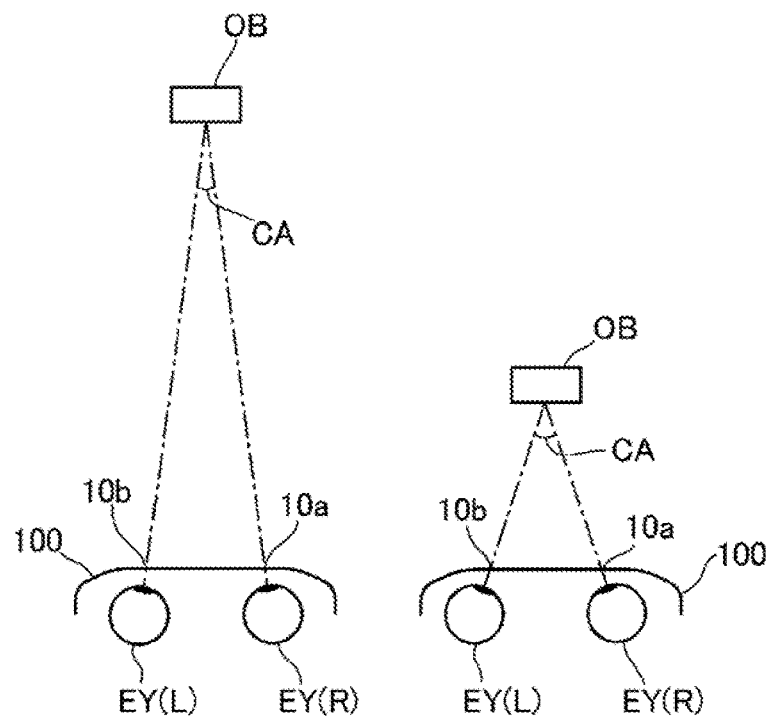
FIGS. 10A and 10B are explanatory diagrams illustrating an adjustment method of a display mode of an image.

FIG. 10A is a schematic diagram illustrating the gaze distance and the convergence angle of the user.

When the user views an outside scene, in other words, the object OB located in the real space, transmitted through the light guide member 10, the convergence angel CA of the left and right eyes change, depending on the distance (gaze distance) between the object OB and eye EY. The example on the left side of FIG. 10A illustrates a state where the object OB is located at a remote position, and the example on the right side of FIG. 10A illustrates a state where the object OB is located at a near position.

A so-called eye ball convergence movement has been known in which the sight line moves closely to the center of both eyes when the observer gazes a single object OB with both eyes, as the eye ball movement of the human. As illustrated in FIG. 10A, if it is considered that the sight lines (dashed lines in FIG. 10A) of the right eye (EY(R) in FIG. 10A) and the left eye (EY(L) in FIG. 10A) intersect with the object OB, the intersecting angle CA corresponds to the convergence angle. The farther the object to be gazed is, the smaller the convergence angle CA is. The closer the object to be gazed is, the greater the convergence angle CA is. In other words, as the object OB is in a close location, the sight lines of both eyes of the user become closer to the center.

It is assumed that a position where the sight line of the right eye EY of the user intersects with the light guide member 10 is a position 10a, and a position where the sight line of the left eye EY intersects with the light guide member 10 is a position 10b. The distance between the position 10a and the position 10b varies depending on the distance from the eye EY to the object OB, similar to the size of the convergence angle CA described above. In other words, the distance between the position 10a and the position 10b has a correlation with the convergence angle CA, specifically, the larger the convergence angle CA is, the smaller the distance between the position 10a and the position 10b is; and the smaller the convergence angle CA is, the larger the distance between the position 10a and the position 10b is.

Further, the distance between the position 10a and the position 10b is affected by the pupillary distance between both eyes of user. The pupillary distance can be obtained based on the images captured by the inner cameras 37a, 37b, 38a, and 38b.

When the user views an outside scene transmitted through the light guide member 10, the HMD 1 displays an image to be viewed by being overlapped with the outside scene. As one mode of the display, it is possible to display an image with a so-called augmented reality (AR) effect (hereinafter, referred to as an AR image), which provides information about the outside scene that is a real space. The AR image is displayed such that the information about the object existing in the real space overlaps the object, or is aligned with the object. By viewing the AR image, the user can see the object and various types of information about the object at the same time. The characteristic of displaying the AR image is in displaying the AR image in accordance with the position where the object is visible to user.

When performing the AR display, the sight line of the user gazes at the object OB existing in the real space.

When performing the AR display, the HMD 1 can adjust the display size, the display colors, and the like of the AR image or the display object that is included in the AR image (an image, a figure, a character, and the like) in order to harmonize the AR image to the outside scene. The display mode of displaying the display object, that is displayed so as to overlap the object OB, in the front of the object OB in an overlapping manner, and a display mode of displaying the display object to be visible behind the object OB in an overlapping manner may be switched. Furthermore, the display object may be displayed to be viewed in a display manner that a shadow added to the display object, by performing an image processing on the AR image.

Further, as another mode of the display of the HMD 1 when the user views an outside scene transmitted through the light guide member 10, there is a mode of displaying an image including various images and characters, without being limited to information on the object that the user gazes. In this case, a process of fitting the image to the position where the object is viewed by the user is not performed, or an image is displayed on the end or the like of the field of view of the user so as not to interfere in viewing the object. This kind of display is performed, for example, when the user views the outside scene while viewing the content of the document. Even in the case of performing this display, when the user gazes at the object OB existing in the real space and views the display image of the HMD 1, the sight line of the user is away from the object OB and the display image is gazed.

Even in any example, the user views the object OB in a real space, and views the display image of the HMD 1, as necessary. The sight line when the user gazes at the object OB passes through the positions 10a and 10b in the light guide member 10. If the position where the HMD 1 displays the image by the virtual image display 100 is the position according to the positions 10a and 10b, it is not necessary for the user to largely move the sight line when the user views the object OB and views the display image of the HMD 1.

Thus, the HMD 1 controls the display mode such that the user can view the display image without largely moving the sight line, depending on the distance (gaze distance) to the object OB of the outside scene that the user gazes. As an example of the control of the display mode in the present embodiment, a description will be made regarding a case of controlling the position where the user views (views) the display image, in other words, the display position.

Figure 10B:
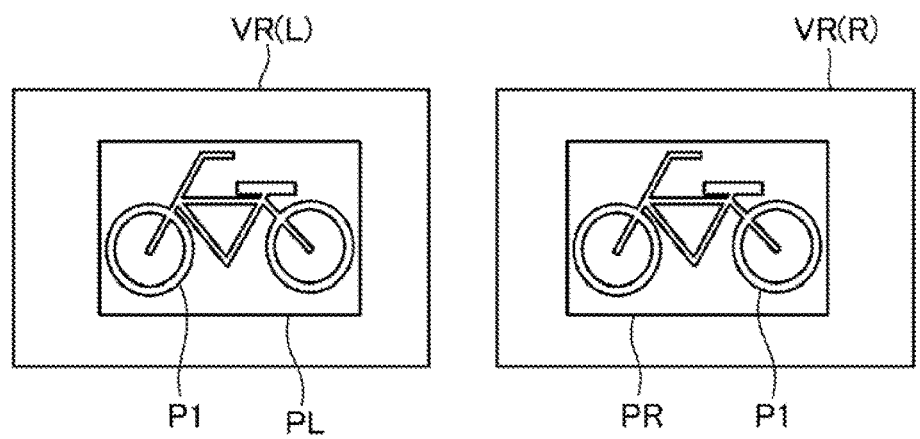

FIG. 10B is a diagram schematically illustrating the field of view of both eyes of the user. The field of view VR(L) of the left eye EY is illustrated on the left of FIG. 10B, and the field of view VR(R) of the right eye EY is illustrated on the right of FIG. 10B.

There are display images PL and PR that are generated by the image display 80 and projected by the projection fluoroscope 70, in the field of view VR(L) and the field of view VR(R) of the user. Since the projection fluoroscope 70 is intended to input the video light GL to the eye EY so as to allow the user to perceive (view) the virtual image, the projection fluoroscope 70 is not a physical display surface for displaying the display images PL and PR in front of the eye EY. However, since the user views an image occupied in a part of the field of views VR(L) and VR(R), by the video light GL, here, a description will be made on the assumption that the video light GL schematically forms the display images PL and PR.

The display images PL and PR are a maximum area where the virtual image display 100 can display the image, and can be referred to as a viewable area. The image P1 in FIG. 10B is an image that is actually displayed in the display images PL and PR that are a display-capable range of the virtual image display 100. In the example of FIG. 10B, the user can view the image P1 with both eyes at the same time.

If the image P1 of the field of view VR(L) is close to the position 10b and the image P1 of the field of view VR(R) is close to the position 10a, the user can view the object OB and the image P1, without largely moving the sight line. In this case, since the movement in the depth direction (distance direction) of the sight line of the user is small, the user is less likely to feel burdensome on the eye due to the focusing adjustment of the distance direction. Therefore, when user view the object OB in the real space and a display image of the virtual image display 100, for example, alternately, the load on the vision of the user can be effectively reduced.

Hereinafter, the display control executed by the HMD 1 will be described in detail.

Figure 11A:
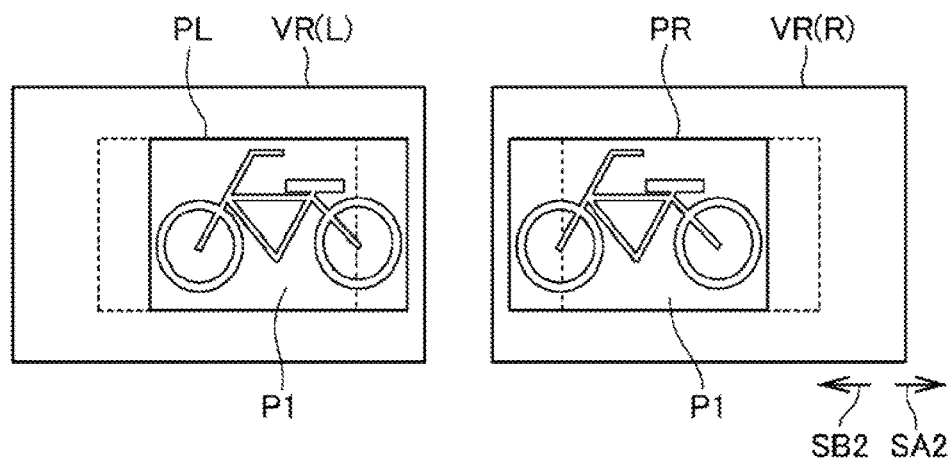
FIGS. 11A to 11C are explanatory diagrams illustrating an adjustment method of a display mode of an image.
Figure 11B:
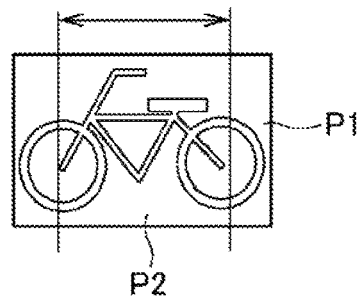
Figure 11C:
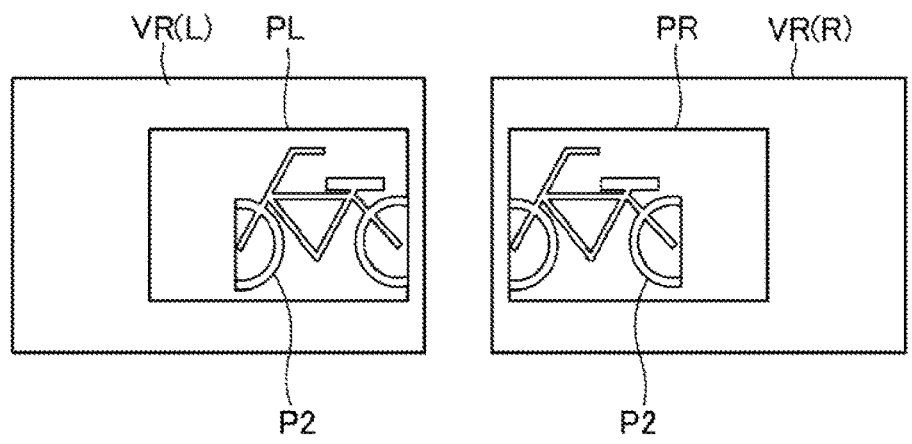

FIG. 11A illustrates an operation of adjusting a display position by a mechanical operation, and FIGS. 11B and 11C illustrate an operation of adjusting a display position by an image process.

The control unit 140 can change the angle of the optical device unit 130 relative to the light guide member 10, by the right optical system drive unit 85 and the left optical system drive unit 87 described above, in the first display 100A and the second display 100B. Since the position of the video light GL incident from the light guide member 10 to the right eye EY varies, by the operation of the right optical system drive unit 85, the display image PR of the field of view VR(R), in other words, a viewable area moves. Similarly, since the position of the video light GL incident from the light guide member 10 to the left eye EY varies, by the operation of the left optical system drive unit 87, the display image PL of the field of view VR(L), in other words, a viewable area moves. If the display images PL and PR move, it is possible to vary the position where the user can view the image P1, without changing the position of the image P1 of each of the display images PL and PR. Further, as illustrated in FIG. 11A, since the display images PL and PR are adjusted in accordance with the distance between the position 10a and the position 10b (FIG. 10A), the movement direction of the display image PL of the field of view VR(L) and the movement direction of the display image PR of the field of view VR(R) are opposite to each other. Therefore, the direction in which the right optical system drive unit 85 moves the optical device unit 130 and the direction in which the left optical system drive unit 87 moves the optical device unit 130 are opposite to each other.

The control unit 140 can change the position where the image P1 is displayed in the display image PL and the position where the image P1 is displayed in the display image PR, by performing an image process. The image process can be performed independently from the control for moving the right optical system drive unit 85 and the left optical system drive unit 87, and can be implemented as for example, software.

When moving the position of the image P1 of the display images PL and PR, the control unit 140 makes the display size of the image P1 smaller than the size of the display images PL and PR. Here, the control unit 140 may reduce the image P1, but may generate the image P2 for display by cutting out a portion of the image P1 so as to control the display position of the image P2. The process of cutting out the image P2 may be performed by the image processing unit 160 (an image generation unit).

For example, as illustrated in FIG. 11B, the image P2 is formed by cutting out a portion close to the center of the image P1, and as illustrated in FIG. 11C, the image P2 is displayed in the respective display images PL and PR. The display position of the image P2 of each of the display images PL and PR is adjusted according to the distance between the position 10a and the position 10b (FIG. 10A). Therefore, the movement direction of the image P2 in the display image PL, and the movement direction of the image P2 in the display image PR are opposite to each other.

In this manner, the control unit 140 can perform the mechanical adjustment to move the components of the projection fluoroscope 70 and the image display 80 by using the right optical system drive unit 85 and the left optical system drive unit 87, and the adjustment of the display position by an image process, respectively. Further, it is possible to adjust more effectively the display position by combining and executing the mechanical adjustment and the adjustment by the image process.

Further, the positions of the display images PL and PR are set so as to be suitable to the value of a predetermined convergence angle CA, in the initial state in which the control unit 140 does not control the display mode (display position) illustrated in FIGS. 11A to 11C. The convergence angle CA corresponding to this initial position (the default position) is, for example, in a range of 1° (degree) or more and 5° or less, and more specifically, is in a position suitable to the case where the distance from the eye EY of the user to the object OB is 4 m.

In another example, as compared to the case where the sight lines of both eyes of the user are directed to the exact front (the distance to the object OB is infinity), it is preferably that the sight line direction is in a range of 0.2° to 2°. In this case, it is possible to adopt 65 mm as a standard value of the pupillary distance (PD) of the user.

In order to perform the adjustment, the control unit 140 includes an imaging control unit 181, an eye image analysis unit 182, an outer image analysis unit 183, a change control unit 184, and a drive control unit 185.

The imaging control unit 181 controls each of the outer cameras 35 and 36, and the inner cameras 37a, 37b, 38a, and 38b so as to perform imaging, and acquires the captured image data.

The eye image analysis unit 182 analyzes the captured image data of the inner cameras 37a and 37b so as to generate data about the state of the right eye EY of the user wearing the virtual image display 100. Further, the eye image analysis unit 182 analyzes the captured image data of the inner cameras 38a and 38b so as to generate data about the state of the left eye EY of the user.

The outer image analysis unit 183 detects the object OB that is present in the direction that the user gazes at, by analyzing the captured image data of the outer cameras 35 and 36, and obtains the distance to the object OB. The outer cameras 35 and 36 function as a stereo camera separated from each other as described above. The outer image analysis unit 183 detects the parallax of the captured image of the outer camera 35 and the captured image of the outer camera 36 performs the calculation process, based on the detected parallax, and the distance between the outer cameras 35 and 36 which are set in advance, and can obtain the distance to the object OB. The distance obtained by the outer image analysis unit 183 may be the distance from the outer cameras 35 and 36 to the object OB. Further, the obtained distance may be converted into the distance from the eye EY of the user to the object OB, by using known parameters.

In addition, the outer image analysis unit 183 calculates the convergence angle CA, based on data about the states of both eyes of the user that is generated by the eye image analysis unit 182, and the distance to the object OB obtained by the outer image analysis unit 183.

The change control unit 184 adjusts the display position of the image in the first display 100A and the second display 100B, according to the convergence angle CA calculated by the outer image analysis unit 183. The change control unit 184 obtains the adjustment amount in each of the first display 100A and the second display 100B. Here, the change control unit 184 can separately obtain the adjustment amount by the mechanical adjustment using the right optical system drive unit 85 and the left optical system drive unit 87, and the adjustment amount by the image process. In addition, the change control unit 184 can obtain the adjustment amount by the mechanical adjustment, and the adjustment amount by the image process, when combining the mechanical adjustment and the image process.

Further, after obtaining the adjustment amount by the movement of the right optical system drive unit 85 and the left optical system drive unit 87 and causing the drive control unit 185 to perform the adjustment, the change control unit 184 may obtain again the convergence angle CA. In this case, the change control unit 184 obtains the adjustment amount of the image process, based on the convergence angle CA obtained by the outer image analysis unit 183 after the mechanical adjustment.

The adjustment amount that is obtained by the change control unit 184 can be a shift amount for shifting the display position from the standard position that is the display position of an image which is set in advance. The standard position is determined on the assumption that for example, the user having a standard pupillary distance views an outside scene with a standard gaze distance, in other words, the standard convergence angle, and is included in the setting data 121 and stored in the storage unit 120. Since the values in a range of 60 mm to 65 mm are the standard values, for the pupillary distance (a distance between eyes), the pupillary distance can be set to, for example, 65 mm. The standard gaze distance can be determined according to the specifications of the virtual image display 100, and for example, the standard gaze distance may be set to 4 m or the like in the specifications used in a general work, and may be set to 1 m or the like in the specifications used in a work in the near position (at hand or the like). The shift amount can be determined depending on the number of pixels in the video display element 82 and a driving amount that the drive control unit 185 drives. For example, if the gaze distance is close and the convergence angle is large, the display position may be shifted to the inner side (nose side) rather than the standard position.

The drive control unit 185 controls and drives each of the right optical system drive unit 85 and the left optical system drive unit 87, based on the adjustment amount by the mechanical adjustment obtained by the change control unit 184.

The right optical system drive unit 85 can swing the optical device unit 130, for example, in a stepwise manner. The left optical system drive unit 87 is also the same. In this case, the drive control unit 185 controls the number of steps to move the right optical system drive unit 85 and the left optical system drive unit 87. Further, when the right optical system drive unit 85 and the left optical system drive unit 87 are capable of inclining the optical device unit 130 in a stepless manner, the change control unit 184 controls the movement amount of the right optical system drive unit 85 and the left optical system drive unit 87.

Arithmetic expressions, functions, matrices, parameters, and the like which are used for the arithmetic processes, that the eye image analysis unit 182, the outer image analysis unit 183, and the change control unit 184 of the control unit 140 perform, are stored in the storage unit 120 as setting data 121. Further, the reference value of the adjustment possible range and the set value of the target accuracy in the process described below are stored in the storage unit 120 as adjustment reference data 123.

In addition, it is preferable to perform the adjustment by the control unit 140 as a goal in which for example, the convergence angle CA conforming to the display position of the images P1 and P2 becomes ±1° relative to the convergence angle CA calculated on the basis of the sight line of the user. Here, the display positions of the images P1 and P2 are, for example, the position of the center of the images P1 and P2.

In addition, FIG. 10A illustrates the case where there is the object OB in the center of both eyes of the user, in other words, an example in which the user views the object OB towards the head such that the object OB is located at the center of both eyes. When either the right eye or the left eye of the user is clearly the dominant eye, the position of the object OB is a position obtained by shifting the position of the center of the right eye EY and the left eye EY to the dominant eye side.

In this case, the outer image analysis unit 183 may be configured to detect the object OB biased to the dominant eye side, calculate a distance to the object OB, with the dominant eye as a reference, and calculate the convergence angle CA. Further, arithmetic expressions, functions, matrices, parameters, and the like which are suitable for the arithmetic processes, with the dominant eye as a reference may be included in the setting data 121. Further, it may be configured to designate the dominant eye by the operation of the user, or a guide message requesting the user to input the dominant eye may be displayed on the virtual image display 100. Further, a process of displaying an image of the virtual image display 100 and determining the dominant eye by the operation of the control device 300 may be performed.

In this case, the control unit 140 can also adjust the display position of the image according to the dominant eye of the user. For example, assuming the dominant eye is the right eye, an image is displayed in a position shifted by 20 pixels from the reference position, on the image display 80 corresponding to the right eye EY, and an image is displayed in a position shifted by 15 pixels from the reference position, on the image display 80 corresponding to the left eye EY. Thus, when controlling the display mode in response to the convergence angle, it is possible to display an image in a more natural appearance, by displaying the image in different modes for each of the dominant eye and the eye on the side that is not the dominant eye.

Furthermore, in the case of detecting the convergence angle, the positions 10*a* and 10*b* illustrated in FIG. 10A may not be positions symmetrical to the center of both eyes, due to the influence of the dominant eye, in some cases. In other words, there is a case where the object OB is in the position close to the dominant eye side rather than the front of the user. In this case, the control unit 140 may obtain the convergence angle with the position on the dominant eye side (for example, the position 10*a*) as a reference, through a process of detecting the convergence angle CA. Specifically, the position 10*a* and a position 10*b*' symmetrical to the position 10*a* through the center of both eyes are assumed, and the convergence angle may be obtained based on the distance between the position 10*a* and the position 10*b*'. Further, the convergence angle may be obtained by performing the same process on the position on the dominant eye side (for example, the position 10*b*). Further, the final convergence angle may be calculated by obtaining the average value of two convergence angles that are obtained in this way.

Further, a method of detecting the dominant eye is not limited to the above method, and when the object OB is in the position close to the right side of the field of view of the user, processes of the detection of the convergence angle and the control of the display mode may be performed with the right eye as the dominant eye. When the object OB is in the position close to the left side of the field of view of the user, processes of the detection of the convergence angle and the control of the display mode may be performed with the left eye as the dominant eye. In other words, the setting for the dominant eye may be changed, depending on the relative position between the object and the user. Further, when the user performs the setting for the dominant eye, the setting may be given priority.

Figure 12:
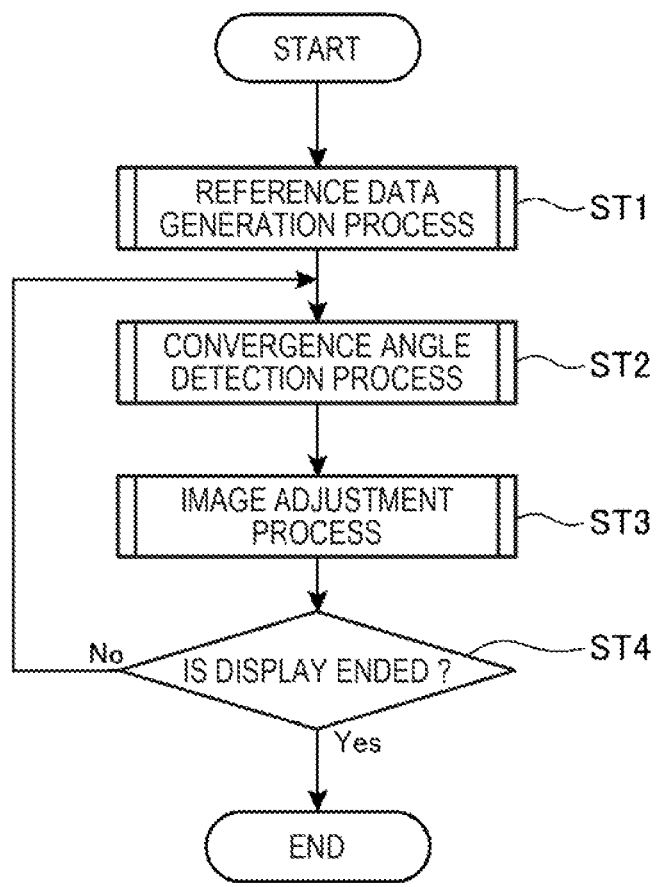
FIG. 12 is a flowchart illustrating an operation of a HMD.

FIG. 12 is a flowchart illustrating the operation of the HMD 1, and illustrates the process relating to the adjustment of the display position of an image.

The control unit 140 generates reference data which is a reference for detecting the sight line direction (gaze direction) and the gaze distance of the user (step ST1). The reference data generated in step ST1 is stored in the storage unit 120 as the reference data 122.

The control unit 140 performs a convergence angle detection process for detecting the convergence angle between both eyes of the user, from the start of the display of the image (including a video) or at the time of display start (step ST2). Subsequently, the control unit 140 executes an image adjustment process for adjusting the display position of the image in the virtual image display 100, based on the convergence angle detected in step ST2 (step ST3). Thereafter, the control unit 140 determines whether to end the display of the image (step ST4), and returns to step ST2 while continuing the display (step ST4; No). Further, when to end the display (step ST4; Yes), the process is ended.

The reference data 122 generated by the control unit 140 in step ST1 may be processed at the time of the startup of the HMD 1 or when the user first uses the HMD 1, or it may be configured to process the reference data 122 at any time by the user operating the control device 300.

Hereinafter, the respective processes illustrated in FIG. 12 will be described in detail.

Figure 13:
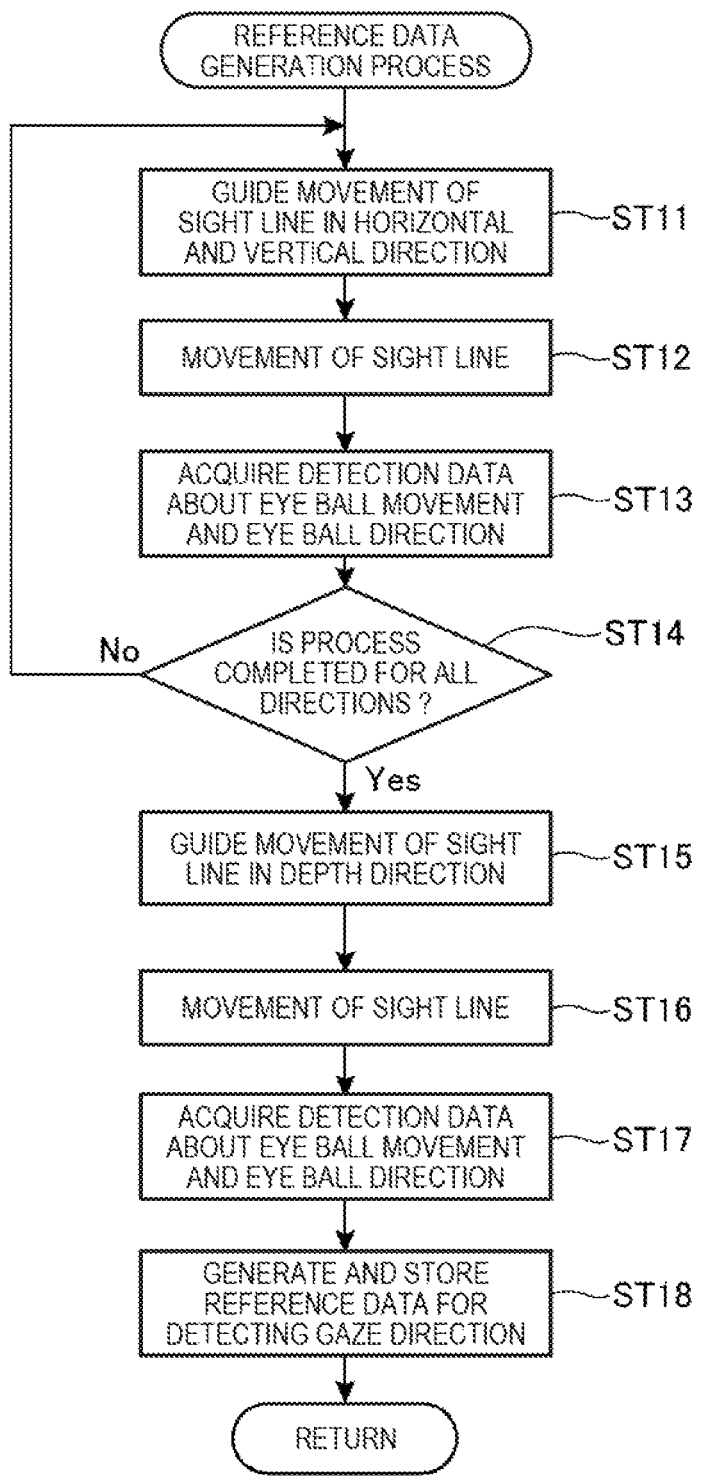
FIG. 13 is a flowchart illustrating a reference data generation process.

FIG. 13 is a flowchart illustrating a reference data generation process indicated in step ST1 of FIG. 12.

The control unit 140 displays an image for guiding the sight line to direct the horizontal direction and the vertical direction, on the virtual image display 100 (step ST11). The user moves the sight line in accordance with the guidance (step ST12). The control unit 140 acquires the captured image data obtained by the inner camera 37*a*, 37*b*, 38*a*, and 38*b* performs imaging during movement or after movement, and acquires data about the eye ball movement and the direction of the eye ball, by analyzing the acquired captured image data (step ST13). The control unit 140 determines whether or not the processes of steps ST11 to ST13 are completed for all directions that have been set in advance (step ST14). If there is an unprocessed direction (step ST14; No), the process returns to step ST11.

In step ST11, for example, nine directions including eight directions: up, down, right, left, upper right, lower right, upper left, and lower left, as well as the front are specified, and characters and images for guiding the sight line to a direction are displayed. The control unit 140 guides the sight line of the user to a designated direction to a maximum extent, for eight directions except for the front.

In step ST13, the control unit 140 extracts the image of the eye ball of the user from the captured images of the inner cameras 37*a*, 37*b*, 38*a*, and 38*b*, and detects (1) a pupillary distance, (2) a pupil diameter or the amount of change in the pupil diameter, and (3) a gaze direction so as to generate detection data. The pupil diameter can be obtained by detecting the image of the iris of the eye ball. In general, since the movement of the ciliary muscle that changes the lens is reflected to the state of the iris, it is possible to use data on the amount of change of the pupil diameter or the pupil diameter, as data about the gaze distance.

The operation of steps ST11 to ST13 may be performed for each of the nine directions in the surface facing the eye ball of the user. In other words, any direction of the nine directions is designed, and a text or an image for guiding the sight line to the designated direction is displayed, in step ST11. Detection data on the designated direction is acquired in step ST13. If the operation is performed, for example, nine number of times, it is possible to direct the sight line to nine directions, and to acquire the detection data. In addition, nine directions facing the sight line and the order facing the sight line are designated in step ST11, thereafter, the movement of the eye ball is captured by the inner cameras 37*a*, 37*b*, 38*a*, and 38*b*, continuously, and the detection data of nine directions may be obtained together in step ST13.

If the process is performed for all of the horizontal and vertical directions (step ST14; Yes), the control unit 140 displays an image for guiding the sight line to direct the depth (distance) direction on the virtual image display 100 (step ST15). Then, the control unit 140 causes the user to move the sight line in accordance with the guidance (step ST16), acquires the captured image data by causing the inner camera 37*a*, 37*b*, 38*a*, and 38*b* to perform imaging during the movement or after the movement, and acquires data about the eye ball movement and the direction of the eye ball (step ST17) by analyzing the acquired captured image data. In step ST15, the control unit 140 guides the sight line to direct, for example, two directions: the closest position and the farthest position. Detection data about the closest position and the farthest position may be acquired by performing the process of steps ST15 to ST17 twice.

In step ST15, the distance that is set in advance is guided to be visible to the user, in an outside scene visible to the user, in other words, a real space. In this case, an object located at a distance set in the real space may be specified, and may be guided in order for the user to gaze the object. In this case, the user may put in advance an object used to perform the reference data generation process, in the designated distance.

The control unit 140 generates the reference data 122 used to detect the gaze direction, based on the detection data that is acquired in steps ST13 and ST17, and stores the generated reference data 122 in the storage unit 120 (step ST18). In this example, the reference data 122 includes the data on the movement and/or the direction of the eye ball, when the user directs the sight line in total eleven directions: the nine directions and two distance directions. Thus, the gaze direction can be specified by imaging the eye ball by the inner cameras 37*a*, 37*b*, 38*a*, and 38*b* and comparing the image of the eye ball in the captured image with the state of the eye ball in the case of capturing the nine directions. Further, it is possible to obtain the gaze distance from the direction of the eye ball.

Figure 14:
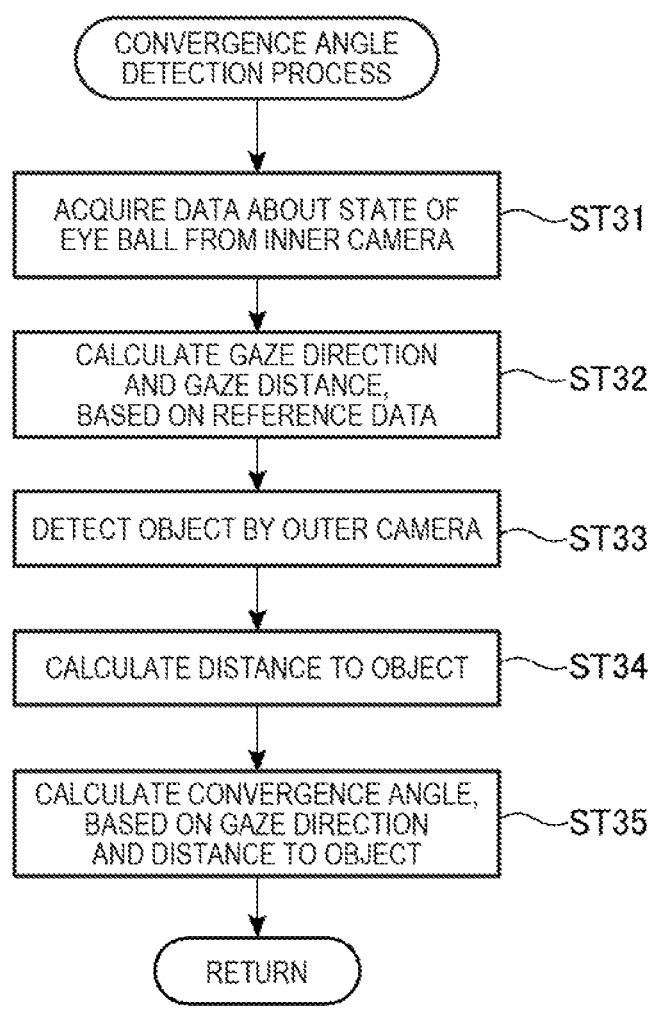
FIG. 14 is a flowchart illustrating a convergence angle detection process.

FIG. 14 is a flowchart illustrating the convergence angle detecting process in step ST2 of FIG. 12.

The control unit 140 acquires the captured image data by performing imaging with the inner cameras 37*a*, 37*b*, 38*a*, and 38b, and acquires the data about the state of the eye ball by analyzing the captured image data (step ST31). It is preferable that the data acquired in step ST31 is, for example, data obtained through the same process as in steps ST13 and ST17, and data comparable with the reference data 122.

The control unit 140 calculates the gaze direction and the gaze distance of the user, based on the data acquired in step ST31, with reference to the reference data 122 (step ST32).

The control unit 140 acquires the captured image data by performing imaging with the outer cameras 35 and 36, and detects the object OB that is imaged as the captured image (step ST33). The control unit 140 detects the object suitable to the gaze direction and the gaze distance, obtained in step ST32, among images identifiable as objects (including a part of the object) in the captured image, as the object OB.

The control unit 140 calculates the distance to the object detected in step ST33 (step ST34). Since the outer cameras 35 and 36 constitute a stereo camera, it is possible to obtain the distance from the outer cameras 35 and 36 to the object, on the basis of the parallax of the captured image of the outer camera 36 and the captured image of the outer camera 35. Here, the control unit 140 may convert the obtained distance into the distance to the object from the eye of the user.

The control unit 140 calculates the convergence angle, based on the gaze direction calculated in step ST32, and the distance calculated in step ST34 (step ST35). Since the gaze distance is obtained from the captured image of the outer cameras 35 and 36 in step ST35, it has an advantage of obtaining the gaze distance at a high degree of accuracy by a more simple arithmetic process. In addition, the convergence angle may be calculated in the step ST35 by using the gaze direction and the gaze distance calculated in step ST32, while omitting the operation of step ST34.

In addition, the specific method of detecting the convergence angle is not limited to the method using a stereo camera, as illustrated in FIG. 14. For example, the convergence angle may be detected by performing imaging a plurality of times with a time difference by using the single-eye camera, and by using the a plurality of captured images obtained by the plurality of times of imaging. Further, the convergence angle may be detected by imaging the eye (the single eye or both eyes) of the user, and detecting a change in the pupil diameter or the pupil diameter. In general, when the user views the object, that the user wants to gaze, in the outside scene (real space), the pupil diameter of the human is known to expand in a short time. Therefore, a function of detecting a change in the pupil diameter or the pupil diameter may be utilized in the process of obtaining the gaze direction of the user. Further, the control unit 140 may use, for example, a lookup table (a conversion table), in the process of obtaining the gaze distance from the captured image. In this case, the control unit 140 can obtain the gaze distance by referring to the lookup table, based on the detection data obtained from the camera or the captured image. Further, the pupillary distance (eye distance) may be combined as the detection data. The lookup table may be stored in advance, for example, in the storage unit 120.

Figure 15:
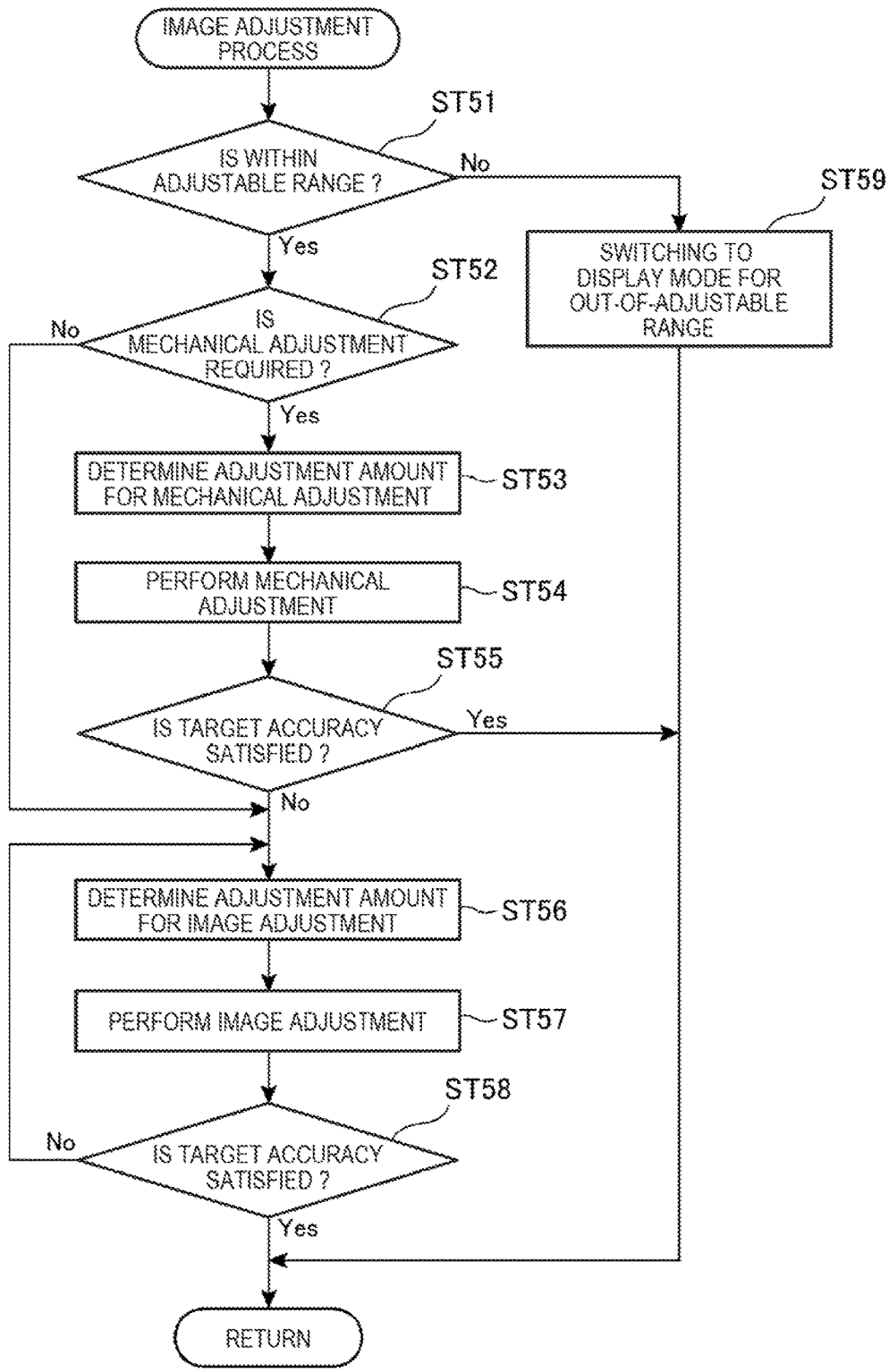
FIG. 15 is a flowchart illustrating an image adjustment process.

FIG. 15 is a flowchart illustrating an image adjusting process of step ST3 in FIG. 12.

The control unit 140 determines whether or not the convergence angle obtained in the operation of FIG. 14 is within an adjustable range (step ST51). The HMD 1 has a limit value of the convergence angle that can be adjusted by the mechanical adjustment using the right optical system drive unit 85 and the left optical system drive unit 87 and the adjustment that the image processing unit 160 performs the image process, and the adjustable range corresponding to the limit value is set in advance. When it is determined that the value of the convergence angle is within the adjustable range (step ST51; Yes), the control unit 140 determines whether or not the mechanical adjustment is required (step ST52).

The right optical system drive unit 85 and the left optical system drive unit 87 has, for example, a configuration for performing adjustment in a stepwise manner, and can largely move the display position of the image by swinging the optical device unit 130. Therefore, if mechanical adjustment is performed when largely moving the display position according to the convergence angle, and only the image process is used when the adjustment amount of the display position of the image is small, the efficiency is good. In step ST52, whether or not to perform the mechanical adjustment is determined using a preset threshold value.

When it is determined that the mechanical adjustment is not required (step ST52; No), the control unit 140 proceeds to step ST56 to be described later.

When it is determined that the mechanical adjustment is required (step ST52; Yes), the control unit 140 determines the adjustment amount of the right optical system drive unit 85 and the left optical system drive unit 87 (step ST53). The control unit 140 operates the right optical system drive unit 85 and the left optical system drive unit 87 in accordance with the adjustment amount determined in step ST53 (step ST54), and determines whether or not to satisfy the target accuracy, after the adjustment (step ST55).

As described above, in the HMD 1, the accuracy of the position adjustment of the image according to the convergence angle is set to, for example, ±1° relative to the convergence angle. When the convergence angle detected in the convergence angle detection process of FIG. 14, and the convergence angle suitable to the display position of the image after the adjustment satisfies the set accuracy (step ST55; Yes), the control unit 140 ends the present process.

Further, when the adjustment accuracy is not satisfied (step ST55; No), the control unit 140 determines the adjustment amount of the image quality adjustment (step ST56), and executes the adjustment (step ST57). The control unit 140 determines whether or not the target accuracy is satisfied through the adjustment (step ST58). The target accuracy determined in step ST58 is, for example, the same as in step ST55. If the target accuracy is not satisfied (step ST58; No), the control unit 140 returns to step ST56, and repeats the image process. In addition, an upper limit may be set in the number of times of execution of steps ST56 to ST57, and when the number of times of execution reaches the upper limit, the control unit 140 returns to step ST51.

Further, if it is determined that the target accuracy satisfied (step ST58; Yes), the control unit 140 ends the present process.

In addition, when performing determination as to whether or not the target accuracy is satisfied in step ST55, the control unit 140 can determine whether or not the adjustment satisfies the target accuracy, at the time of determining the adjustment amount by the mechanical adjustment. Therefore, the determination of step ST55 may be performed in step ST54.

Further, when it is determined that the convergence angle obtained by the operation of FIG. 14 is out of the adjustable range (step ST51; No), the control unit 140 performs switching to the display mode (display type) corresponding to the convergence angle out of the adjustable range (step ST59).

In step ST59, for example, the control unit 140 stops the display of one of the first display 100A and the second display 100B, and performs the switching to the state in which an image is displayed on only one. Since the convergence angle does not give an effect when the user views a single image with only a single eye, even without adjusting the display position of the image to the position suitable to the convergence angle, there is no load on the visual function of the user.

Further, in step ST59, the control unit 140 may perform virtual reality (VR) display. In the VR display, the captured images from the outer cameras 35 and 36 are displayed in the viewable areas of the first display 100A and the second display 100B to the maximum size. Here, the visibility of the outside scene may be reduced by increasing the brightness of the image display 80 and by making the intensity of external light passing through the light guide member 10 relatively small. Furthermore, in the VR display, a region including the object detected in step ST33 of FIG. 14 may be cut and displayed from the captured images from the outer cameras 35 and 36 are displayed. In this case, since the user views the display images and views the object, the user is less likely to be affected from a difference in the convergence angles for the outside scene and the display image. For this reason, it is possible to reduce the burden on the user of the visual function.

Moreover, when performing the VR display, the control unit 140 may have parallax in the mage displayed on the first display 100A and the mage displayed on the second display 100B, depending on the gaze distance calculated in step ST32 or ST34 of FIG. 14. In other words, two images having parallax are generated from the captured image from the outer cameras 35 and 36, and the two images may be displayed respectively on the first display 100A and the second display 100B. The two images form a three-dimensional (3D) image. Therefore, the user is able to view an object in the VR by the three-dimensional image.

The operations illustrated in FIGS. 12 to 15, arithmetic expressions, functions, matrices, parameters, and the like which are used for the arithmetic processes are all stored in advance as setting data 121 in the storage unit 120. In addition, a reference value and a threshold regarding the adjustable range which is the reference determined in step ST51 of FIG. 15, and a reference value, a threshold, and the like for determining the target accuracy are stored as the adjustment reference data 123 in the storage unit 120. The setting data 121 and the adjustment reference data 123 may be settable or updatable by the operation of the control device 300, or may be input from an external device (not illustrated) connected through the communication unit 117.

As described above, the HMD 1 according to the embodiment applied with the invention has the virtual image display 100 that displays an image correspond to each of the right eye and the left eye of the user such that the outside is visible. The HMD 1 includes a control unit 140 that controls the display mode of the image by the virtual image display 100, in accordance with the gaze distance of the user. Therefore, when the user views the outside scene and the image, it is possible to adapt the display mode of the image for the distance that the user gazes. Therefore, it is possible to properly adjust the display image, for example, to reduce the load of the user, and enhance the visibility of the display image.

The control unit 140 controls the display mode of the image by the virtual image display 100, based on the convergence angle between both eyes corresponding to the gaze distance of the user. Therefore, it is possible to realize a display mode suitable for the distance that the user gazes by controlling the display mode of the image in response to the convergence angle between both eyes of user.

In addition, the control unit 140 obtains the convergence angle between both eyes of the user, and changes the position where the user views the image displayed on the virtual image display 100, in response to the obtained convergence angle. Therefore, it is possible to display an image in the position suitable for the gaze distance the user, to enhance the visibility of the display image, and to cause the user to view the display image suitable for a distance that the user gazes at the outside scene.

Further, the HMD 1 includes outer camera 35, and 36 and inner cameras 37a, 37b, 38a, and 38b, which are state detecting units that detect the states of both eyes of the user. The control unit 140 calculates the gaze distance of the user, based on the detection result of the state detecting unit, and controls the display mode of the image by the virtual image display 100 according to the calculated gaze distance. Since the HMD 1 detects the states of both eyes of the user so as to calculate the gaze distance, it is possible to properly adjust the display mode of the image, even if the user does not perform a complicated operation.

The HMD 1 includes inner camera 37a, 37b, 38a, and 38b which are provided corresponding to the respective right and left eyes of the user, as state detecting units. The control unit 140 calculates the gaze distance of the user by obtaining at least one of the pupillary distance between both eyes of the user, the pupil diameter, and the gaze time in the sight line direction, based on the captured images of the inner cameras 37a, 37b, 38a, and 38b. Thus, it is possible to calculate the gaze distance with high accuracy from the state of both eyes of the user.

Further, the HMD 1 includes outer cameras 35 and 36 that capture the gaze direction of the user, as the state detecting unit. Since the control unit 140 calculates the gaze distance of the user, by obtaining the distance to the gaze object that the user gazes, based on the captured images from the outer cameras 35 and 36, it is possible to calculate the gaze distance with a higher accuracy.

In addition, the virtual image display 100 includes an image display 80 that emits image light, and a projection fluoroscope 70 that guides the image light that the image display 80 has emitted, to each of the right eye and the left eye of the user. The virtual image display 100 includes a right optical system drive unit 85 and a left optical system drive unit 87 that displaces at least a portion of the members constituting the image display 80 or the projection fluoroscope 70, and changes the angle of the image light incident from the projection fluoroscope 70 to the right eye and the left eye of the user. Since the control unit 140 operates the right optical system drive unit 85 and the left optical system drive unit 87 according to the gaze distance of the user, it is possible to adjust the display mode of the image by a mechanical operation.

In addition, the control unit 140 controls the position of the image in the display range in which the user views the image displayed by the virtual image display 100, depending on the gaze distance of the user. As a result, the display position of the image can be properly adjusted according to the gaze distance of the user.

In addition, the HMD 1 includes an image processing unit 160 that generates the image displayed by the virtual image display 100 based on the image data. The control unit 140 generates an image for adjustment by cutting out a portion of the image data, depending on the gaze distance the user, by the image processing unit 160, and displays the image for adjustment by the virtual image display 100. Thus, it is possible to enlarge the adjustment range of the display position of the image, by cutting out the image, and to eliminate the uncomfortable feeling when changing the display position of the image.

Further, when the gaze distance of the user is closer to the preset reference distance, and the convergence angle is out of the adjustable range, the control unit 140 displays the image corresponding to either the right eye or the left eye of the user, by the virtual image display 100. Thus, even if the gaze distance of the user is close to the reference distance, it is possible to reduce the load on the user.

Second Embodiment

Figure 16:
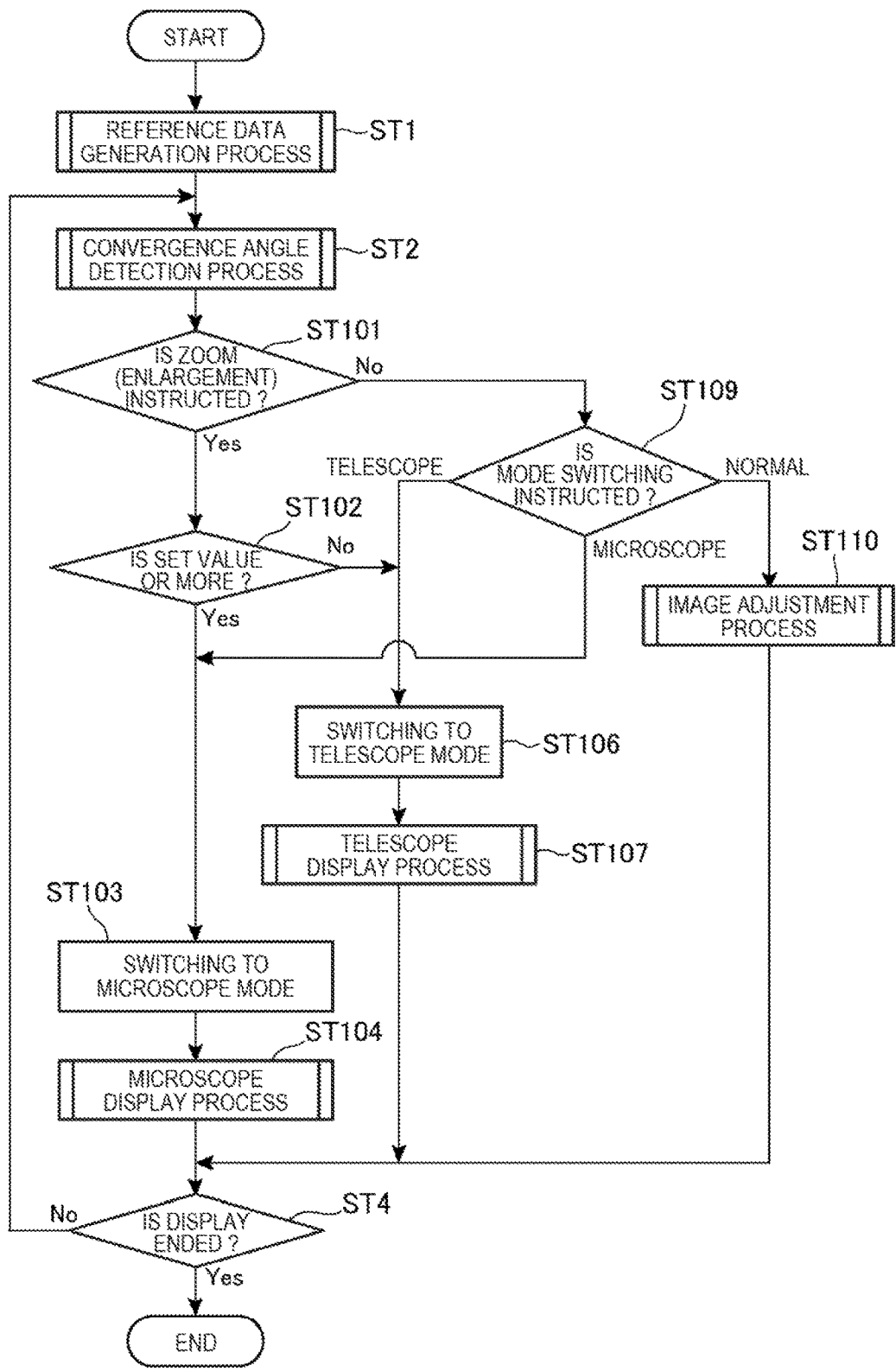
FIG. 16 is a flowchart illustrating an operation of a HMD in a second embodiment.

FIG. 16 is a flowchart illustrating the operation of the HMD 1 in the second embodiment applied with the invention.

In second embodiment, since the HMD 1 has a common configuration with the first embodiment, common components are denoted by the same reference numerals and the illustration and description thereof will be omitted.

The HMD 1 of the second embodiment executes a captured image display mode in which the virtual image display 100 displays the captured image from the outer cameras 35 and 36. The HMD 1 is capable of executing three operation modes as the captured image display mode: a microscope mode (near area expansion mode), a telescope mode (far area expansion mode), and a proximity display mode. The captured image display mode can be referred to as a kind of video see-through display.

The operation of FIG. 16 is executed instead of the operation illustrated in FIG. 12. In FIG. 16, the same operations (processes) as in FIG. 12 are denoted by the same step numbers.

The control unit 140 of the HMD 1 generates the reference data which is a reference for detecting the sight line direction (gaze direction) and the gaze distance of the user (step ST1). The reference data generated in step ST1 is stored as the reference data 122 in the storage unit 120.

The control unit 140 executes a convergence angle detection process for detecting the convergence angle between both eyes of the user, from the start of the display of the image (including video), or at the time of display start (step ST2).

Here, the control unit 140 determines whether the input information acquisition unit 110 has received an instruction for zooming (enlargement) (step ST101). The instruction for zooming is, for example, an instruction for enlarging and displaying the field of view by the user operating the track pad 302 and the key switch unit 303.

When receiving the instruction for zooming (step ST101; Yes), the control unit 140 determines whether the instructed magnification of the zoom (an enlargement ratio) is a pre-set value or more (step ST102). When the magnification of the zoom is the set value or more (step ST102; Yes), the control unit 140 switches the operation of the HMD 1 to the microscope mode (step ST103), and executes the microscope display process (step ST104). The details of the microscope display process in which the HMD 1 operates in the microscope mode will be described later.

Further, when the magnification of the zoom is less than the predetermined value (step ST102; No), the control unit 140 switches the operation of the HMD 1 to the telescope mode (step ST106), and executes a telescope display process (step ST107). The details of the telescope display process in which the HMD 1 operates in telescope mode will be described later.

Further, when not receiving the instruction for zooming (step ST101; No), the control unit 140 determines whether or not an input information acquisition unit 110 has received an instruction for the switching to the operation mode (step ST109). The instruction for the switching to the operation mode is input by, for example, operating the operation unit 111, and is received by the input information acquisition unit 110.

In step ST109, when receiving an instruction for switching to the microscope mode, the control unit 140 proceeds to step ST103. Further, when receiving an instruction for switching to the telescope mode, the control unit 140 proceeds to step ST106. Moreover, when receiving an instruction for switching to the normal operation mode, and, when switching to the telescope mode or the microscope mode is not performed, the control unit 140 executes the image adjustment process (step ST110).

After performing the microscope display mode of step ST104, the telescope display process of step ST107, or the image adjustment process of step ST110, the control unit 140 determines whether or not to end the display of the image (step ST4). While the display is continued (step ST4; No), the process returns to step ST2. Further, when to end the display (step ST4; Yes), the present process is ended.

Figure 17:
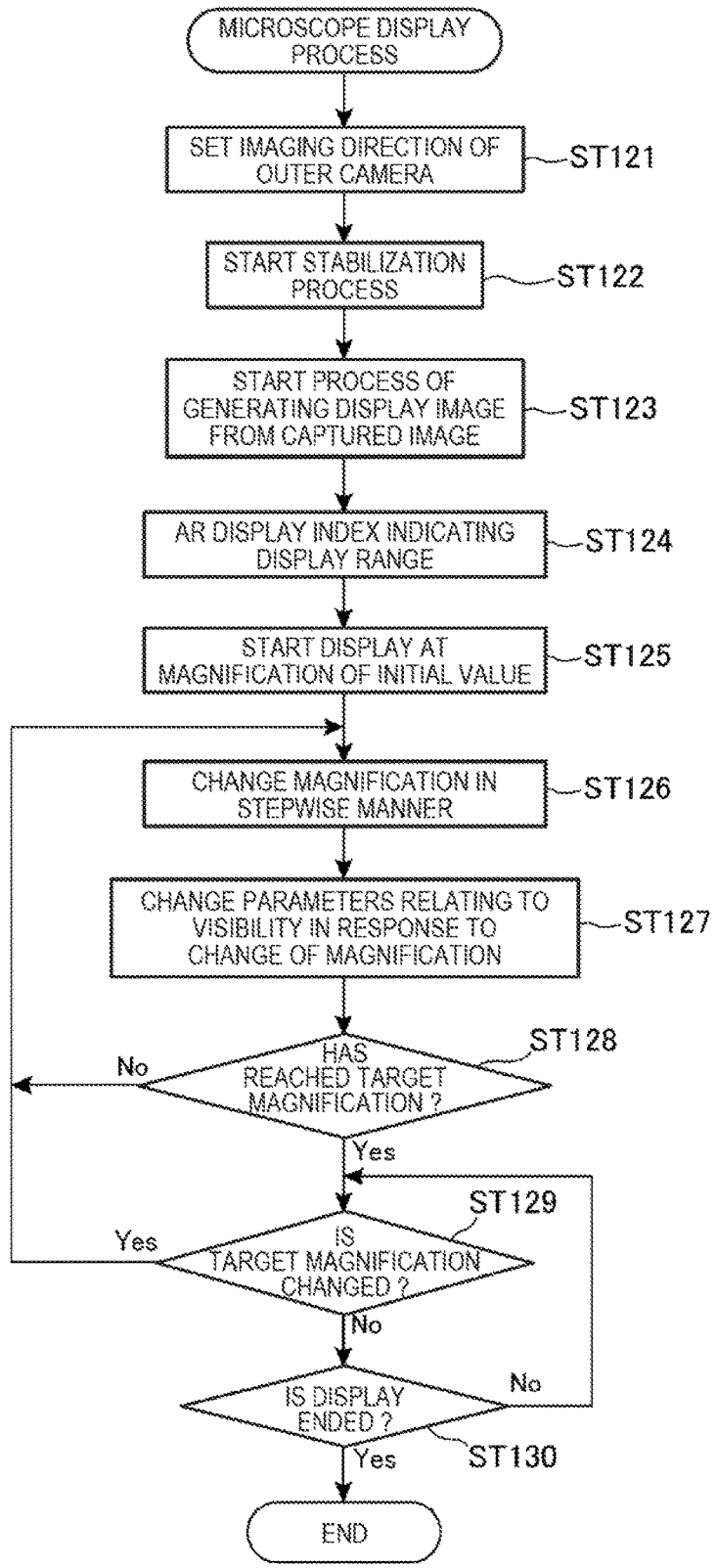
FIG. 17 is a flowchart illustrating a microscope display mode.
Figure 18A:
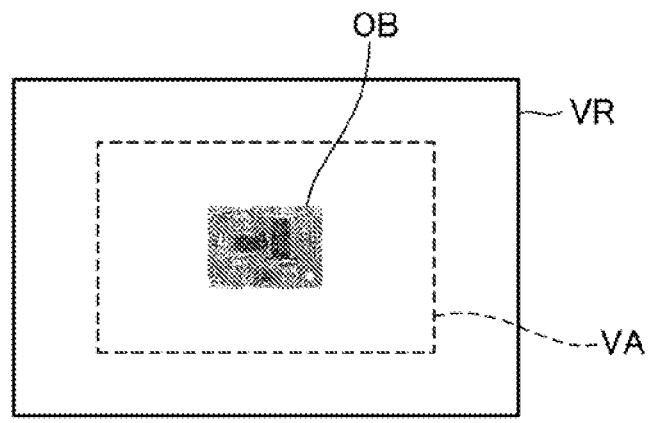
FIGS. 18A to 18C are diagrams illustrating a display example in the microscope display mode.
Figure 18B:
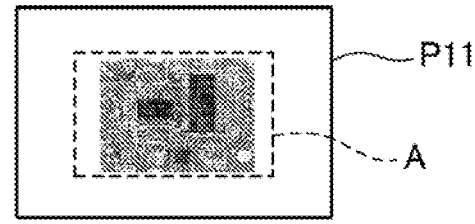
Figure 18C:
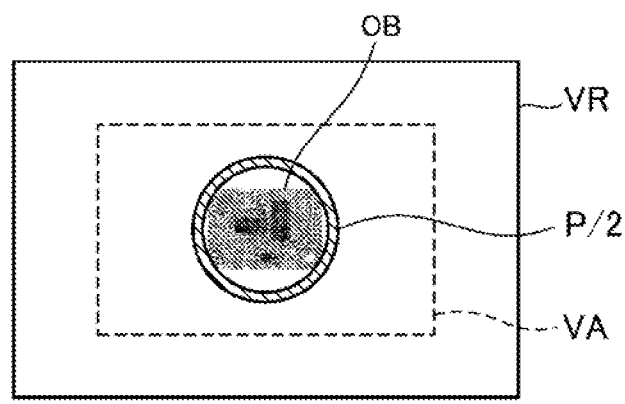

FIG. 17 is a flowchart illustrating the microscope display mode in step ST104 (FIG. 16) in detail. FIGS. 18A to 18C are diagrams illustrating a display example of the microscope display mode. FIG. 18A schematically illustrates an image (real image) in the real space, which is transmitted and viewed through the virtual image display 100, FIG. 18B is an example of a process for generating a display image from a captured image, and FIG. 18C illustrates an example of the AR display.

The control unit 140 sets the imaging direction of the outer cameras 35 and 36 when the switching to the microscope mode is performed in step ST103, as an imaging direction of imaging by the following operations (step ST121), and starts the stabilization process (step ST122). The control unit 140 starts the imaging by the outer cameras 35 and 36, and obtains the captured image data from the outer cameras 35 and 36, and starts a process of generating a display image from the captured image (step ST123).

In step ST123, the control unit 140 generates a display image by trimming (cutting process), for example, a part of the captured image. In the microscope display mode, imaging may be performed by only one of the outer camera 35 and the outer camera 36. In this case, it is possible to generate a display image by trimming a part of the captured image from the outer camera 35 or the outer camera 36. When imaging is performed by both the outer camera 35 and the outer camera 36, the control unit 140 acquires two images by trimming the captured image from each of the outer camera 35 and the outer camera 36, and generates the display image by combining the two images. For example, a three-dimensional display image composed of two display images with parallax may be generated, from the two images. Further, for example, one display image obtained by combining the two images may be generated.

As illustrated in FIG. 18A, in the state in which the user fits the sight line to the object OB, the captured images P11 of the outer cameras 35 and 36 are images obtained by performing imaging the object OB as a center, as illustrated in FIG. 18B. The captured image P11 is a captured image from any one of the outer cameras 35 and 36. The control unit 140 generates a display image by cutting out a trimming range A corresponding to a predetermined range from the center of the sight line, from the captured image P11. The position and the range of the trimming range A in the captured image P11 can be appropriately set and changed, but are a range of a predetermined size that is located at the center of the captured image P11 in an initial value (default).

When the virtual image display 100 is moved, the angles of view of the outer cameras 35 and 36 move, and result in the movement of the captured image. In step ST123, if the position and scope at which the captured image is trimmed are fixed, the display image moves corresponding to the movement of the captured image. There is a possibility that a so-called visually induced motion sickness occurs in the user, depending on the movement of the virtual image display 100. Thus, the HMD 1 starts the stabilization process in step ST122. The stabilization process is a process of moving the position and/or the range in which the captured image is trimmed in step ST123 so as to cancel the movement of the captured image. For example, it is possible to cancel the movement by changing the position of the trimming range A that is cut out from the captured image P11 in FIG. 18B in the direction opposite to the direction in which the angles of view of the outer cameras and 35 and 36 move. In addition, when the outer cameras 35 and 36 move in the depth direction of the field of view, the sizes of the object to be captured and the captured image change. In this case, the control unit 140 can cancel the movement by changing the size of the trimming range A.

The control unit 140 can detect and specify the movement of the captured image, by a process of comparing a plurality of captured images which are sequentially input from the outer cameras 35 and 36. Further, in a configuration in which the virtual image display 100 includes an inertial sensor (motion sensor), not illustrated, such as an acceleration sensor or an angular velocity sensor, the control unit 140 can specify the movement of the outer cameras 35 and 36, based on the detection value of the inertial sensor. The control unit 140 stabilizes the display image by changing the position in which the captured image is trimmed according to the movements of the angles of view of the outer cameras 35 and 36, and changing the trimming range if necessary.

The stabilization process may not be a process for cancelling all of the changes in the angles of view of the outer cameras 35 and 36. In other words, since visually induced motion sickness may not occur, or be reduced, it is possible to employ a method of canceling movement exceeding a predetermined speed, out of the movements of the angle of view. In this case, a lower speed movement having a speed lower than the predetermined speed is not canceled, and the display image is changed in response to the movement of the angle of view. As a result, for example, when the user has changed the angles of view of the outer cameras 35 and 36 intentionally, the display according to the user's intention is performed.

The control unit 140 performs display indicating the correspondence between a range for displaying an image (a display range) and the real space, when starting the display of the display image generated from the captured image (step ST124). For example, as illustrated in FIG. 18C, the control unit 140 performs AR display such that the user views the index image P12 overlapped with the outside scene of the real space viewed by the external light. The index image P12 represents the range that is included in the display image displayed by the control unit 140, and corresponds to the range at which the control unit 140 trims the captured image. Although the index image P12 in the example of FIG. 18C is a ring-shaped, the shape and the display color are not limited as long as the range can be presented to the user. In addition, it is preferable that the index image P11 does not interfere with the visibility of the real space, and for example, the index image P11 is displayed at the brightness of the extent at which the object OB of the real space can be viewed. In this case, the index image P11 is transmitted and viewed, and the index image P11 and the object OB of the real space can be viewed.

In the example of FIG. 18C, an index image P12 is displayed so as to overlap the real image (object) of the real space that is viewed by external light, and the user can understand that the range overlapped with the index image P12 is displayed based on the captured images from the outer cameras 35 and 36. The display position and the display size of the AR display can be determined by the outer image analysis unit 183 analyzing the captured images from the outer cameras 35 and 36.

The control unit 140 displays the display image obtained by enlarging the captured image at a magnification of the initial value, before displaying the image at the designated zoom magnification (step ST125). The magnification of the initial value, for example, can be set as the magnification at which the captured image is viewed as substantially the same size as the outside scene transmitted through the first display 100A and the second display 100B that the user views. In this case, since the object OB of the outside scene of the real space and the object OB of the display image are visible to the user as substantially the same size so as not to be enlarged or reduced, the magnification in this case may be one time.

It is assumed a case where the user views an object located in the field of view, by external light transmitted through the first display 100A and the second display 100B. When the image of the object that the control unit 140 displays based on the captured images captured by the outer cameras 35 and 36 and an image (real image) of the object that is viewed by external light are viewed to the user in substantially the same size, the range including the object can be referred to as one time.

Next, the control unit 140 changes the magnification of the display image to be displayed by the virtual image display 100 (step ST126). The control unit 140 changes the magnification from the magnification of the zoom of the initial value of the step ST125 to the target magnification. This change, for example, may be a gradual change, and for example, a change rate for the change of the magnification is set in advance, and the magnification can be changed, with the set change rate as a one step. The target magnification is the magnification corresponding to the instruction received in step ST101 (FIG. 16), the magnification designated when the microscope mode is designated in step ST109, or the magnification that is set in advance as the target magnification of the microscope mode.

When executing step ST126 at the first time, the control unit 140 changes the magnification corresponding to one step from the magnification of the initial value in step ST125.

The control unit 140 changes the display parameters relating to the visibility in response to a change in the magnification (step ST127). The display parameters relating to the visibility are a parameter for designating the display brightness of the video display element 82, a parameter for designating the display color, and a parameter for designating the presence or absence of the edge enhancement process. A process of changing the display brightness of the video display element 82 can be realized by a process in which the image processing unit 160 changes the brightness of the image data of the display image, and/or, a process of changing the light emission brightness of the right backlight 221 and the left backlight 222.

Further, the display color can be changed by processing the image data by the image processing unit 160. Further, the edge enhancement process can be performed by the image processing unit 160. The parameters can be included in the setting data 121 stored in, for example, the storage unit 120. The parameters are set in advance corresponding to the absolute value of the magnification, or the ratio of the current magnification relative to the target magnification. As the brightness of the display image is high, the visibility of the display image is higher as compared to the outside scene of the real space that is viewed by external light. With respect to the color tone of the display image, as the chroma is high, the visibility of the display image increases. Further, if the edge enhancement process is performed, the visibility of the display image is higher than when it is not performed. The parameters are set such that as the magnification of the display image is high, the visibility of the display image is high. In step ST127, the control unit 140 sets or changes the parameters corresponding to the magnification which is changed at step ST126.

In addition, the display parameters relating to the visibility are not limited to the configuration of the setting data 121. In other words, the control unit 140 may acquire, generate, or calculate the display parameters relating to the visibility not only by a method of acquiring the parameters from the setting data 121, but also by other methods.

For example, the control unit 140 may detect the brightness, the color tone of the outside scene from the captured images from the outer cameras 35 and 36, and the brightness and the chromaticity distribution, and the like of the captured image, and acquire the display parameters, based on the detection result. In this case, a look-up table (LUT), an arithmetic expression, or the like for obtaining display parameters from the detection result may be stored in advance in the storage unit 120. The control unit 140 may detect the brightness of the outside scene on the basis of the captured image of the outside scene, may determine the weather of the outside scene, or may generate a comparison result by comparing the brightness, the color tone, and the chromaticity distribution, which are obtained from the captured image from the outer cameras 35 and 36, with the preset threshold. Further, an image sensor (not illustrated) or an infrared sensor other than the outer cameras 35 and 36 may be provided in the virtual image display 100, and may detect the brightness, the color tone, and the like of the outside world, in particular, the range including the sight line direction of the user. Further, the brightness and the color tone of the outside scene, and the brightness and the chromaticity distribution, and the like of the captured image may be detected by comparing the detection result of the captured image of the outer cameras 35 and 36, and the detection result of the inner cameras 37a, 37b, 38a, and 38b.

The control unit 140 determines whether or not the magnification resulted from changing in step ST126 has reached the target magnification (step ST128). When the changed magnification has not reached the target magnification (step ST128; No), the process proceeds to step ST126, and changes the magnification. In this way, the display magnification of the virtual image display 100 gradually changes so as to reach the target magnification by repeatedly executing steps ST126 to ST128. The degree of change in the magnification can be arbitrarily set, may be changed, for example, as a unit of a preset magnification such as 0.5, or the amount of a change in the magnification at one time may be determined, based on a difference between the initial value and the target value.

When the changed magnification reaches the target magnification (step ST128; Yes), the control unit 140 determines whether or not the target magnification is changed (step ST129). For example, when the input information acquisition unit 110 receives an operation of a user who changes the target magnification, the control unit 140 determines that the target magnification is changed (step ST129; Yes). In this case, the control unit 140 returns to step ST126 and starts a process of changing the display magnification, based on the changed target magnification. Further, when the target magnification is not changed (step ST129; No), the control unit 140 determines whether or not to end the display of the image (step ST130). While continuing the display (step ST130; No), the process returns to step ST129. Further, when to end the display (step ST130; Yes), the process is ended.

In the microscope display mode of FIG. 17, it is possible to enlarge and display the direction specified in step ST121 out of a range or a direction included in the field of view of the user by a microscope or a magnifying glass.

The microscope mode is executed when the magnification of the zoom that is equal to or more than the set value is designated in step ST102 (FIG. 16) and transition to the microscope mode is instructed in step ST109. Therefore, if considering that the user wants to see an image by significantly enlarging a part of the field of view, it is possible for the user to see the image by significantly enlarging the field of view by easily performing the switching to the microscope mode by the operation to the operation unit 111.

In the microscope display mode, it is possible to display the image that is displayed in steps ST125 to ST126 as a stereoscopic image with parallax. The control unit 140 causes the image processing unit 160 to generate parallax between an image displayed on the first display 100A corresponding to the right eye of the user and an image displayed on the second display 100B corresponding to the left eye. In this case, the control unit 140 may change and set the parameter for designating the parallax of the left and right images in step ST127. In this case, an image generated based on the captured image from the outer cameras 35 and 36 is displayed as an image with parallax, and for example, as the index image P12 illustrated in FIG. 18C, the object that is AR-displayed in the real space may be displayed as a plane image without a parallax. Without being limited to the index image P12, for example, the object for guidance by the text or the image in the AR content that the control unit 140 displays for guiding, instructing, or transmitting to the other users, the work content may be displayed as an image without parallax.

Further, when displaying an image with parallax before moving to the microscope mode, the control unit 140 may perform switching to the display mode without the left and right parallax, at the time of the transition to the microscope mode. In this case, the control unit 140 displays an image generated based on the captured images from the outer cameras 35 and 36, and an object such as a text or an image included in the AR content, as an image without parallax.

The control unit 140 starts the stabilization process in step ST122. In the stabilization process, when the imaging directions of the outer cameras 35 and 36 change, the position for cutting out the image for display is moved to cancel or compensate for a change in the captured image. Therefore, even when the imaging directions of the outer cameras 35 and 36 change, the image for display to be generated from the captured image does not fluctuate greatly. In addition, when the movement of the imaging directions of the outer cameras 35 and 36, in other words, a change in the captured image is large, a display image obtained by cutting out the captured image also changes, but even in this case, the rate of a change in the display image is suppressed. Therefore, visually induced motion sickness can be suppressed according to the change in the imaging directions of the outer cameras 35 and 36 while suppressing an abrupt change in the display image.

Further, it may be configured such that in the microscope display mode, the control unit 140 displays a display image generated from the captured images from the outer cameras 35 and 36 on one of the first display 100A and the second display 100B, and does not display the captured images on the other. This display method is referred to as a single eye display. For example, since the display magnification is changed in step ST126, if the display magnification exceeds the threshold value set in advance, the control unit 140 may perform the switching to the single eye display. Further, when the target magnification is determined to a magnification exceeding the threshold, the switching to the single eye display may be performed. Alternatively, parameters for increasing the visibility of the display image are set in step ST127, and if the values of the parameters exceed a threshold value set in advance, the switching to the single eye display may be performed. During the execution of the single eye display, the user can view the real space by the eye on the side where the image is not displayed. Thus, since the visibility of the real space is ensured by one eye b, it is possible to significantly enhance the visibility of the display image based on the captured image for the other eye.

In addition, during the execution of the single eye display, the AR display may be performed so as to overlap the real space on the side in which the display image based on the captured image is not displayed, among the first display of the 100A and the second display 100B.

Figure 19:
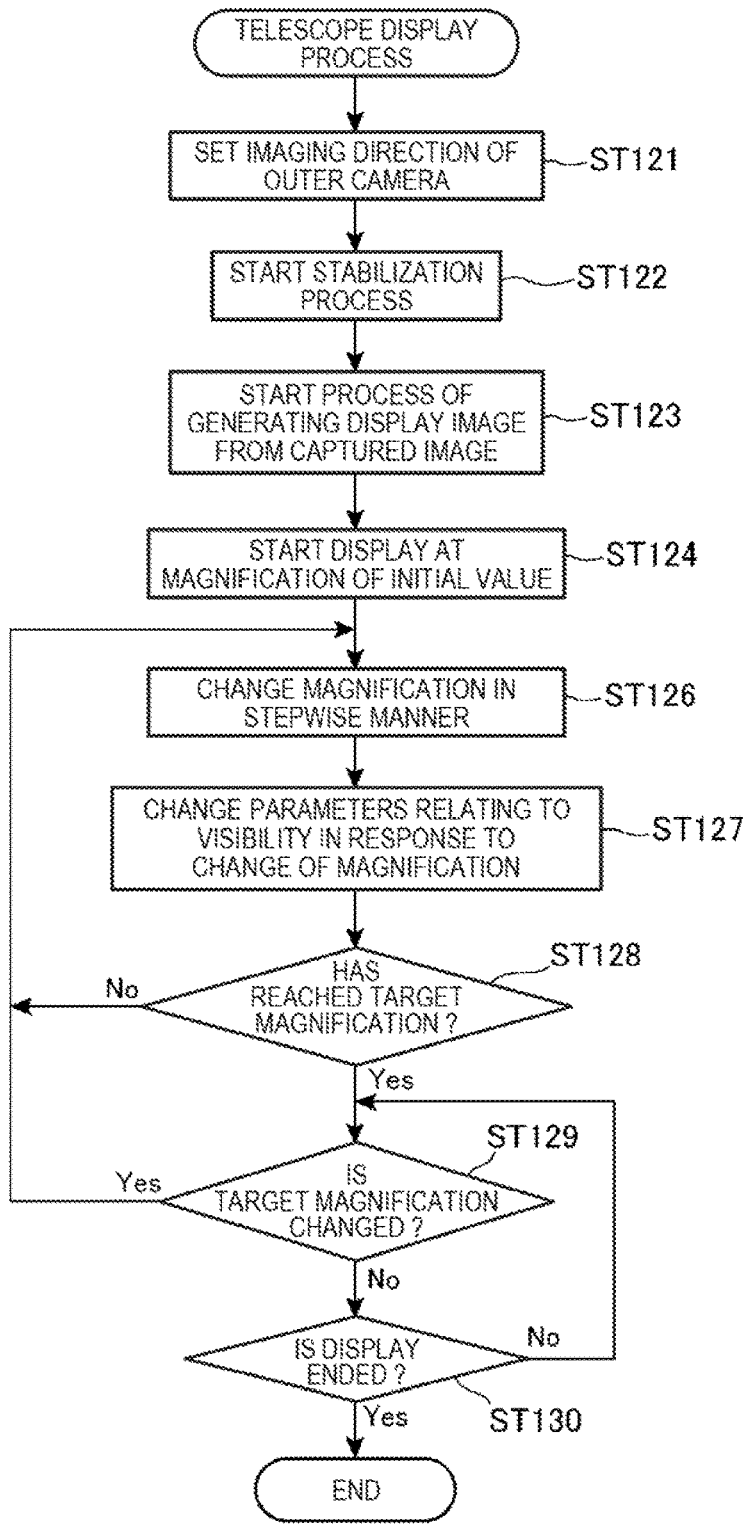
FIG. 19 is a flowchart illustrating a telescope display process.

FIG. 19 is a flowchart illustrating a telescope display process of step ST107 (FIG. 16) in detail.

The telescope display process illustrated in FIG. 19 includes the same process as the microscope display process illustrated in FIG. 17. Therefore, the same process is denoted by the same step number.

The control unit 140 sets the imaging direction of the outer cameras 35 and 36 when a switching to the telescope mode is performed in step ST106 as an imaging direction of imaging by the following operation (step ST121), and starts the stabilization process (step ST122). The control unit 140 starts the imaging by the outer cameras 35 and 36, acquires the captured image data from the outer cameras 35 and 36, and starts a process of generating a display image from the captured image (step ST123). The stabilization process is the same as the process described with reference to FIG. 17.

The control unit 140 does not perform the display in step ST124, and displays a display image obtained by enlarging the captured image at the display magnification of an initial value (step ST125), and changes the magnification (step ST126). The control unit 140 changes the magnification of the zoom of the initial value in step ST125, to the target magnification. This change can be, for example, a gradual change, for example, a change rate is set in advance in a change in the magnification and the magnification can be changed, with the set change rate as one step. For example, when executing step ST126 at the first time, the control unit 140 changes the magnification of the initial value in step ST125 to the magnification corresponding to one step. The change in the magnification thereafter is as described with reference to FIG. 17.

The control unit 140 changes the display parameters relating to the visibility in response to a change in the magnification (step ST127). The display parameters relating to the visibility are as described above in step ST127.

The telescope display process is suitable for the case where the user sees an enlarged view of a remote site, such as binoculars or telescopes. Whereas it is assumed that a site close to the virtual image display 100 is enlarged largely and displayed in the microscope display mode, it is preferably assumed that the user sees a remote site in the telescope display process. Accordingly, it is preferable to maintain a state where the user can view the real space by external light passing through the virtual image display 100. Thus, in step ST127 in the telescope display process of FIG. 19, when the visibility of the display image displayed based on the captured image from the outer cameras 35 and 36 is higher than the visibility of the real space, parameters are set to the extent that ensures the visibility of the real space.

Specifically, a value different from the microscope display mode described in FIG. 17 is set in advance to the parameters that have been set in step ST127. Further, a value different from the microscope display mode is set to an upper limit or a lower limit of the parameters that the control unit 140 has set in step ST127. Thus, in the telescope display process of FIG. 19, the field of view of the real space that is visible by the transmission light of the virtual image display 100 is secured.

Thereafter, the control unit 140 determines whether or not the magnification resulted from the change in step ST126 has reached the target magnification (step ST128). If the changed modification has not reached the target magnification (step ST128; No), the control unit 140 proceeds to step ST126, and changes the magnification. The control unit 140 repeatedly executes steps ST126 to ST128, and gradually changes the display magnification of the virtual image display 100 to the target magnification.

When the changed magnification has reached the target magnification (step ST128; Yes), the control unit 140 determines whether or not the target magnification is changed (step ST129). When it is determined that the target magnification is changed (step ST129; Yes), the control unit 140 returns to step ST126, and starts a process of changing the display magnification, based on the changed target magnification. When the target magnification is not changed (step ST129; No), the control unit 140 determines whether or not to end the display of the image (step ST130). While it continues the display (step ST130; No), the process returns to step ST129. Further, when to end the display (step ST130; Yes), the process is ended.

The telescope display process of FIG. 19 is executed when the transition to the telescope mode is instructed in step ST109. Therefore, if considering that the user wants to see an image by significantly enlarging a part of the field of view, it is possible for the user to see the image by significantly enlarging the field of view by easily performing the switching to the microscope mode by the operation to the operation unit 111. Further, a range in which an image is enlarged and displayed in the telescope display process is the center of the field of view when the transition is instructed in step ST109, or a part of the captured image corresponding to the sight line direction of the user, and the display at the display magnification of the initial value is started in step ST124. Therefore, there is no abrupt change in the field of view compared to before the execution of the telescope display process, and the user can naturally see the enlarged image.

In the telescope display process, it is possible to display the image displayed in steps ST125 to ST126, as a stereoscopic image with parallax. The control unit 140 causes the image processing unit 160 to generate parallax between an image displayed on the first display 100A corresponding to the right eye of the user and an image displayed on the second display 100B corresponding to the left eye. In this case, the control unit 140 may change and set the parameter for designating the parallax between the left and right images in step ST127. Further, in the telescope display process, the object may be AR-displayed in the real space. For example, the text or the image indicating the display magnification may be AR-displayed. The AR display may be displayed as a plane image without the parallax.

Furthermore, the single eye display may be performed in the telescope mode. The timings or conditions for performing the single eye display can be the same as the process described in the microscope display mode.

Figure 20:
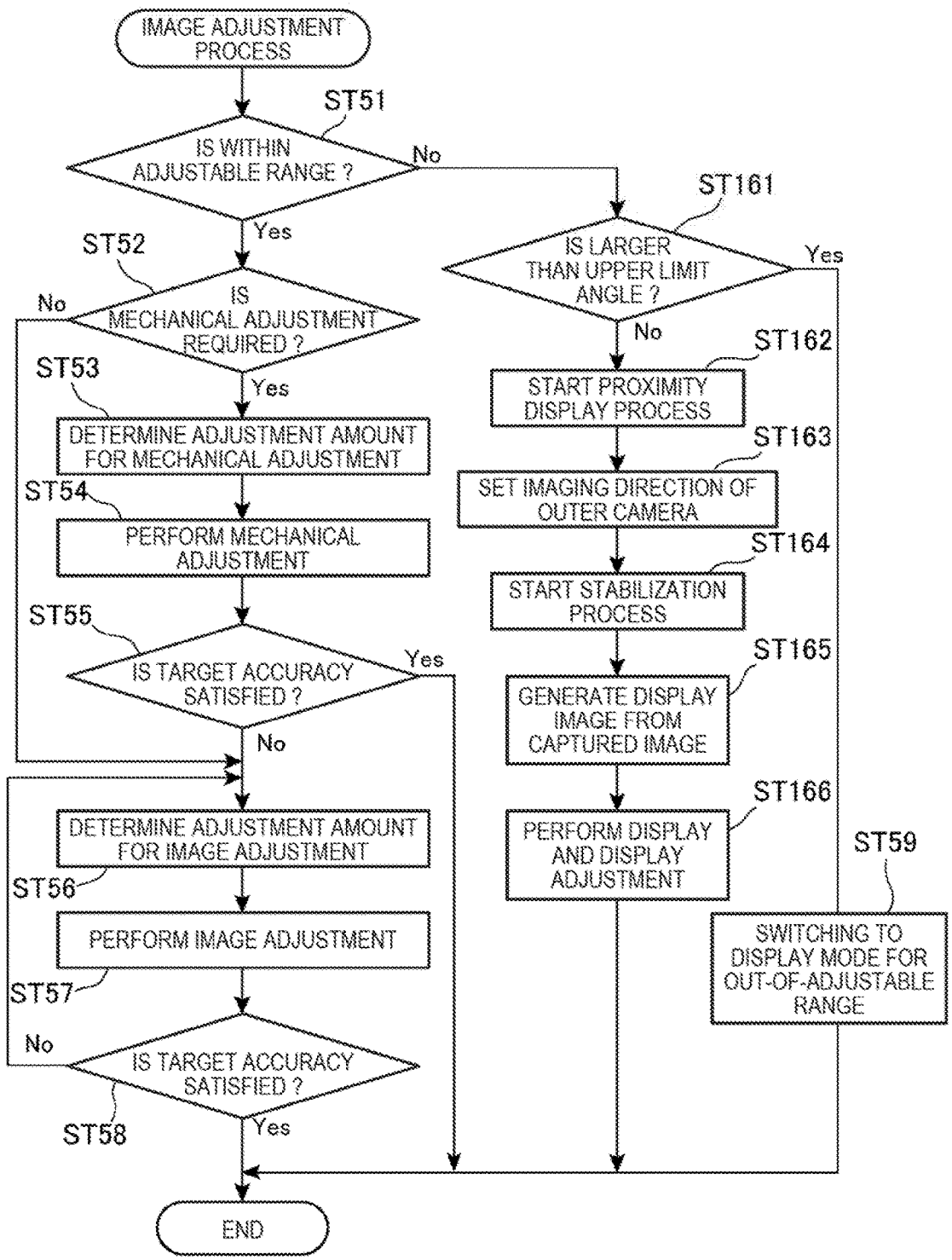
FIG. 20 is a flowchart illustrating an image adjustment process in the second embodiment.

FIG. 20 is a flowchart illustrating the image adjustment process of step ST110 (FIG. 16) in detail.

Since the image adjustment process of FIG. 20 includes the same process as the image adjustment process (FIG. 15) described in the first embodiment, the same processes are denoted by the same step numbers.

The control unit 140 determines whether or not the convergence angle obtained in step ST2 (FIG. 16) is within the adjustment range (step ST51). When the value of the convergence angle is determined to be within the adjustment possible range (step ST51; Yes), it determined whether or not to require the mechanical adjustment (step ST52). When it is determined that the mechanical adjustment is not required (step ST52; No), the control unit 140 proceeds to step ST56.

When it is determined that the mechanical adjustment is required (step ST52; Yes), the control unit 140 determines the adjustment amount of the right optical system drive unit 85 and the left optical system drive unit 87 (step ST53). The control unit 140 causes the right optical system drive unit 85 and the left optical system drive unit 87 to operate, according to the adjustment amount determined in step ST53 (step ST54), and after the adjustment, the control unit 140 determines whether or not the target accuracy is satisfied (step ST55). When the convergence angle detected in the convergence angle detection process of step ST2 and the convergence angle suitable for the display position of the image after the adjustment satisfy the accuracy that has been set (step ST55; Yes), the control unit 140 ends the present process.

Further, when the adjustment accuracy is not satisfied (step ST55; No), the control unit 140 determines the adjustment amount of image quality adjustment (step ST56), and performs the adjustment (step ST57). The control unit 140 determines whether or not the target accuracy is satisfied by the adjustment (step ST58). The target accuracy determined in step ST58 is the same as, for example, step ST55. When the target accuracy is not satisfied (step ST58; No), the control unit 140 returns to step ST56, and repeats the image process. In addition, there may be an upper limit in the number of execution of steps ST56 to ST57, and when the number of execution reaches the upper limit, the process may return to step ST51.

Further, when it is determined that the target accuracy is satisfied (step ST58; Yes), the control unit 140 ends the present process.

Meanwhile, when it is determined that the convergence angle obtained in the convergence angle detection process of step ST2 (FIG. 16) is not within the adjustment possible range (step ST51; No), the control unit 140 determines whether or not the convergence angle is larger than an upper limit angle that is set in advance (step ST161). When the convergence angle is larger than the upper limit angle (step ST161; Yes), the control unit 140 performs the switching to the display mode (display type) corresponding to the convergence angle outside the adjustment range (step ST59). In step ST59, for example, the control unit 140 stops the display of one of the first display 100A and the second display 100B, and performs the switching to the state in which an image is displayed on only one. Since the convergence angle does not give an effect when the user views a single image with only a single eye, even without adjusting the display position of the image to the position suitable to the convergence angle, there is no load on the user's visual function.

Further, when the convergence angle is determined to be equal to or less than the upper limit angle (step ST161; No), the control unit 140 switches the operation mode to a proximity display mode, and starts a proximity display process (step ST162). The proximity display mode is an operation mode in which a position close to the virtual image display 100 is displayed legibly using the captured images from the outer cameras 35 and 36, and is executed when the sight line of the user directs to the position close to the virtual image display 100.

The control unit 140 sets the imaging directions of the outer cameras 35 and 36 (step ST163), and starts the stabilization process (step ST164). The control unit 140 starts the imaging by the outer cameras 35 and 36, acquires the captured image data from the outer cameras 35 and 36, and starts a process of generating a display image from the captured images (step ST165).

In step ST165, the control unit 140 generates a display image by trimming (cutting process), for example, a part of the captured image. Here, the control unit 140 may generate a display image by using the captured image of only one of the outer camera 35 and the outer camera 36. In this case, it is possible to generate a display image by trimming a part of the captured image from the outer camera 35 or the outer camera 36. When using the captured images from both the outer camera 35 and the outer camera 36, the control unit 140 acquires two images by trimming the captured image from each of the outer camera 35 and the outer camera 36, and generates the display image by combining the two images. For example, a three-dimensional display image composed of two display images with parallax may be generated, from the two images. Further, for example, one display image obtained by combining the two images may be generated.

In addition, the stabilization process is the same process as step ST122 (FIG. 17). The control unit 140 changes the position or the ranges for trimming the captured image in order to cancel or compensate for the movement of the captured image due to movement of the angle of view of the outer cameras 35 and 36.

The control unit 140 starts the display of the display image generated in step ST165 (step ST166). In step ST166, the control unit 140 sets the display parameters relating to the visibility of the image to be displayed, and performs the display adjustment. The parameters to be adjusted are, for example, a parameter for designating the display brightness of the video display element 82, a parameter for designating the display color, and a parameter for designating the presence or absence of the edge enhancement process. A process of changing the display brightness of the video display element 82 can be realized by a process in which the image processing unit 160 changes the brightness of the image data of the display image, and/or, a process of changing the light emission brightness of the right backlight 221 and the left backlight 222. Further, the display color can be changed by processing the image data by the image processing unit 160. Further, the edge enhancement process can be performed by the image processing unit 160. The parameters can be included in the setting data 121 stored in, for example, the storage unit 120. The parameters are set in advance corresponding to the absolute value of the magnification, or the ratio of the current magnification relative to the target magnification. As the brightness of the display image is high, the visibility of the display image is higher as compared to the outside scene of the real space that is viewed by external light. With respect to the color tone of the display image, as the chroma is high, the visibility of the display image increases. Further, if the edge enhancement process is performed, the visibility of the display image is higher as compared to the case where it is not performed. The parameters are set such that as the magnification of the display image is high, the visibility of the display image is high. In step ST166, the control unit 140 sets or changes the parameters corresponding to the convergence angle.

The position and the ranges that the control unit 140 trims the captured image are determined according to the convergence angle detected in step ST2 (FIG. 16). As it is more difficult for the user to see an object with a naked eye, the user can see a close position by using the outer cameras 35 and 36. In addition, the control unit 140 may enlarge and display an image by cutting out the captured image from the outer cameras 35 and 36 depending on the convergence angle of the user. The magnification in this case, for example, may be determined according to the convergence angle.

Thus, the HMD 1 according to the second embodiment applied with the invention is provided with outer cameras 35 and 36 that capture the outside of the virtual image display 100, the control unit 140 is capable of executing a captured image display mode for displaying an image based on the captured images from the outer cameras 35 and 36 on the virtual image display 100. Thus, the user is allowed to view the outside scene which is a view of the outside of the display unit. The captured image display mode corresponds to the microscope mode (near area expansion mode), the telescope mode (far area expansion mode), and the proximity display mode, which are described above.

During the execution of the captured image display mode, the control unit 140 performs a process of improving the visibility of the display image to be displayed based on the captured image, as compared to the real space that is viewed by external light passing through the virtual image display 100. Thus, the outside scene that the user views from the display image can be clearly viewed with the visibility higher than the real space that is viewed by transmission light of the virtual image display 100. In addition, since the user easily distinguishes the real space that is viewed by transmission light and the outside scene that is displayed on the basis of the captured image, it is possible to improve the convenience of the user.

During the execution of the captured image display mode, the control unit 140 changes the brightness or color of the display image based on the captured images from the outer cameras 35 and 36, or performs an edge enhancement process on the image based on the captured images from the outer cameras 35 and 36. Since the control unit 140 performs the process of improving the visibility of the display image as compared to the transmission light, it is possible to largely enhance the visibility of the outside scene of the display image.

In the captured image display mode, the control unit 140 may display an image based on the captured images from the outer cameras 35 and 36, correspondingly to one of the right eye and the left eye of the user, by the first display 100A and the second display 100B. In this case, the user is allowed to view the display image to the user, without being affected by the gaze distance the user.

Further, the control unit 140 may display an image based on the captured images from the outer cameras 35 and 36, respectively and correspondingly to the right eye and the left eye of the user, in a state without left and right parallax, in the captured image display mode. In this case, the user can view the display image, without the stereoscopic vision. Therefore, it is less affected by the gaze distance of the user, and it is possible to enhance the visibility of the display image.

The control unit 140 may enlarge and display the display image generated based on the captured image from the outer cameras 35 and 36 in the captured image display mode. Further, when the input information acquisition unit 110 receives an operation of the user, the control unit 140 may execute the captured image display mode.

Further, when the gaze distance of the user is detected, and the detected gaze distance is shorter than the distance which is set in advance (for example, the convergence angle is larger than the set value), the control unit 140 may execute the captured image display mode.

Third Embodiment

Figure 21:
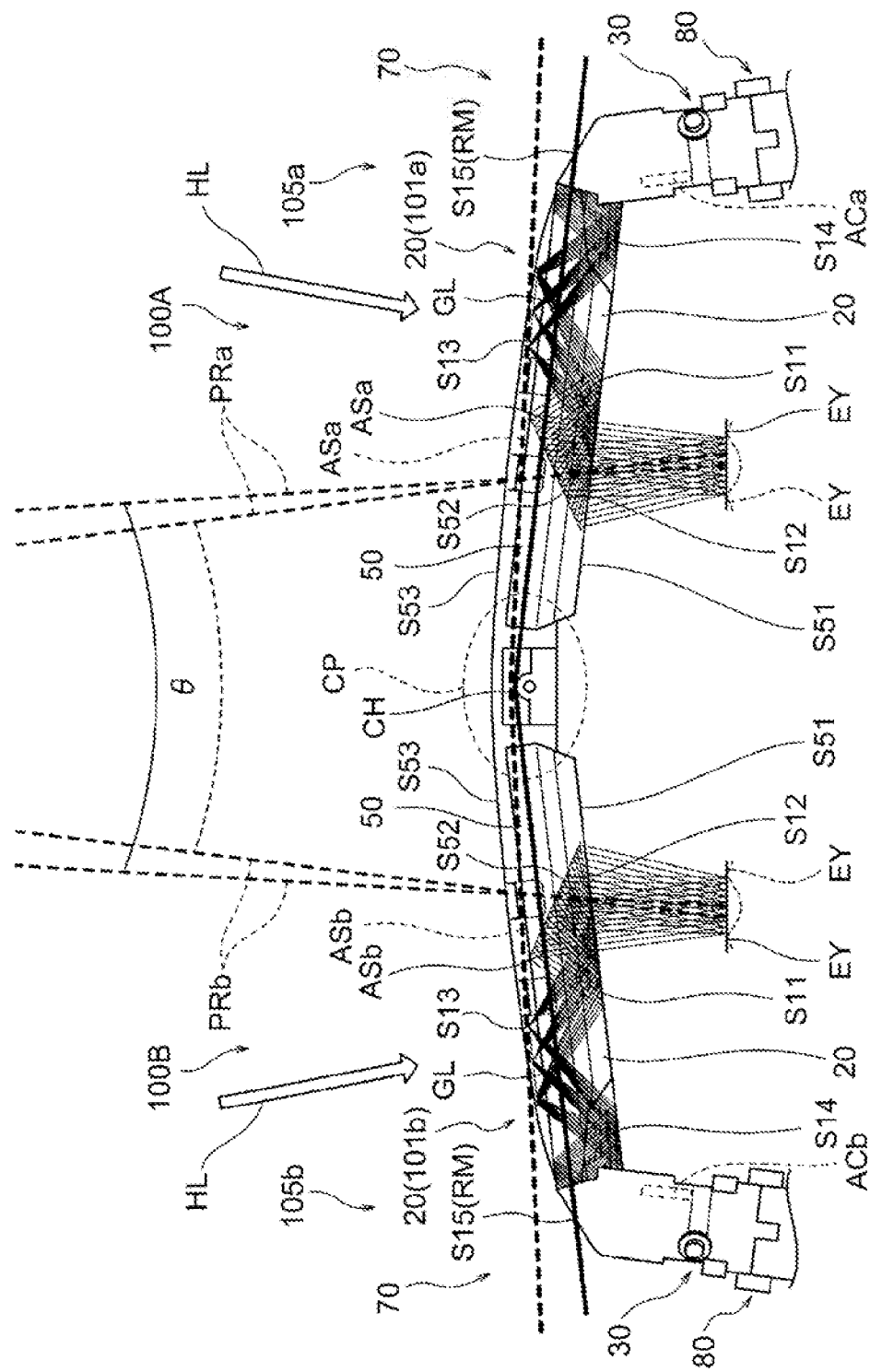
FIG. 21 is a diagram illustrating a configuration of a HMD of a third embodiment.

FIG. 21 is a diagram illustrating a configuration of a HMD of a third embodiment.

The third embodiment is configured such that a parallax setting unit (for example, see a frame portion 102 of FIG. 1) that sets parallax includes an angle variable portion, as in FIG. 21. Through this configuration, the intersection angle between the assembly reference direction Asa of the first optical member 101a which is the light guide device 20 and the assembly reference direction Asb of the second optical member 101b can be adjusted. In other words, the angle of the second optical member 101b relative to the first optical member 101a can be changed. Thus, as illustrated, it is possible to change the value of an angle θ formed by the main light beams PRa and PRb that determine the left and right parallax.

In addition, it is assumed to integrally move the first and second displays 100A and 100B, in addition to the respective optical members 101a and 101b (light guide device 20) in the angle change. Although various configurations are considered for the angle variable portion, for example, a pair of left and right configurations can be considered in which a piezo element or a micro adjuster that changes the attitudes of the first and second displays 100A and 100B in a left and right symmetry manner is employed and precisely operated. Further, it is also conceivable to provide an angle adjustment member that precisely operates those such as a hinge with a stopper (for example, arranged at the same position as the hinge HN illustrated in FIGS. 11A to 11C) capable of changing continuously or stepwisely an angle or fixing the angle to a desired angle in the center portion CP of the frame portion 102 (see FIG. 1) which is the parallax setting unit. When changing the attitudes of the first and second displays 100A and 100B to the desired state, it is typically considered to use a deformable movable device such as the piezo element or the hinge for the angle variable portion. In addition, as long as those can be precisely controlled by the deformable movable element, those other than described above may be applied as the angle variable portion.

In addition to the above, in the third embodiment, it is assumed that optical lenses (not illustrated) respectively constituting a pair of left and right projection lenses 30 constitute a focus lens group, and the projection lenses 30 are moved in an optical axis direction by a pair of left and right actuators Aca and ACb, in other words, the projection lenses 30 have a focus mechanism. In other words, the focus mechanism functions as a focal length adjustment unit that adjusts the focal length. Since it is possible to change the focal lengths in the projection lens 30, if the value of the angle θ, in other words, the parallax is changed by the angle variable portion of the above-mentioned parallax setting unit, it is possible to change the assumed display position of the image that is viewed by the image light GL (assumed position of the virtual image IM) in the focal length of each of the displays 100A and 100B according to the changed parallax.

In the configuration of FIG. 21, the operation of changing the angle of the second optical member 101b relative to the first optical member 101a is performed as a part of the mechanical adjustment, according to the mechanical adjustment using the right optical system drive unit 85 and the left optical system drive unit 87 in response to the control of the change control unit 184. In other words, the change control unit 184 can obtain a mechanical adjustment possible range by adding the adjustment possible amount by the operation of changing the angle of the second optical member 101b relative to the first optical member 101a and the adjustment possible amount by the mechanical adjustment using the right optical system drive unit 85 and the left optical system drive unit 87. The change control unit 184 can obtain the adjustment amount by the mechanical adjustment and the adjustment amount by the image process, based on the adjustment possible range, when combining the mechanical adjustment and the image process.

Further, the change control unit 184 can separately obtain the adjustment amount by the mechanical adjustment using the right optical system drive unit 85 and the left optical system drive unit 87, the adjustment amount by the operation of changing the angle of the second optical member 101b relative to the first optical member 101a, and the adjustment amount by the image process.

The change control unit 184 obtains the respective adjustment amounts by the mechanical adjustment using the right optical system drive unit 85 and the left optical system drive unit 87, and the adjustment amount by the operation of changing the angle of the second optical member 101b relative to the first optical member 101a, in the process of obtaining the adjustment amount by the mechanical adjustment in step ST53 of FIG. 15 and FIG. 20. Then, in step ST54, it is possible to perform the mechanical adjustment using the right optical system drive unit 85 and the left optical system drive unit 87 and the operation of changing the angle of the second optical member 101b relative to the first optical member 101a according to the obtained adjustment amount.

Thus, the process for adjusting the viewing distance is not limited to the configuration described above by adjusting the display mode of the image in the virtual image display 100, and can have a variety of types.

In addition, the invention is not limited to the configurations of the respective embodiments, and it is possible to implement the invention in various formats without departing from the scope thereof.

For example, in the embodiment, a case of controlling the display position where the user sees (views) a display image has been described as an example of controlling the display mode in accordance with the gaze distance of the user, but the invention is not limited thereto. For example, in the case of performing AR display, the display size, the display color or the like of the AR image or the display objects (an image, a figure, a character, and the like) included in the AR image may be changed depending on the gaze distance. In addition, a display mode of displaying a display object, that is displayed while overlapping the object OB, so as to overlap in front of the object OB, and a display mode of displaying the display object so as to overlap behind the object OB and to be viewed may be switched in response to the gaze distance. Furthermore, turning on and turning off of the display mode, in which the display object is visible with a shadow, may be switched depending on the gaze distance, by performing an image process on the AR image.

Further, a display mode of displaying an image so as to overlap the object OB of the real space transmitted through the light guide member 10 that the user views may be controlled as another example of controlling the display mode depending on the gaze distance of the user. For example, the mask display that reduces the visibility of the object OB by displaying an image so as to overlap the object OB, and the display in which the color of the object OB is viewed in different colors may be switched or adjusted depending on the gaze distance. In this case, the control unit 140 may perform an image process such as brightness adjustment, color scheme, dot opener, sharpness or edge enhancement, tone adjustment, and focus adjustment (blurring process) on the image that is visible so as to overlap the object OB. Moreover, the adjustment of the display position of the image may be performed in combination with the image process.

In addition, for example, the case where the control unit 140 performs the same adjustment in both the first display 100A and the second display 100B, based on the convergence angle calculated in the convergence angle detection process of FIG. 14 has been described in the embodiment. In other words, the adjustment amount by the mechanical adjustment and/or the adjustment amount by the image process are respectively set to the same amount in the left and the right, in steps ST53 and ST56 of FIG. 15. The invention is not limited thereto, and different adjustment amounts may be determined on the dominant eye side and a side which is not the dominant eye. A difference between the adjustment amounts in this case may be obtained according to a parameter that is set in advance or the like, or may be obtained from the detection data calculated in step ST13 of FIG. 13.

In addition, for example, the virtual image display 100 is not limited to the structure, which is held on the head of the user similar to the eye mirror by the temple portion 104 and the nose receiving portion 40. For example, a method of wearing the virtual image display 100 as a hat may be adopted, or a display unit that displays an image so as to correspond to the left eye of the user, and a display unit that displays the image so as to correspond to the right eye of the user may be separated, and respectively attached to the head of the user. Further, the virtual image display 100 may be indirectly attached to the body of the user through eye mirrors, hats, helmets and the like. Further, for example, the virtual image display 100 may be configured as a head-mounted display that is mounted on a vehicle such as a vehicle, an airplane, or the like. Further, for example, the virtual image display 100 may be configured as a head-mounted display embedded in a body armor such as a helmet, or may be a head-up display (HUD) used in a windshield of a vehicle.

Further, in the embodiment, the case where the virtual image display 100 and the control device 300 are separated and connected to each other through the connection cable 41 has been described as an example, but it is also possible to employ a configuration in which the control device 300 and the virtual image display 100 are integrally configured, and mounted on the head of the user. Further, when the control device 300 and the virtual image display 100 are connected by a longer cable, laptop computer, a tablet computer or a desktop computer may be used as the control device 300. In addition, portable electronic instruments including game machines, mobile phones, smartphones, and portable media players, and other dedicated equipment may be used as the control device 300. Here, when the control device 300 has a display screen, the display screen provided in the control device 300 may be stopped in a battery replacement mode.

Further, for example, a configuration for generating image light in the virtual image display 100 may be a configuration including an organic electro-luminescence (organic EL) display and an organic EL control unit. Further, the configuration for generating image light can be a configuration using a liquid crystal on silicon (LCoS (registered trademark)). The configuration for generating image light can be a configuration using an inorganic electro-luminescence (EL) display, an LED array, a digital microphone Romira device (DMD).

Further, for example, it is also possible to apply the invention to a laser retinal projection-type head-mounted display. In other words, the image generation unit includes a laser light source and an optical system that guides the laser light source to the eye of the user, and may employ a configuration of causing the user to view an image, by applying laser light to the eye of the user, scanning the laser light on the retina, and focusing light on the retina. In the case of employing the laser retinal projection-type head-mounted display, "injection possible region of image light in the image light generator" may be defined as the image area to be recognized by the eye of the user.

A configuration can be employed in which the optical system that guides the image light to the eye of the user includes an optical member that transmits external light that is incident from the outside to the device, and the external light and the image light are incident to the eye of the user. Further, an optical member may be used which is located in front of the eye of the user and overlaps a part or the whole of the field of view of the user. Further, a scanning type optical system may be employed which scans laser light and the like as image light. Further, the optical member is not limited to the optical member that guides image light in the inside, and may have only a function of guiding the image light by refracting and/or reflecting the image light to the eye of the user.

Further, the invention can be applied to a display using a MEMS display technique, by employing a scanning optical system using a MEMS mirror. In other words, as an image display device, a signal light forming unit, a scanning optical system with a MEMS mirror that scans light emitted by a signal light forming unit, and an optical member on which a virtual image is formed by light scanned by the scan optical system. In this configuration, the light that has been emitted by the signal light forming unit is reflected by the MEMS mirror, is incident on the optical member, is guided through the optical member, and reaches a virtual image forming surface. A virtual image is formed on the virtual image forming surface by the MEMS mirror scanning light, and an image is recognized by the user capturing the virtual image with the eye. The optical component in this case may guide, for example, light through a plurality of times of reflections, as the right light guide plate 261 and the left light guide plate 262 of the embodiment, or may use a half mirror surface. Further, it may configure the laser retinal projection-type head-mounted display described above in which light is incident on the eye of the user by using the MEMS, is scanned on the retina, and focused on the retina, such that the image is viewed to the user.

In addition, at least some of the respective functional blocks illustrated in FIG. 9 may be realized by hardware, or may be configured to be realized in cooperation of hardware and software, and is not limited to the configuration of arranging independent hardware resources as illustrated in FIG. 9. Further, the programs that the control unit 140 executes may be stored in a storage unit 120 or in the control device 300, or may be configured to be performed by obtaining the program stored in an external device through the communication unit 117 or the interface 114. Further, only the operation unit 135 out of the components provided in the control device 300 may be formed as a single user interface (UI). The components provided in the control device 300 may be provided in the virtual image display 100 in a duplicate manner. For example, the control unit 140 illustrated in FIG. 9 may be provided in both the control device 300 and the virtual image display 100, and the functions performed by the control unit 140 provided in the control device 300 and the CPU provided in the virtual image display 100 may be configured to be divided separately.

The entire disclosure of Japanese Patent Application Nos. 2015-066631, filed Mar. 27, 2015 and 2015-173682, filed Sep. 3, 2015 are expressly incorporated by reference herein.

What is claimed is:

1. A display comprising:
   a first image display and a second image display that each display an image respectively corresponding to a right eye and a left eye of a user such that an outside scene is visible; and
   a control unit including a processor and a memory, the control unit, when executed by the processor, being configured to:
   control a display mode of the image by each of the first image display and the second image display according to a gaze distance of the user, and
   adjust the display mode of the image according to a dominant eye of the user,
   wherein the display mode of the image includes: (i) a first display mode for a dominant eye, and in the first display mode, the image is displayed in a position shifted by a number of pixels from a reference position, on the first image display; and (ii) a second display mode for a non-dominant eye, and in the second display mode, the image is displayed in a position shifted by a different number of pixels from the reference position, on the second image display.

2. The display according to claim 1,
   wherein the control unit, when executed by the processor, is configured to change a display position of the image and/or a display size of the image, by the first image display and the second image display, according to the gaze distance of the user.

3. The display according to claim 1,
wherein the control unit, when executed by the processor, is configured to control the display mode of the image displayed by the first image display and the second image display, based on a convergence angle between both eyes corresponding to the gaze distance of the user.

4. The display according to claim 3,
wherein the control unit, when executed by the processor, is configured to obtain the convergence angle between both eyes of the user, and varies a position where the user views the image displayed on the first image display and the second image display, according to the obtained convergence angle.

5. The display according to claim 4,
wherein the control unit, when executed by the processor, is configured to shift a display position displayed by the first image display and the second image display, from a standard position that is set in advance, according to the convergence angle between both eyes of the user.

6. The display according to claim 3, wherein the convergence angle is initially set in a range that is greater than or equal to 1° and less than or equal to 5° in an initial state in which the control unit does not control the display mode.

7. The display according to claim 1, further comprising:
a plurality of state detecting cameras that detect a state of both eyes of the user,
wherein the control unit, when executed by the processor, is configured to calculate the gaze distance of the user, based on a detection result of the state detecting cameras, and controls the display mode of the image by the first image display and the second image display, according to the calculated gaze distance.

8. The display according to claim 7,
wherein the state detecting cameras includes an inner camera that are respectively provided corresponding to a right eye and a left eye of the user, and
wherein the control unit, when executed by the processor, is configured to calculate the gaze distance of the user, by obtaining at least one of a pupillary distance, a pupil diameter, and a gaze time in a gaze direction of the right eye and the left eye the user, based on a captured image of the inner camera.

9. The display according to claim 7,
wherein:
the state detecting cameras include an outer camera that captures a gaze direction of the right eye and left eye of the user, and
the control unit, when executed by the processor, is configured to calculate the gaze distance of the user, by obtaining the gaze direction of the right eye and left eye of the user, based on the captured image of the outer camera.

10. The display according to claim 1,
wherein the first image display and the second image display each include:
an emitting image display that emits an image light;
an optical system including a light guide, that guides the image light which is emitted by the emitting image display to each of the right eye and the left eye of the user; and
a change unit including an actuator, that displaces a portion of members constituting the emitting image display or the optical system, and changes an angle of the image light that is incident from the optical system to the right eye and the left eye of the user; and
wherein the control unit, when executed by the processor, is configured to operate the change unit according to the gaze distance of the user.

11. The display according to claim 1,
wherein the control unit, when executed by the processor, is configured to control a position of the image, in a display range in which the user views the image displayed on the first image display and the second image display, according to the gaze distance of the user.

12. The display according to claim 11, comprising:
an image generator including a signal and image processing data that generates an image displayed on the first image display and the second image display based on the image data,
wherein the control unit, when executed by the processor, is configured to generate the image for adjustment by cutting out a part of the image data by the image generator, according to the gaze distance of the user, and displays the image for adjustment on the first image display and the second image display.

13. The display according to claim 1,
wherein the control unit, when executed by the processor, is configured to cause the first image display and the second image display each to display the image corresponding to either the right eye or the left eye of the user, when the gaze distance of the user is closer than a reference distance that is set in advance.

14. The display according to claim 1, further comprising:
an external imaging camera,
wherein the control unit, when executed by the processor, is configured to execute a process of displaying the image based on a captured image of the external imaging camera on the first image display and the second image display.

15. The display according to claim 14,
wherein the first image display and the second image display are configured such that the user can view an outside scene by external light passing through the first image display and the second image display, and visibly displays the image based on the captured image of the external imaging camera and the outside scene at the same time.

16. The display according to claim 14,
wherein the control unit, when executed by the processor is configured to execute a process of improving the visibility of the image based on the captured image, as compared to external light passing through the first image display and the second image display, when the image based on the captured image is displayed on the first image display and the second image display.

17. The display according to claim 16,
wherein the control unit, when executed by the processor is configured to execute a process of improving the visibility of the image based on the captured image, by varying brightness or color of the image based on the captured image, or executing an edge enhancement process on the image based on the captured image, when the image based on the captured image is displayed on the first image display and the second image display.

18. The display according to claim 14,
wherein the control unit, when executed by the processor, is configured to cause the first image display and the second image display each to display the image based on a captured image of the external imaging camera, corresponding to either the right eye or the left eye of the user.

19. The display according to claim 14,
wherein the control when executed by the processor, is configured to cause the first image display and the second image display each to display the image based on the captured image of the external imaging camera, corresponding to each of the right eye and the left eye of the user, in a manner without left and right parallax.

20. The display according to claim 14,
wherein the control unit, when executed by the processor, is configured to cause the first image display and the second display each to display the captured image of the external imaging camera in an enlarged manner.

21. The display according to claim 14,
wherein the control unit, when executed by the processor, is configured to cause the first image display and the second image display each to display the image based on the captured image of the external imaging camera, when an operation of the user is received.

22. The first image display and a second image display according to claim 14,
wherein the control unit, when executed by the processor, is configured to:
detect a gaze distance of the user, and
display the image based on the captured image of the external imaging camera, when the detected gaze distance is shorter than a distance that is set in advance.

23. The display according to claim 14,
wherein the external imaging camera captures a range including a sight line direction of the user, in a mounted state of the first image display and the second image display.

24. The display according to claim 1, wherein
the image is an image of an object viewed by the user, and
the right eye or the left eye is designated as the dominant eye based on a relative position of the object with respect to a right side of a field of view of the user and a left side of the field of view of the user.

25. The display according to claim 1, wherein
the control unit, when executed by the processor, is configured to adjust the display mode of the image according to the dominant eye of the user based on setting data stored in the memory, and
the setting data includes arithmetic information used for performing arithmetic processes, which are used to adjust the display mode, with the dominant eye as a reference.

26. The display according to claim 1, further comprising:
an external imaging unit that captures a range including a sight line direction of the user,
wherein the external imaging camera captures a range including a sight line direction of the user, and the sight line direction of the user is in a range of 0.2° to 2°.

27. A display which displays an image respectively corresponding to a right eye and a left eye of a user such that an outside scene is visible, the display comprising:
a first image display and a second image display including:
an emitting image display that emits image light;
an optical system including a light guide, that guides the image light which is emitted by the emitting image display, to each of the right eye and the left eye of the user; and
a change unit including an actuator, that changes an emission direction of the emitting image display or an incidence angle of the image light that is incident from the optical system to the right eye and the left eye of the user,
an image generator that includes a signal and image processing data that generates an image displayed on the first image display and the second image display based on image data, and
a control unit including a processor and a memory, the control unit, when executed by the processor, is configured to:
adjust the display mode of the image according to a dominant eye of the user,
wherein the display mode of the image includes: (i) a first display mode for a dominant eye, and in the first display mode, the image is displayed in a position shifted by a number of pixels from a reference position, on the first image display; and (ii) a second display mode for a non-dominant eye, and in the second display mode, the image is displayed in a position shifted by a different number of pixels from the reference position, on the second image display, and
perform at least one of a process of calculating the gaze distance of the user, and operating the change unit according to the calculated gaze distance, and a process of generating the image for adjustment by cutting out a part of the image data, by the image generator, according to the gaze distance of the user, and displaying the image for adjustment on the first image display and the second image display.

28. A control method of a display, comprising:
controlling a display mode of an image displayed on a first image display and a second image display, according to a gaze distance of a user, first image display and the second image display each display the image respectively corresponding to a right eye and a left eye of a user such that an outside scene is visible, and
adjusting the display mode of the image according to a dominant eye of the user,
wherein the display mode of the image includes: (i) a first display mode for a dominant eye, and in the first display mode, the image is displayed in a position shifted by a number of pixels from a reference position, on the first image display; and (ii) a second display mode for a non-dominant eye, and in the second display mode, the image is displayed in a position shifted by a different number of pixels from the reference position, on the second image display.

29. A non-transitory computer readable medium comprising:
computer program instructions, that when executed by a computer, cause the computer to:
control a display that displays images respectively corresponding to a right eye and a left eye of a user such that an outside scene is visible and to adjust the display according to a dominant eye of a user,
wherein the display mode of the image includes: (i) a first display mode for a dominant eye, and in the first display mode, the image is displayed in a position shifted by a number of pixels from a reference position, on the first image display; and (ii) a second display mode for a non-dominant eye, and in the second display mode, the image is displayed in a position shifted by a different number of pixels from the reference position, on the second image display; and control a display mode of an image by a first image display and a second image display, according to a gaze distance of a user.

* * * * *